United States Patent
Cain et al.

(10) Patent No.: US 10,075,775 B2
(45) Date of Patent: Sep. 11, 2018

(54) DIGITAL DEVICE AND METHOD FOR PROCESSING APPLICATION THEREON

(71) Applicant: LG ELECTRONICS INC., Seoul (KR)

(72) Inventors: Ian Cain, Santa Clara, CA (US); Peter Nordstrom, Santa Clara, CA (US); Robert Jagt, Santa Clara, CA (US); Steve Winston, Santa Clara, CA (US)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/121,546

(22) PCT Filed: Feb. 2, 2015

(86) PCT No.: PCT/KR2015/001054
§ 371 (c)(1),
(2) Date: Aug. 25, 2016

(87) PCT Pub. No.: WO2015/130021
PCT Pub. Date: Sep. 3, 2015

(65) Prior Publication Data
US 2016/0373833 A1 Dec. 22, 2016

Related U.S. Application Data

(60) Provisional application No. 61/945,784, filed on Feb. 27, 2014.

(30) Foreign Application Priority Data

Sep. 30, 2014 (KR) ........................ 10-2014-0131940

(51) Int. Cl.
*H04N 7/16* (2011.01)
*H04N 21/81* (2011.01)
(Continued)

(52) U.S. Cl.
CPC ....... *H04N 21/818* (2013.01); *H04N 21/4143* (2013.01); *H04N 21/41407* (2013.01);
(Continued)

(58) Field of Classification Search
None
See application file for complete search history.

(56) References Cited

U.S. PATENT DOCUMENTS 8,745,661 B2 * 6/2014 Ellis ................. H04N 21/44218
725/139
9,124,937 B2 * 9/2015 Stern .................. H04N 21/4622
(Continued)

FOREIGN PATENT DOCUMENTS

| KR | 10-2007-0014724 | 2/2007 |
| KR | 10-2011-0126148 | 11/2011 |

(Continued)

OTHER PUBLICATIONS

International Search Report dated Apr. 27, 2015 issued in Application No. PCT/KR2015/001054 (English translation attached).

*Primary Examiner* — An Son P Huynh
(74) *Attorney, Agent, or Firm* — KED & Associates LLP

(57) ABSTRACT

Disclosed in the present specification are various embodiments regarding a digital device and a method for processing services on the digital device. Here, a method for processing an application on a digital device having a Web OS platform according to an embodiment of the present invention comprises the steps of: receiving a load request from a media application located in the foreground; generating a first media pipeline according to the received load request; if a resource assigning request is received from the first media pipeline, assigning the acquisition-requested resource to the first media pipeline; and receiving a playing request from the media application and then outputting the media.

11 Claims, 54 Drawing Sheets

(51) Int. Cl.

| | |
|---|---|
| *H04N 21/414* | (2011.01) |
| *H04N 21/4143* | (2011.01) |
| *H04N 21/434* | (2011.01) |
| *H04N 21/443* | (2011.01) |
| *H04N 21/472* | (2011.01) |
| *H04N 21/438* | (2011.01) |
| *H04N 21/431* | (2011.01) |
| *H04N 21/433* | (2011.01) |
| *H04N 21/488* | (2011.01) |

(52) U.S. Cl.
CPC ....... *H04N 21/434* (2013.01); *H04N 21/4312* (2013.01); *H04N 21/4333* (2013.01); *H04N 21/4383* (2013.01); *H04N 21/4433* (2013.01); *H04N 21/472* (2013.01); *H04N 21/4882* (2013.01); *H04N 21/8173* (2013.01)

(56) References Cited

U.S. PATENT DOCUMENTS

| | | | | |
|---|---|---|---|---|
| 9,407,961 B2* | 8/2016 | Weast | | H04N 21/4438 |
| 9,872,064 B2* | 1/2018 | White | | H04N 21/43615 386/231 |
| 2002/0174430 A1* | 11/2002 | Ellis | | G11B 27/005 725/46 |
| 2005/0037706 A1* | 2/2005 | Settle | | H04B 7/18586 455/12.1 |
| 2005/0283800 A1* | 12/2005 | Ellis | | H04N 5/44543 725/40 |
| 2007/0083868 A1* | 4/2007 | Sankaranarayan ... | | G06F 9/5038 718/104 |
| 2007/0157281 A1* | 7/2007 | Ellis | | H04N 7/17309 725/134 |
| 2008/0066111 A1* | 3/2008 | Ellis | | H04N 5/44543 725/57 |
| 2008/0141317 A1* | 6/2008 | Radloff | | H04N 5/44582 725/87 |
| 2008/0256539 A1* | 10/2008 | Barde | | G06F 21/53 718/100 |
| 2009/0006771 A1* | 1/2009 | Freeman | | G06F 9/5016 711/147 |
| 2009/0222875 A1* | 9/2009 | Cheng | | H04H 20/63 725/147 |
| 2010/0153885 A1* | 6/2010 | Yates | | G06F 3/0482 715/841 |
| 2010/0175099 A1* | 7/2010 | Kim | | H04N 21/234318 725/110 |
| 2010/0195610 A1* | 8/2010 | Zhong | | H04L 65/1016 370/329 |
| 2010/0260479 A1* | 10/2010 | Watanabe | | H04N 5/45 386/239 |
| 2011/0072452 A1* | 3/2011 | Shimy | | H04N 7/163 725/25 |
| 2011/0078717 A1* | 3/2011 | Drummond | | H04N 21/4586 725/14 |
| 2011/0164175 A1* | 7/2011 | Chung | | H04N 21/4126 348/468 |
| 2011/0310305 A1* | 12/2011 | Alexander | | H04N 5/775 348/725 |
| 2012/0170666 A1* | 7/2012 | Venkatasubramanian | | H04N 19/127 375/240.25 |
| 2013/0031582 A1* | 1/2013 | Tinsman | | H04N 21/2353 725/36 |
| 2013/0209065 A1* | 8/2013 | Yeung | | H04N 21/41407 386/248 |
| 2013/0279877 A1* | 10/2013 | Boak | | H04N 5/917 386/231 |
| 2014/0002576 A1* | 1/2014 | Kaza | | H04L 65/1069 348/14.02 |
| 2014/0013331 A1* | 1/2014 | Noro | | G06F 9/50 718/103 |
| 2014/0068009 A1* | 3/2014 | Lee | | H04N 21/4263 709/219 |
| 2014/0280580 A1* | 9/2014 | Langlois | | H04W 4/005 709/204 |
| 2014/0373027 A1* | 12/2014 | Pulapaka | | G06F 9/485 718/106 |
| 2016/0224374 A1* | 8/2016 | Basu | | G06F 9/485 |
| 2017/0026650 A1* | 1/2017 | Mittal | | H04N 19/159 |

FOREIGN PATENT DOCUMENTS

| | | |
|---|---|---|
| KR | 10-2012-0030559 | 3/2012 |
| KR | 10-2013-0068564 | 6/2013 |
| KR | 10-2013-0101122 | 9/2013 |

\* cited by examiner

FIG. 27
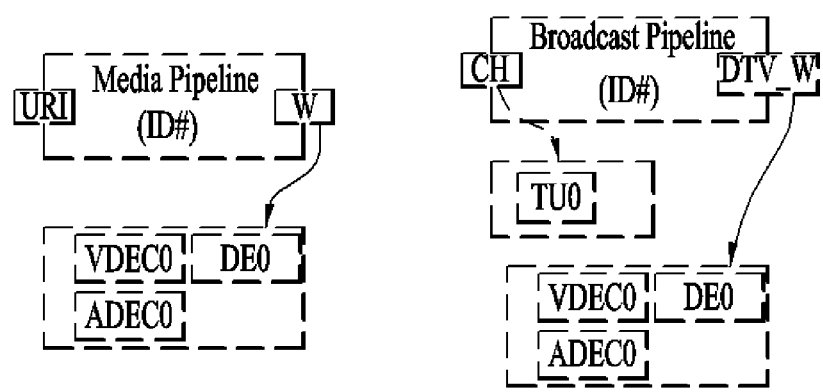
(a)
(b)
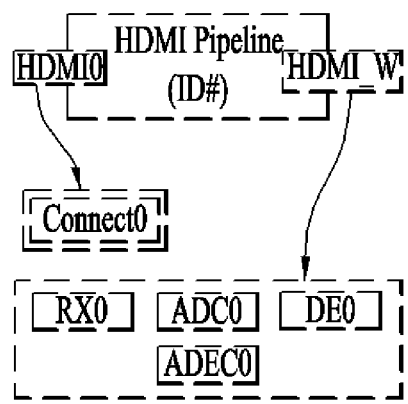
(c)

FIG. 28
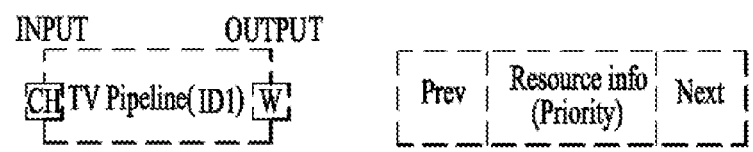
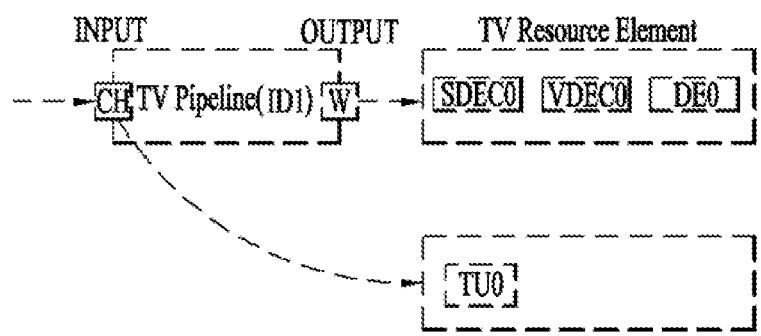

DIGITAL DEVICE AND METHOD FOR PROCESSING APPLICATION THEREON

CROSS-REFERENCE TO RELATED PATENT APPLICATIONS

This application is a U.S. National Stage Application under 35 U.S.C. § 371 of PCT Application No. PCT/KR2015/001054, filed Feb. 2, 2015, which claims priority to U.S. Provisional Application No. 61/945,784 filed Feb. 27, 2014, and Korean Patent Application No. 10-2014-0131940, filed Sep. 30, 2014, whose entire disclosures are hereby incorporated by reference.

TECHNICAL FIELD

The present invention relates to a digital device, and more particularly, to a method of processing an application in a digital device on which a Web OS platform is mounted.

BACKGROUND ART

Development of a mobile device such as a smartphone, a tablet PC, and the like as well as a standing device such as a PC (personal computer), a TV (television) is remarkable. The standing device and the mobile device have been originally developing in each domain in a manner of being distinguished. Yet, the domain becomes ambiguous according to the boom of recent digital convergence.

And, as an eye level of a user is getting higher according to the development of a digital device or environment change, demand for various and high-spec services and application support is increasing.

DISCLOSURE OF THE INVENTION

Technical Task

Accordingly, the present invention is directed to substantially obviate one or more of the problems due to limitations and disadvantages of the related art. An object of the present invention is to provide a device for processing a service, an application, data and the like on a Web OS and a method therefor.

Another object of the present invention is to provide a run-time view, resource management, policy management and the like necessary for processing the service, the application, the data, and the like on the Web OS.

The other object of the present invention is to consult a Web OS user's convenience and improve product satisfaction via the aforementioned process.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

Various embodiment(s) for a digital device and a method of processing a service thereof are disclosed in the present specification.

To achieve these and other advantages and in accordance with the purpose of the present invention, as embodied and broadly described, according to one embodiment, a method of processing an application in a digital device on which a web OS platform is mounted includes the steps of receiving a load request from a media application positioned at a foreground, generating a first media pipeline according to the received load request, if a resource assigning request is received from the first media pipeline, assigning the requested resource to the first media pipeline, and outputting a media by receiving a play request from the media application.

To further achieve these and other advantages and in accordance with the purpose of the present invention, according to a different embodiment, a method of processing an application in a digital device on which a web OS platform is mounted includes the steps of receiving an open request from a TV application positioned at a foreground, generating a first TV pipeline according to the open request, receiving a channel setting request from the TV application, assigning a resource to the TV pipeline according to the channel setting request, storing the requested channel setting, and outputting a TV service by tuning the channel.

To further achieve these and other advantages and in accordance with the purpose of the present invention, according to a further different embodiment, a method of processing an application in a digital device on which a web OS platform is mounted includes the steps of receiving a watching reservation request or a recording reservation request from a first application, outputting a notification pop-up message prior to prescribed time from time on which the reservation request is made, launching a TV application at a foreground, generating a TV pipeline for the launched TV application, receiving a channel setting request from the TV application, assigning a resource to the TV pipeline and storing a requested channel setting, and outputting a TV service via the assigned resource.

To further achieve these and other advantages and in accordance with the purpose of the present invention, according one embodiment, a digital device equipped with a web OS platform processing an application includes a reception unit configured to receive a load request from a media application positioned at a foreground, a controller configured to generate a first media pipeline according to the received load request, the controller, if a resource assigning request is received from the first media pipeline, configured to assign the requested resource to the first media pipeline, and an output unit configured to output a media by receiving a play request from the media application.

To further achieve these and other advantages and in accordance with the purpose of the present invention, according a different embodiment, a digital device equipped with a web OS platform processing an application includes a reception unit configured to receive an open request from a TV application positioned at a foreground and receive a channel setting request from the TV application, a controller configured to generate a first TV pipeline according to the open request, the controller configured to assign a resource to the TV pipeline according to the channel setting request, the controller configured to store the requested channel setting, and an output unit configured to output a TV service by tuning the channel.

To further achieve these and other advantages and in accordance with the purpose of the present invention, according a further different embodiment, a digital device equipped with a web OS platform processing an application includes a reception unit configured to receive a watching reservation request or a recording reservation request from a first application and receive a channel setting request from a TV application, a controller configured to launch the TV application at a foreground, the controller configured to generate a TV pipeline for the launched TV application, the controller configured to assign a resource to the TV pipeline and store a requested channel setting, and an output unit configured to output a notification pop-up message prior to prescribed time from time on which the reservation request is made, the output unit configured to output a TV service via the assigned resource.

Technical solutions obtainable from the present invention are non-limited the above mentioned technical solutions. And, other unmentioned technical solutions can be clearly understood from the following description by those having ordinary skill in the technical field to which the present invention pertains.

Advantageous Effects

The present invention is directed to substantially obviate one or more of the problems due to limitations and disadvantages of the related art. According to one embodiment among various embodiments of the present invention, it is able to provide a device for processing a service, an application, data and the like on a Web OS and a method therefor.

According to a different embodiment among various embodiments of the present invention, it is able to provide a run-time view, resource management, policy management and the like necessary for processing the service, the application, the data, and the like on the Web OS.

According to a further different embodiment among various embodiments of the present invention, it is able to consult a Web OS user's convenience and improve product satisfaction via the aforementioned process.

DESCRIPTION OF DRAWINGS

FIG. 27 is a diagram for explaining a type of a pipeline according to one embodiment of the present invention;

FIG. 28 is a diagram for explaining a definition on a pipeline characteristic according to one embodiment of the present invention;

BEST MODE

Figure 1:
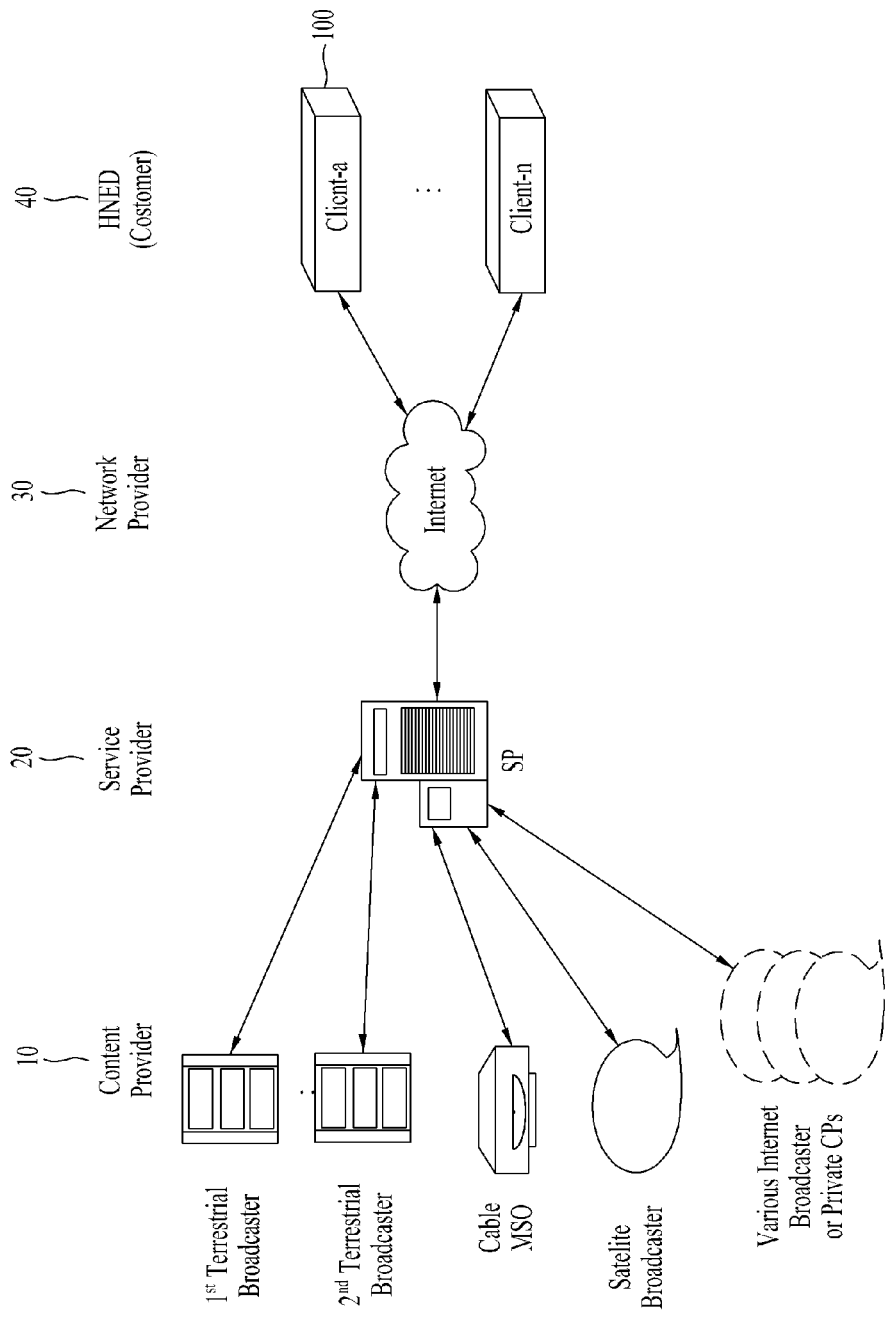
FIG. 1 is a schematic diagram for explanation of a service system including a digital device according to an embodiment of the present invention.

Description will now be given in detail according to exemplary embodiments disclosed herein, with reference to the accompanying drawings.

For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, contents specified in the present disclosure or drawings are an embodiment of the present invention, so a scope of the present invention must be determined through a claim set.

A digital device according to an embodiment of the present disclosure as set forth herein may be any device that can handle any one of transmitting, receiving, handling and outputting data, content, service, application, and so forth. The digital device may be connected to other digital devices through wired network or wireless network, paired or connected to an external server, and through the connections, the digital device may transmit and receive the prescribed data. Examples of the digital device may include standing devices such as a network television (TV), a Hybrid Broadcast Broadband TV (HBBTV), a smart TV, Internet Protocol TV (IPTV), and personal computer (PC), or mobile (or handheld) devices such as a Personal Digital Assistant (PDA), a smart phone, a tablet PC, or an Notebook computer. For convenience of description, in this disclosure, the Digital TV (DTV) is used in FIG. 2 and the mobile device is used in FIG. 3 depicting the digital device. Further, the digital device in this disclosure may be referred to configuration comprising only a panel, set-top box (STB), or a SET including the entire system.

Moreover, the wired/wireless network described in this disclosure may refer to various pairing methods, standard telecommunication network protocol methods which are supported for transmitting and receiving data between digital devices or between digital device and the external server. The wired or wireless network also includes various telecommunication network protocols supported now as well as in the future. Examples of the wired or wireless network include wired networks supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless networks supported by various standards including Bluetooth™, Radio Frequency Identification (RFID), infrared Data Association (IrDA), Ultra Wideband (UWB), ZigBee, Digital Living Network Alliance (DLNA), Wireless LAN (WLAN) (Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, the disclosure referring simply to the digital device can include a standing device or a mobile device depending on the context, and when it is not referred to a specific device, the digital device referred in this disclosure refers to both standing and mobile device.

Meanwhile, the digital device may perform intelligent functions such as receiving broadcasting program, operating computer functions, and supporting at least one external input, and by being connected through the network wired or wirelessly, the digital device may support e-mail functions, web browsing functions, banking, gaming, and executing applications. The digital device may further include an interface for any one of input or control means supporting a handwriting input, a touch-screen, and a spatial remote control.

Furthermore, the digital device may use a standard operating system (OS), however, the digital device described in this disclosure and the embodiments, uses a Web OS. Therefore, the digital device may perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input mechanisms or digital devices, capable of transmitting and receiving data through wired or wireless network connected to and from the digital device. For example, the external input includes High Definition Multimedia Interface (HDMI), game devices such as Playstation or X-Box, smart phone, tablet PC, printing device such as pocket photo, digital devices such as smart TV and blue-ray device.

The "server" referred to as in this disclosure, includes a digital device or a system capable of transmitting and receiving data to and from a client, and may also be referred to as a processor. For example, the server may be servers providing services such as a portal server providing a web page, a web content or a web service, an advertising server providing advertising data, a content server, a Social Network Service (SNS) server providing a SNS service, a service server providing a service by a manufacturer, a Multichannel Video Programming Distributor (MVPD) providing a Video on Demand (VoD) or a streaming service, and a service server providing pay services.

When an application is described for the convenience of explanation, the meaning of disclosure in the context may include services as well as applications.

In the following description, various embodiments according to the present invention are explained with reference to attached drawings.

FIG. 1 illustrates a broadcast system including a digital device according to an embodiment of the present invention.

Referring to FIG. 1, examples of a broadcast system comprising a digital device may include a content provider (CP) 10, a service provider (SP) 20, a network provider (NP) 30, and a home network end user (HNED) (Customer) 40. The HNED 40 includes a client 100, that is, a digital device.

The CP 10 produces and provides content. Referring to FIG. 1, the CP 10 can include a terrestrial broadcaster, a cable system operator (SO) or multiple system operator (MSO), a satellite broadcaster, various Internet broadcasters, private content providers (CPs), etc. The CP 10 can provide various service or application web as well as broadcast content.

The SP 20 service-packetizes content produced by the CP 10. For example, the SP 20 packetizes at least one service among contents produced by a first terrestrial broadcaster, a second terrestrial broadcast, a cable MSO, a satellite broadcaster, various internet broadcasters, an application, etc. And, the SP 20 provides the packetized at least one service to the HNED 40.

The SP 20 can provide services to the client 100 in a uni-cast or multi-cast manner. The SP 20 can transmit data to a preregistered various clients 100 at once using an IGMP (Internet Group Management Protocol), etc.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100.

The client 100 is a consumer included in the HNED 40, construct a home network, receive data and transmit/receive data for various service or application like a VoD (video on demand), a streaming, and the like.

The CP 10 and/or SP 20 can use a content protection means or a conditional access for a content to be transmitted. In this case, the client 100 can use a means such as a cable card (CableCARD) (or a POD: Point of Deployment) or downloadable CAS (DCAS), which corresponds to the content protection means of the CP 10 and/or SP 20.

In addition, the client 100 can use an interactive service through a network. In this case, the client 100 can directly serve as the CP 10 and/or the SP 20 in a relationship with another client or indirectly function as a server of the other client.

In FIG. 1, the CP 10 and/or SP 20 may a server providing a service as below in this disclosure. In this case, if necessary, the server may include the NP 20. Although it is not described more specifically, the service or application can include not only service or application received from an external server also the service or application received from an internal memory. The service or application can include service or application data for the Client 100 based on a Web OS.

Figure 2:
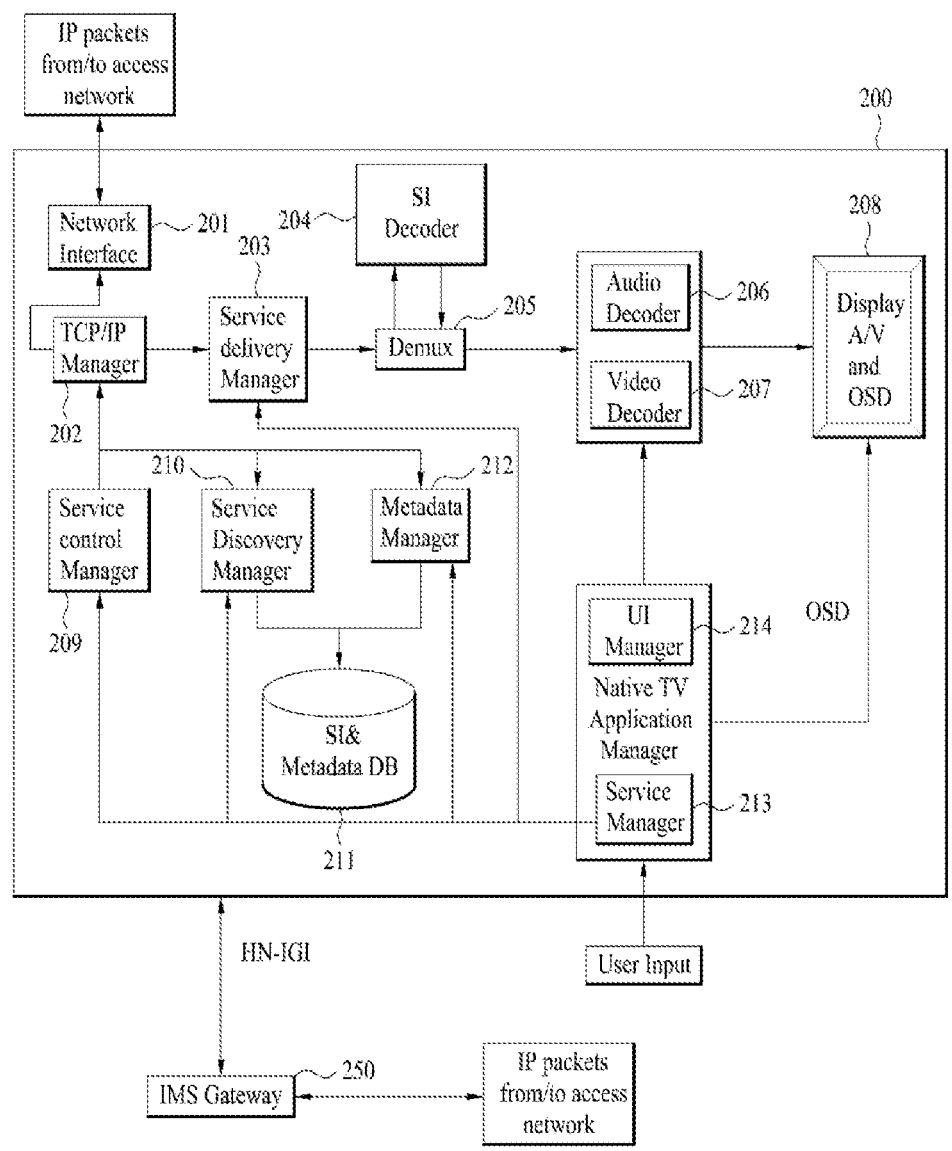
FIG. 2 is a block diagram for explanation of a digital device according to an embodiment of the present invention.
Figure 3:
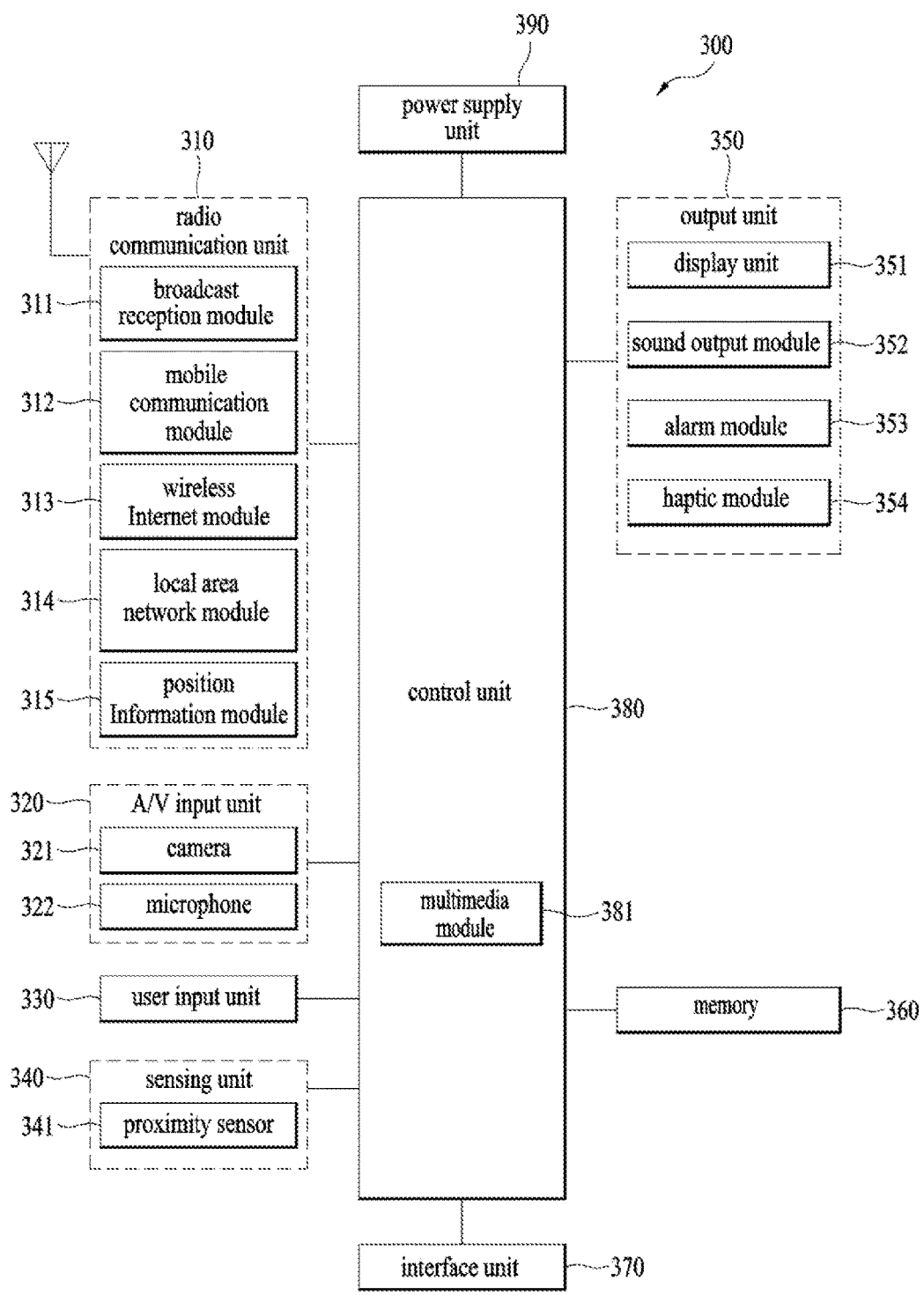
FIG. 3 is a block diagram for explanation of a digital device according to another embodiment of the present invention.

FIG. 2 is a schematic diagram of a digital device 200 according to an embodiment of the present invention.

Hereinafter, the digital device may correspond to the client 100 shown in FIG. 1.

A digital device equipped with the Web OS platform processing application according to an embodiment of the present invention, a reception unit configured to receive a load request from a media application positioned at a foreground, a controller configured to generate a first media pipeline according to the received load request, the controller, if a resource assigning request is received from the first media pipeline, configured to assign the requested resource to the first media pipeline, and an output unit configured to output a media by receiving a play request from the media application.

A digital device equipped with a web OS platform processing an application according to another embodiment of the present invention includes a reception unit configured to receive an open request from a TV application positioned at a foreground and receive a channel setting request from the TV application, a controller configured to generate a first TV pipeline according to the open request, the controller configured to assign a resource to the TV pipeline according to the channel setting request, the controller configured to store the requested channel setting and an output unit configured to output a TV service by tuning the channel.

A digital device equipped with a web OS platform processing an application according to another embodiment of the present invention includes a reception unit configured to receive a watching reservation request or a recording reservation request from a first application and receive a channel setting request from a TV application, a controller configured to launch the TV application at a foreground, the controller configured to generate a TV pipeline for the launched TV application, the controller configured to assign a resource to the TV pipeline and store a requested channel setting, and an output unit configured to output a notification pop-up message prior to prescribed time from time on which the reservation request is made, the output unit configured to output a TV service via the assigned resource.

The digital device 200 may include a network interface 201, a TCP/IP manager 202, a service delivery manager 203, an SI decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI (user interface) manager, etc.

The network interface 201 may receive or transmit internet protocol (IP) packets or IP datagrams (hereinafter, IP packet(s)) through an accessed network. As an example, the network interface 201 may receive service, application, content and the like from the service provider 20 of FIG. 1 via the network.

The TCP/IP manager 202 may involve delivery of IP packets transmitted to the digital device 200 and IP packets transmitted from the digital device 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212 and the like.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feedback network reception information to the server on the basis of the RTP.

The demultiplexer 205 may demultiplex audio data, video data, SI from a received packet and transmit the demultiplexed data to the audio/video decoder 206/207 and the SI decoder 204, respectively.

The SI decoder 204 may decode the demultiplexed SI data such as program specific information (PSI), program and system information protocol (PSIP), digital video broadcast-service information (DVB-SI), digital television terrestrial multimedia broadcasting/coding mobile multimedia broadcasting (DTMB/CMMB), etc. The SI decoder 204 may store the parsed and/or decoded SI data in the SI& metadata DB 211. The SI data stored in the SI& metadata DB 211 can be read or extracted and used by a component which requires the SI data.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a UI manager 214, perform a function of a controller of the digital device 200. In other words, the application manager may administrate the overall state of the digital device 200, provide a UI, and manage other mangers.

The UI manager 214 can provide a graphic user interface (GUI)/UI through OSD, receive a key input from the user and provide a graphical user interface (GUI) related to a receiver operation corresponding to the key input through OSD. For instance, the UI manager 214 transmits the key input signal to the service manager 213 if the key input related to a channel selection from the user.

The service manager 213 may control and manage service-related managers such as the service delivery manager 203, the service discovery manager 210, the service control manager 209, the metadata manager 212, and the like.

The service manager 213 may configure a channel map and enable channel control at the request of the user on the basis of the channel map. The service manager 213 may receive service information corresponding to channel from the SI decoder 204 and set audio/video PID of a selected channel to the demultiplexer 205 so as to control the demultiplexing procedure of the demultiplexer 205.

The service discovery manager 210 may provide information required to select a service provider that provides a service. Upon receipt of a signal for selecting a channel from the service manager 213, the service discovery manager 210 discovers a service on the basis of the received signal.

The service control manager 209 may select and control a service. For example, the service control manager 209 may perform service selection and control using IGMP or real time streaming protocol (RTSP) when the user selects a live broadcast service and using RTSP when the user selects a VOD service. The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211.

The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data.

The SI & metadata DB 211 can be implemented using a Non-Volatile RAM (NVRAM) or a Flash memory, and the like.

An IMS (IP Multimedia Subsystem) gateway 250 may include functions required to access an IMS based IPTV services.

FIG. 3 is a block diagram of a mobile terminal 300 in accordance with an embodiment of the present invention.

FIG. 2 specifies a standing device as an embodiment of the digital device, and FIG. 3 specifies a mobile terminal as another embodiment of the digital device.

With reference to FIG. 3, the mobile terminal 300 includes a wireless communication unit 310, an A/V (audio/video) input unit 320, a user input unit 330, a sensing unit 340, an output unit 350, a memory 360, an interface unit 370, a controller 380, a power supply unit 390, and the like.

Hereinafter, each element is specified as follows.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) and an electronic service guide (ESG).

The broadcast receiving module 311 may be configured to receive broadcast signals transmitted from various types of broadcast systems. By non-limiting example, such broadcasting systems may include ATSC, DVB-T (Digital Video Broadcasting-Terrestrial), DVB-S(Satellite), media forward link only (MediaFLO™), integrated services digital broadcast-terrestrial (ISDB-T) and DTMB/CMMB. Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from at least one of a base station, an external terminal, or a server via a mobile network. Such wireless signals may carry audio, video, and data according to text/multimedia messages.

The wireless Internet module 313 includes wireless Internet access. This module may be internally or externally coupled to the mobile terminal 300. The wireless Internet technology can include WLAN (Wireless LAN) (Wi-Fi), Wibro™ (Wireless broadband), Wimax™ (World Interoperability for Microwave Access), HSDPA (High Speed Downlink Packet Access).

The short-range communication module 314 facilitates relatively short-range communications. Suitable technologies for implementing this module include Bluetooth™, radio frequency identification (RFID), infrared data association (IrDA), ultra-wideband (UWB), ZigBee™, RS-232, RS-485.

The position-location module 315 identifies or otherwise obtains the location of the mobile terminal 100. According to one embodiment, this module may be implemented with a global positioning system (GPS) module.

The audio/video (NV) input unit 320 is configured to provide audio or video signal input to the mobile terminal 300. As shown, the AN input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341 including a near field communication (NFC), and the like.

The output unit 350 generates an output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user may be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence. The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component. Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
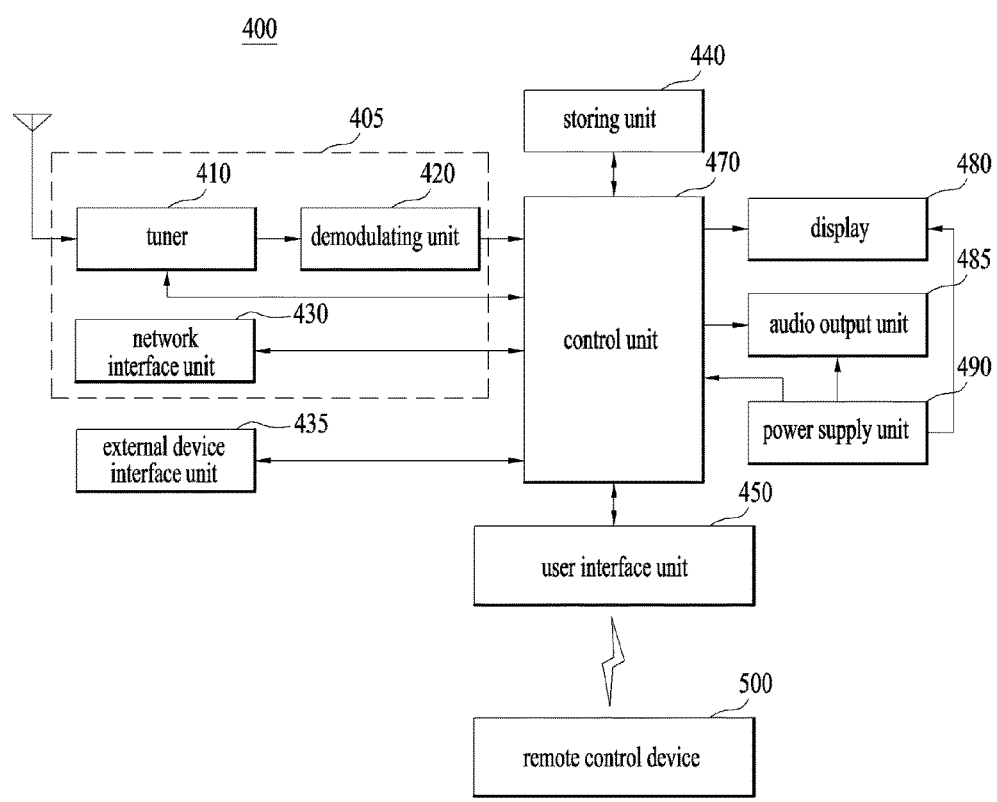
FIG. 4 is a block diagram for explanation of a digital device according to another embodiment of the present invention.

FIG. 4 illustrates a digital device according to another embodiment of the present invention.

Referring to FIG. 4, an exemplary digital device 400 according to the present invention may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels.

For example, if the received RF broadcast signal is a digital broadcast signal, it is converted to a digital IF (DIF) signal, and if the received RF broadcast signal is an analog broadcast signal, it is converted to an analog baseband image or a voice signal (CVBS/SIF). That is, the tuner 410 can process both the digital broadcast signal and the analog broadcast signal. The analog baseband image or a voice signal output from the tuner 410 can be directly input to the controller 470.

The tuner 410 can receive a RF broadcast signal of single carrier or multiple carriers. The tuner 410 can sequentially tune and receive a RF broadcast signal of all broadcast channel stored by a channel memory function among RF broadcast signal received through an antenna to. And, the tuner 410 can convert the received RF broadcast signal into the DIF.

The demodulator 420 receives the DIF signal, demodulates the received DIF signal, and performs a channel decoding, etc. For this, the demodulator 420 includes a trellis decoder, a de-interleaver, a Reed-Solomon decoder, etc., or includes a convolution decoder, the de-interleaver, the Reed-Solomon decoder, etc.

The demodulator 420 can outputs a transport stream (TS) after performing a demodulation and a channel decoding. At this time, the TS signal can be a signal by multiplexing a video signal, an audio signal or a data signal. As an example, the TS signal can be an MPEG-2 TS by multiplexing an MPEG-2 standard video signal, a Dolby (AC-3 standard) audio signal, etc.

A TS signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital device 400. To implement this, the external device interface 435 may include an A/V input/output unit (not shown) or an RF communication unit (not shown).

The external device interface 435 can be connected with external devices such as a digital versatile disk (DVD), a Blu-ray player, a game device, a camera, a camcorder, a computer (including a notebook computer), a tablet PC, a smart phone, a Bluetooth device, a Cloud server and the like in a wired/wireless manner. The external device interface 435 transfer a signal to the controller 470 of the digital device. The signal includes image data, video data, audio data which is input through an external device. The external device is connected to the digital device. The controller 470 can control to output the signal including the processed image data, the processed video data and the processed audio data to the connected external device. For this, the external device interface 435 can further include an A/V input/output unit or a wireless communication unit (not shown).

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital device 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

Also, the external device interface 435 can connect a STB via at least one interface described above, and perform an input/output operation with the connected STB.

Meanwhile, the external device interface 435 can receive application or application list included in a nearby external device, and can transfer the application or the application list to the controller 470 or the storage unit 440.

The network interface 430 may provide an interface for connecting the digital device 400 with a wired/wireless network including an internet network. The network interface 430 can equip, for example, an Ethernet terminal to connect with a wired network and use a communication standard like wireless LAN (WLAN) (Wi-Fi), Wibro, Wimax, and HSDPA to connect with a wireless network.

The network interface 430 can transmit/receive data to/from other users or other electronic apparatuses or access a network connected thereto or another network linked to the connected network. Especially, the network interface 430 can transmit some content data stored in the digital device to another user pre-registered in the digital device 400, a user using another digital device or a selected digital device.

Meanwhile, the network interface 430 can access a web page through a connected network or another network linked to the connected network. That is, the network interface 430 can transmit/receive data to/from a corresponding server by accessing the web page through the network. Besides, the network interface 430 can receive content or data provided from a content provider or a network provider. That is, the network interface 430 can receive the content like a movie, an advertisement, a game, a VoD, a broadcast signal and related information provided from the content provider or network provider. And, the network interface 430 can receive firmware update information and an update file provided from the network provider. Also, the network interface 430 can transmit data to internet, content provider or network provider.

The network interface 430 can selectively receive a desired application from among publicly open applications through a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430.

The storage unit 440 may store various platforms which will be described later.

The storage unit 440 can include storage media of one or more types, such as a flash memory type, a hard disk type, a multimedia card micro type, a card type memory (e.g. SD or XD memory), RAM, EEPROM, etc. The digital device 400 may reproduce content files (e.g., a video file, a still image file, a music file, a text file, an application file, etc.) and provide them to the user.

While FIG. 4 illustrates an embodiment in which the storage unit 440 is separated from the controller 470, the configuration of the digital device 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 480 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 4.

The controller 470 can control the overall operation of the digital device 300. For example, the controller 470 can control the tuner 410 to tune to an RF broadcast corresponding to a channel selected by the user or a previously stored channel.

The controller 470 can control the digital device 400 according to a user command input through the user input interface 450 or an internal program. Particularly, the controller 470 can control the digital device 400 to be linked to a network to download an application or application list that the user desires to the digital device 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital device 400, received broadcast content, or content input from an external device. The content may include at least one of a broadcast image, an external input image, an audio file, a still image, an image of a linked web, and a text file.

The controller 470 can control display of applications or an application list, downloadable from the digital device 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital device 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals.

The display unit 480 may be a PDP, an LCD, an OLED, a flexible display, a 3D display or the like.

The display unit 480 may be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital device 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450.

The digital device 400 may further include the photographing unit (not shown) for photographing the user.

Image information acquired by the photographing unit (not shown) can be supplied to the controller 470. The controller 470 may sense a gesture of the user from an image captured by the photographing unit (not shown) or a signal sensed by the sensing unit (not shown), or by combining the image and the signal.

The power supply unit 490 may supply power to the digital device 400.

Particularly, the power supply unit 490 can supply power to the controller 470 which can be implemented as a system-on-chip (SoC), the display unit 480 for displaying images, and the audio output unit 485 for audio output.

For this, the power supply unit 490 can include a converter (not shown) converting a direct current to an alternative current. And, for example, if the display 480 is implemented as a crystal panel including a plurality of backlight lamps, the power supply unit can include an inverter (not shown) capable of performing a PWM (Pulse Width Modulation) operation to perform a changeable luminance or a dimming operation.

The remote controller 500 may transmit user input to the user input interface 450. To achieve this, the remote controller 500 can use Bluetooth, RF communication, IR communication, UWB, ZigBee, etc.

In addition, the remote controller 500 can receive audio, video or data signal output from the user input interface 350 and display the received signal or output the same as audio or vibration.

The digital devices shown in FIGS. 2 through 4 are a digital broadcast receiver which is capable of processing an ATSC or DVB digital broadcast signal for standing or mobile Some of the components shown in FIG. 2 may be omitted or a component (not shown in FIG. 2) may be added as required. The digital device according to the present invention may not include the tuner and the demodulator, differently from the digital devices shown in FIGS. 2 and 4, and may receive content through the network interface or the external device interface and reproduce the content.

Figure 5:
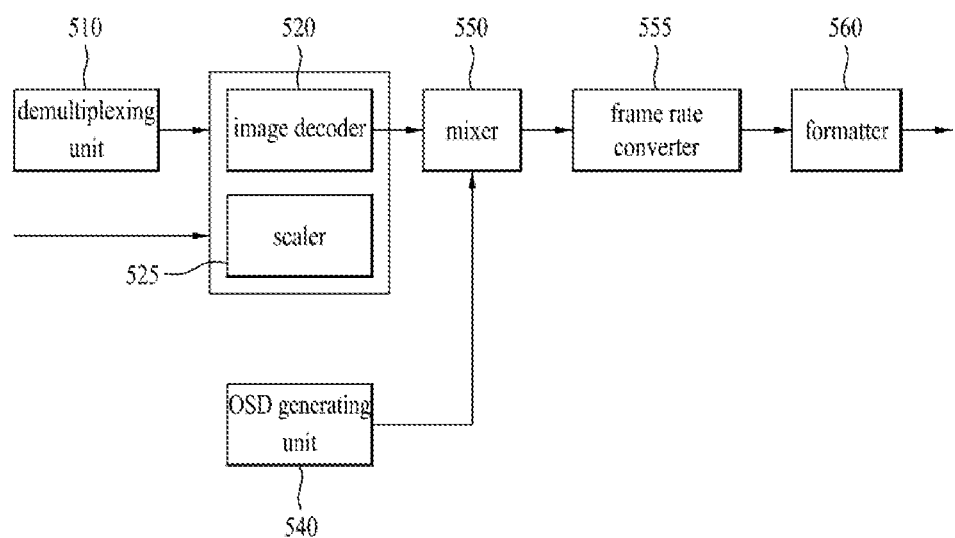
FIG. 5 is a block diagram for explanation of detailed configurations of a controller of FIGS. 2 to 4 according to an embodiment of the present invention.

FIG. 5 is a block diagram for explanation of detailed configurations of a controller of FIGS. 2 to 4 according to an embodiment of the present invention.

An example of the controller may include a demultiplexer 510, an image processor 520, an OSD generator 540, a mixer 550, a frame rate converter (FRC) 555, and a 3D formatter (or an Output formatter) 560. The controller further includes a voice processing unit (not shown) and a data processing unit (not shown).

The demultiplexer 510 can demultiplex an input stream signal into an MPEG-2 TS image, an audio signal and a data signal, for example. Here, the stream signal inputted to the demultiplexer 510 is a stream signal output from a tuner, a demodulator or an external device interface.

The image processor 520 can process a demultiplexed image signal. For this, the image processor 520 includes a video decoder 525 and a scaler 535.

The video decoder 525 can decode the demultiplexed image signal and the scaler 535 can scale the resolution of the decoded image signal such that the image signal can be displayed.

The video decoder 525 can support various Standard. For instance, the video decoder 525 performs a function of MPEG-2 decoder if a video signal is coded with a MPEG-2 standard. And, the video decoder 525 performs a function of H.264/H.265 decoder if a video signal is coded with a DMB (Digital Multimedia Broadcasting) method or H.264/H.265 standard.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a user interface image of the digital device, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

The digital device is exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention.

The digital device is an example of image signal processors which process an image stored therein or an input image. Other examples of the image signal processors may include a set-top box (STB) which does not include the display unit 380 and the audio output unit 485 shown in FIG. 4, a DVD player, a Blu-ray player, a game device, a computer, etc.

Figure 6:
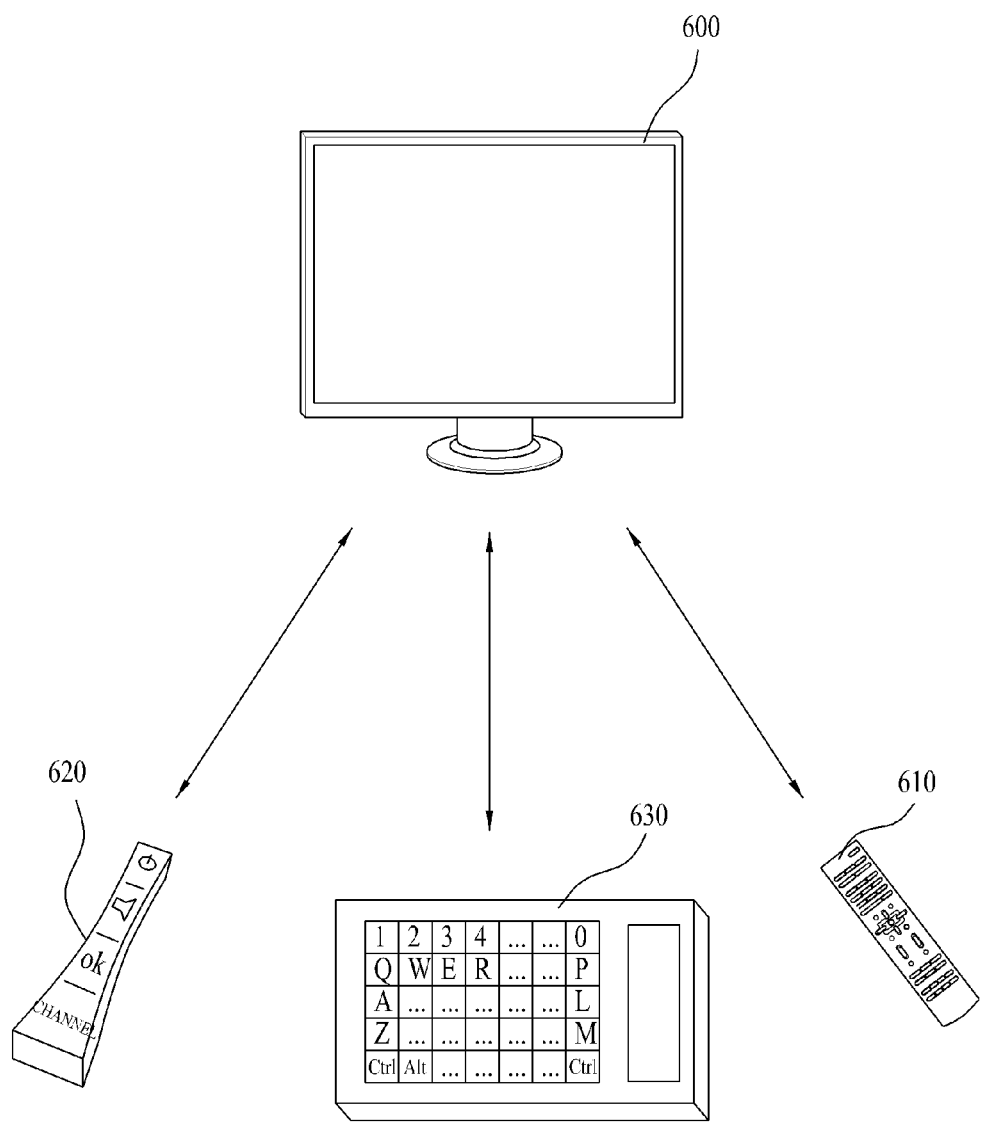
FIG. 6 is a diagram illustrating an inputter connected to the digital device of FIGS. 2 to 4 according to an embodiment of the present invention.

FIG. 6 illustrates remote controllers of a digital device according to an embodiment of the present invention.

To control the digital device, a front panel (not shown) equipped to the digital device 600 or control means (input means) is used.

Moreover, the control means is a user interface device (UID) capable of communicating with a wire/wireless communication, and includes a remote controller 610, a keyboard 630, a pointing device 620, a touch-pad for controlling the digital device 600. Further the control means includes a control mean dedicated to an external input which is connected to the digital device 600. Besides, the control means includes a mobile device like a smart phone and a tablet PC controlling the digital device 600 by switching a mode. Hereinafter, the present disclosure can specify the pointing device as an embodiment of the present invention.

The remote controllers can use various communication protocols such as Bluetooth, RFID, IrDA, UWB, ZigBee, DLNA, etc.

The remote controller 610 is a general input means including a various and necessary key buttons for controlling the digital device 600.

The pointing device 620 may include a gyro sensor mounted therein to sense vibration of a user's hand or rotation. That is, the pointing device 620 can move a pointer according to up, down, left and right motions of the user. The pointing device 620 is named to a magic remoter controller, a magic controller or the like.

The keyboard 630 UIDs can include a mobile device (e.g., a smart phone, a tablet PC, and the like), a magic remote controller 620 and a remote controller 630 equipped with a keyboard and a touch pad in addition to a general remote controller 610.

The remote controller 630 including the keyboard and touch pad can facilitate text input through the keyboard and control of movement of a pointer and magnification and reduction of a picture or video through the touch pad.

The digital device described in the present specification can be operated by based on Web OS platform. Hereinafter, a Web OS based process or algorithm may be performed by the controller of the above-described digital device. The controller includes the controllers of FIGS. 2 to 5 and has wide concepts. Accordingly, hereinafter, a component for processing Web OS based services, applications, content, etc., including software, firmware or hardware in a digital device is referred to a controller.

Such a Web OS based platform may improve development independency and functional extensibility by integrating services, applications, etc. based on a Luna-service bus, for example, and increase application development productivity based on web application framework. In addition, system resources, etc. may be efficiently used via a Web OS process and resource management to support multitasking.

A Web OS platform described in the present specification may be available or loaded not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
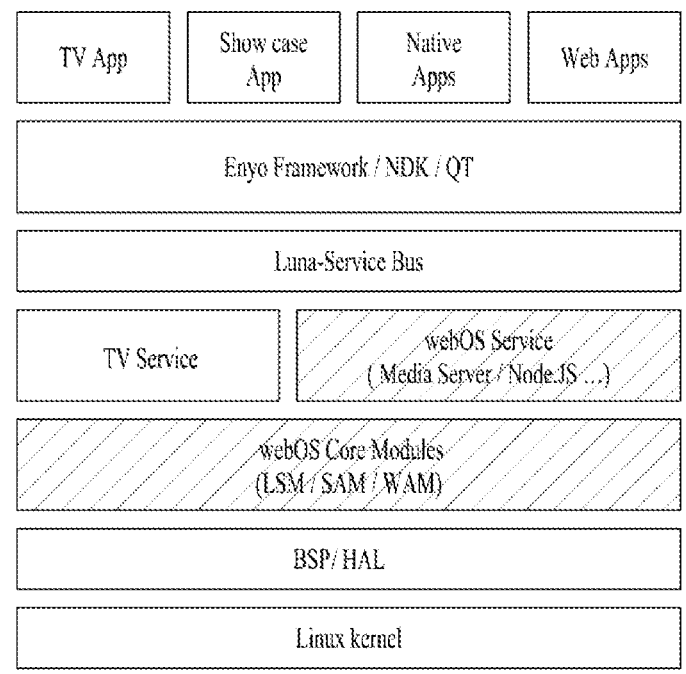
FIG. 7 is a diagram for explanation of a web OS architecture according to an embodiment of the present invention.

FIG. 7 is a diagram illustrating Web OS architecture according to one embodiment of the present invention.

The architecture of a Web OS platform will now be described with reference to FIG. 7.

The platform may be largely divided into a kernel, a Web OS core platform based on a system library, an application, a service, etc.

The architecture of the Web OS platform has a layered structure. OS is provided at a lowest layer, system library(s) are provided at a next highest layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a Web OS core modules layer, a service layer, a Luna-service bus layer and an Enyo framework/native developer's kit (NDK)/QT layer are sequentially provided. At the highest layer, an application layer is provided.

One or more layers of the above-described Web OS layered structure may be omitted and a plurality of layers may be combined to one layer and one layer may be divided into a plurality of layers.

The Web OS core module layer may include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications.

The WAM is based on Enyo framework, because a Web OS regards a web application as a basic application.

An application may use a service via a Luna-service bus. A service may be newly registered via a bus and the application may detect and use a desired service.

The service layer may include services having various service levels, such as a TV service, a Web OS service, etc. The Web OS service may include a media server, Node.JS, etc. and, in particular, the Node.JS service supports JavaScript, for example.

The Web OS service may be communicated to a Linux process implementing function logic via a bus. This Web OS service is largely divided into four parts, migrates from a TV process and an existing TV to a Web OS, is developed as services which differ between manufacturers, Web OS common services and Javascripts, and is composed of the Node.JS service used via Node.JS.

The application layer may include all applications supportable by a digital device, such as a TV application, a showcase application, a native application, a web application, etc.

Applications on the Web OS may be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or may be developed and performed based on general HTML5, cascading style sheets (CSS) and Javascripts.

The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a native application based on Qt and includes basic applications provided along with the Web OS platform, such as card view, home dashboard, virtual keyboard, etc. QML is a markup language of a script format, not C++.

The native application is an application which is developed and compiled using C/C++ and is executed in the binary form and has an advantage such as high execution speed.

Figure 8:
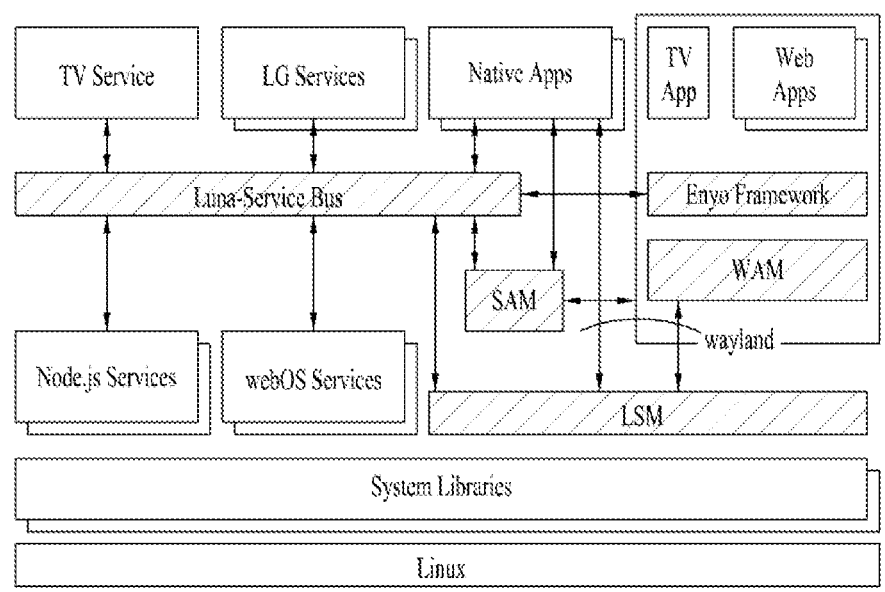
FIG. 8 is a diagram for explanation of an architecture of a web OS device according to an embodiment of the present invention.

FIG. 8 is a diagram illustrating the architecture of a Web OS device according to one embodiment of the present invention.

FIG. 8 is a block diagram based on a runtime of a Web OS device and is described with reference to the layered structure of FIG. 7.

Hereinafter, a description will be given with reference to FIGS. 7 and 8.

Referring to FIG. 8, services, applications and Web OS core modules are included on a system OS (Linux) and system libraries and communication therebetween may be performed via a Luna-service bus.

Node.JS services based on HTML5 such as e-mail, contact or calendar, CSS, Javascript, etc., Web OS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, Now on, notification, search, auto content recognition (ACR), contents list browser (CBOX), wfdd, digital media remastering (DMR), remote application, download, Sony Philips digital interface format (SDPIF), etc., native applications such as PDK applications, browsers, QML applications, a UI-related TV applications based on Enyo framework and web applications are processed via Web OS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, data management system (DMS), DVR, Cloud server, etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and may provide a window management mechanism for 21:9 and a multi-window.

The LSM supports implementation of a system UI based on a QML and improves development productivity. QML UX may easily configure a view using a screen layout and UI components based on model view controller (MVC) and easily develop code for processing user input. An interface between the QML and the Web OS component is achieved via a QML extensibility plug-in and graphic operation of an application may be based on Wayland protocol, luna-service call, etc.

The LSM is an abbreviation for a Luna surface manager and functions as an application window compositor.

The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, Recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, ACR, etc.

Figure 9:
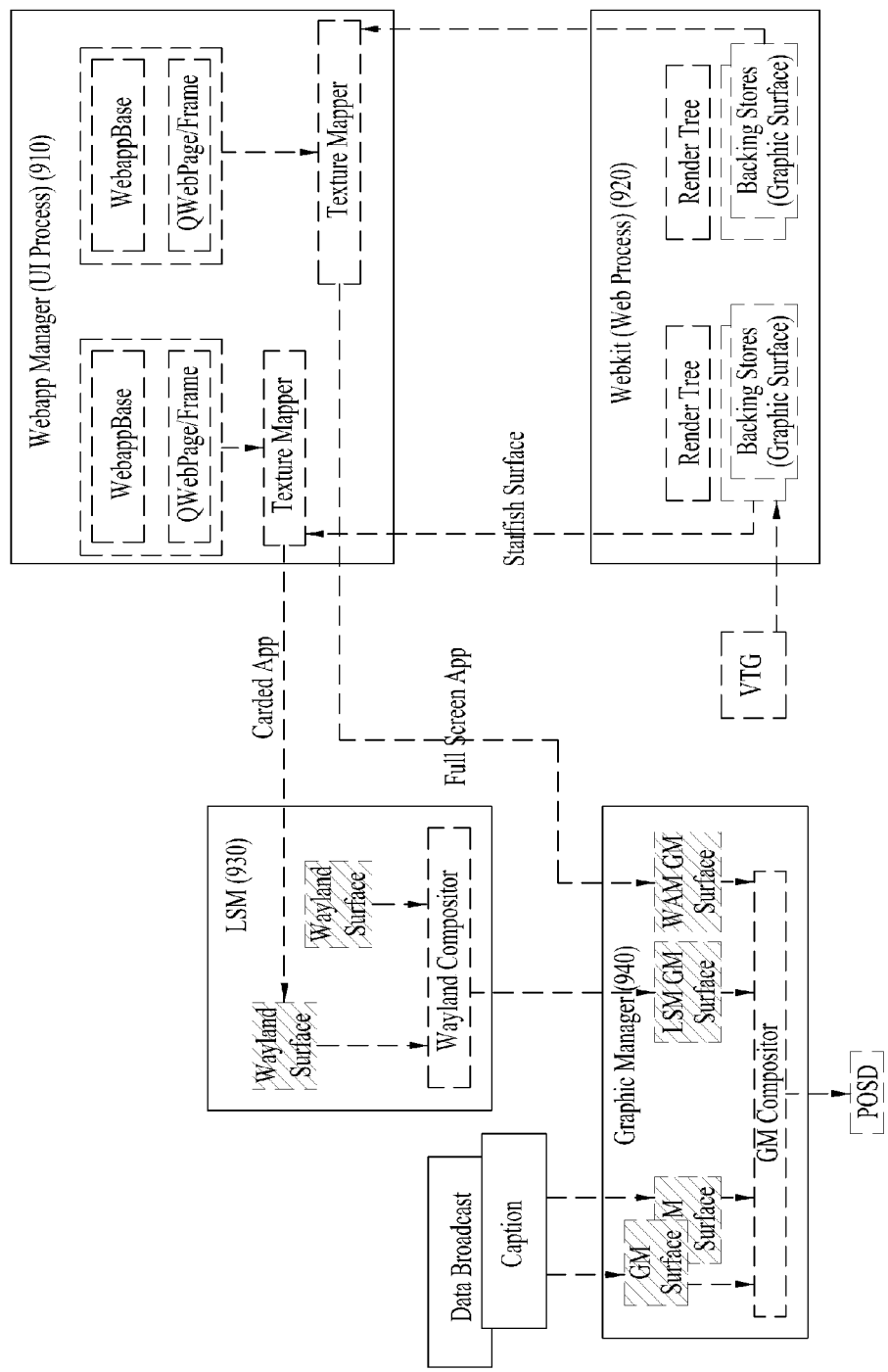
FIG. 9 is a diagram for explanation of a graphic composition flow in a web OS device according to an embodiment of the present invention.

FIG. 9 is a diagram illustrating a graphic composition flow in a Web OS device according to one embodiment of the present invention.

Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a full-screen application. The web application manager 910 receives an application generated by the WebKit 920 in order to share a graphic processing unit (GPU) memory for graphic management between the UI process and the web process and delivers the application to the LSM 930 if the application is not a full-screen application. If the application is a full-screen application, the LSM 930 may bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The full-screen application is directly delivered to the graphics manager 940 without passing through the LSM 930 as described above and is processed in the graphics manager compositor via the WAM GM surface.

The graphics manager processes and outputs all graphics data in the Web OS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
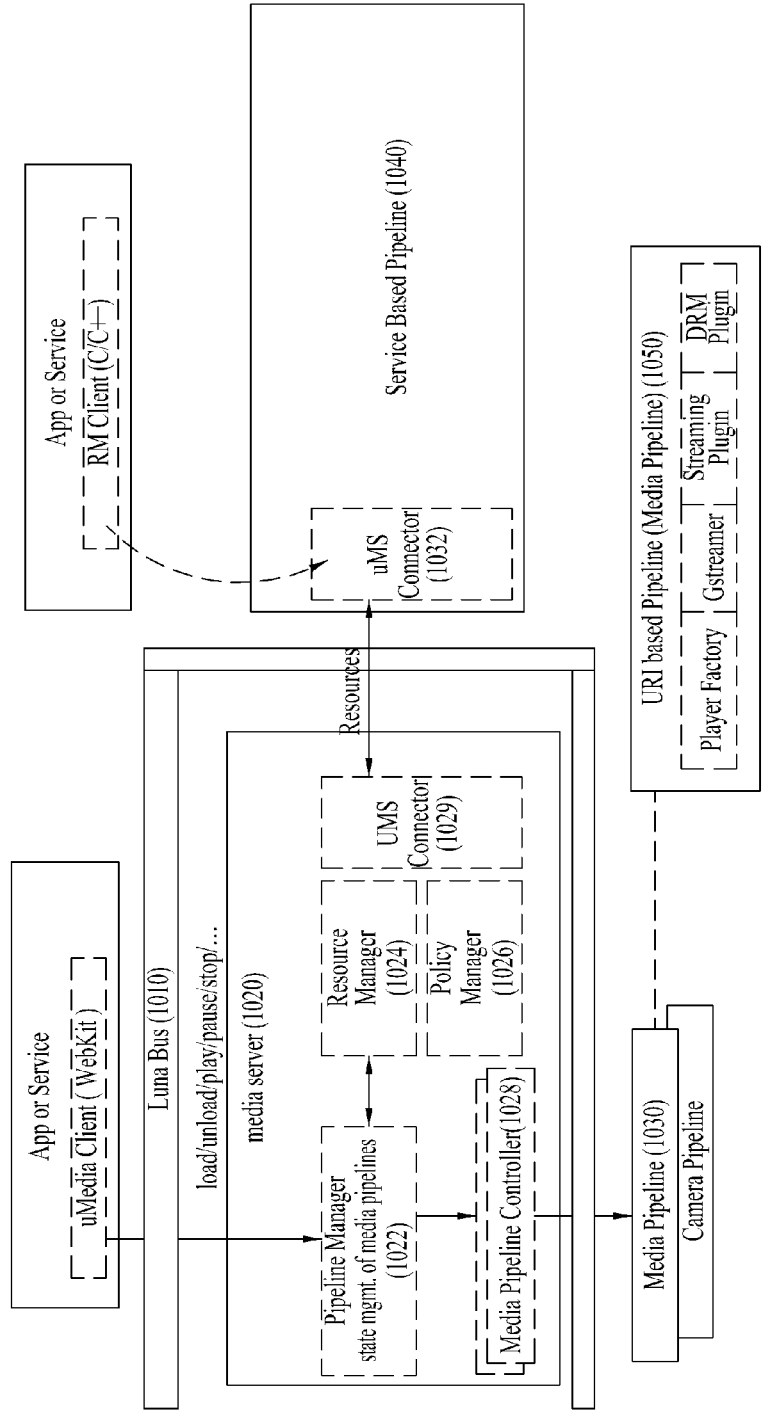
FIG. 10 is a diagram for explanation of a media server according to an embodiment of the present invention.
Figure 11:
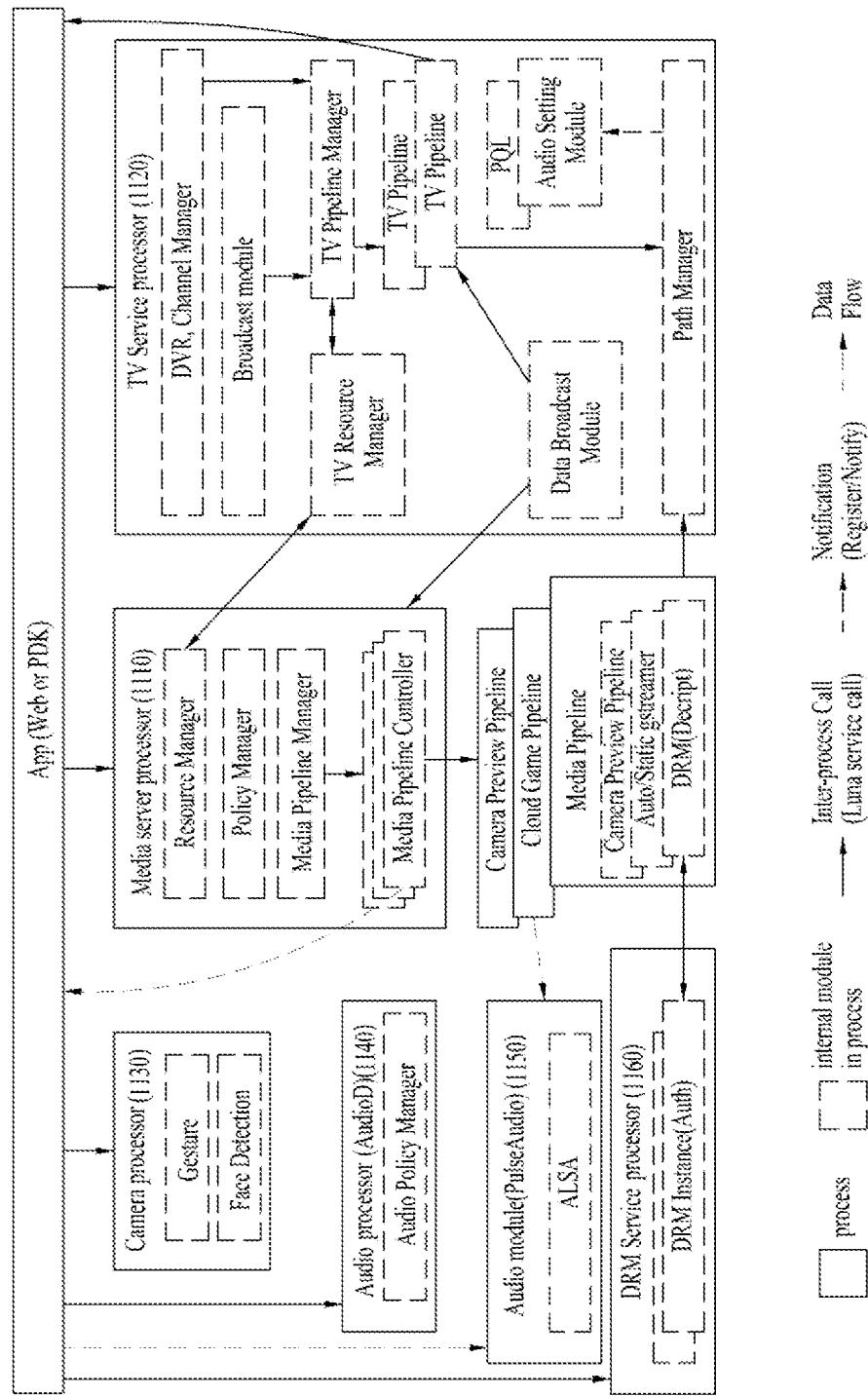
FIG. 11 is a diagram for explanation of a block diagram of a media server according to an embodiment of the present invention.
Figure 12:
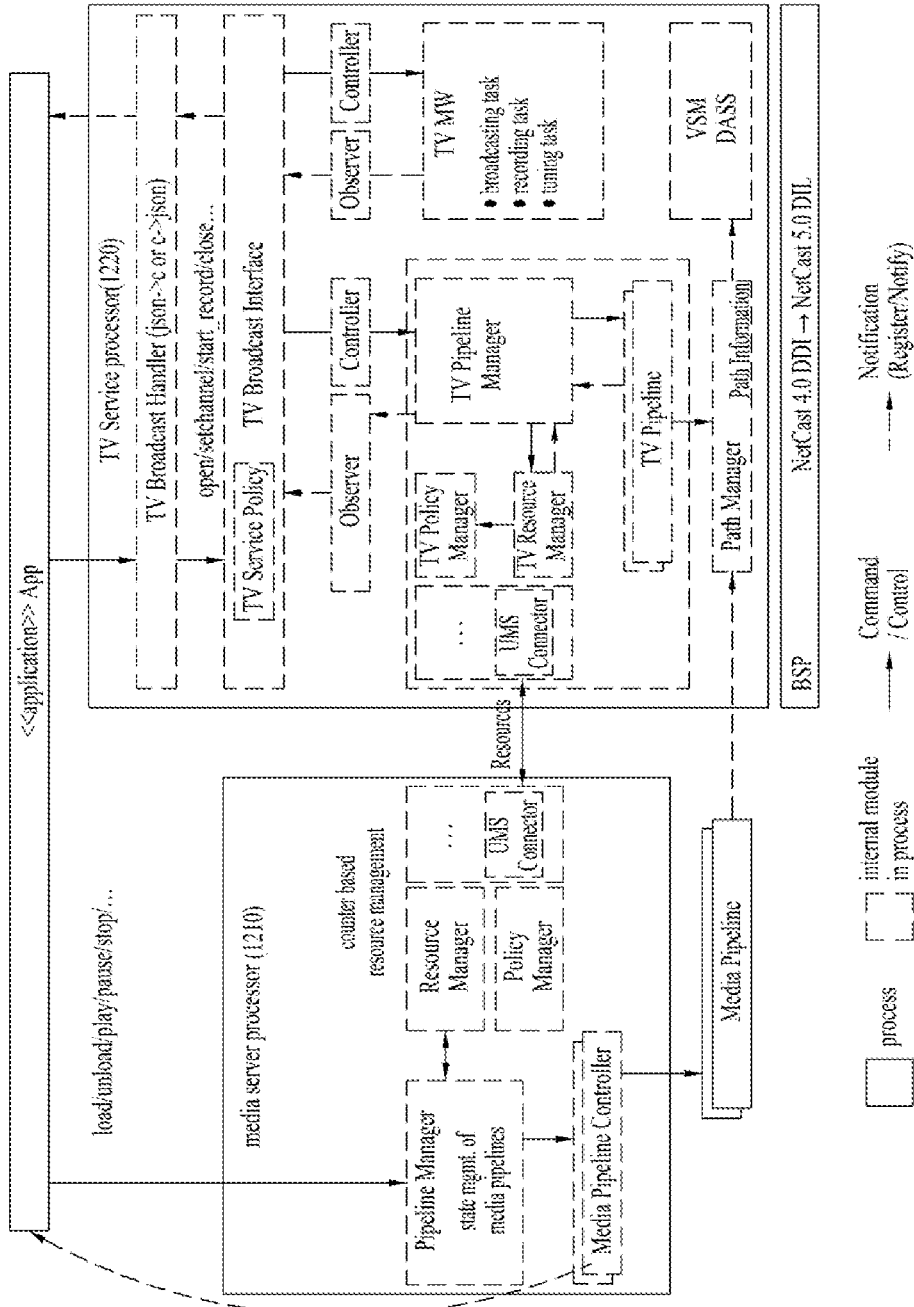
FIG. 12 is a diagram for explanation of a relationship between a media server and a TV service according to an embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robust, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc.

The media server may have extensibility and may add a new type of pipeline without influencing an existing implementation method. For example, the media server may accommodate a camera pipeline, a video conference (e.g., Skype) pipeline, a third-party pipeline, etc.

The media server may process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media.

The media server is responsible for playing back a HTML5 standard media.

The media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task.

The media server is also referred to as uMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server may manage pipeline controller resources.

The media server supports extensibility, reliability, efficient resource usage, etc., for example.

In other words, the uMS, that is, the micro media server, manages and controls resource usage for appropriate processing within the Web OS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

The pipeline may be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and may exchange data with the media server 1020 or the pipeline via the clients.

The clients include a uMedia client (WebKit) for connection with the media server 1020 and a resource manager (RM) client (C/C++), for example.

The application including the uMedia client is connected to the media server 1020 as described above. More specifically, the uMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026.

The pipeline manager 1022 requests to generate a pipeline for operation according to the request of the uMedia client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smarthshare playback, thumbnail extraction, NDK, cinema, multimedia and hypermedia information coding experts group (MHEG), etc.

The pipeline may include a service-based pipeline and a URI based pipeline (media pipeline), for example.

Referring to FIG. 10, the application or service including the RM client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this case, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows.

An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used.

A method of using a service in PDK may be used.

Alternatively, a method of using in existing CP may be used. For backward compatibility, plug-in of an existing platform may be extended and used based on Luna.

Lastly, an interface method using a non-Web OS may be used. In this case, a Luna bus may be directly called to perform interfacing.

Seamless change is processed by a separate module (e.g., TVwin) and refers to a process of first displaying a TV program on a screen without a Web OS before or duration Web OS booting and then performing seamless processing. This is used for the purpose of first providing a basic function of a TV service, for fast response to a power-on request of a user, because a booting time of a Web OS is late. The module is a part of a TV service process and supports seamless change for providing fast booting and a basic TV function, factory mode, etc. The module is responsible for switching from the non-Web OS mode to the Web OS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1150. The application or a pipeline related thereto may notify the audio module 1150 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1160 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (MW), a path manager and a BSP (NetCast). The service processor may mean a module including a TV pipeline manager, a TV resource manager, a TV policy manager, a USM connector, etc., for example.

In the present disclosure, the TV service processor may have the configuration of FIG. 11 or FIG. 12 or a combination thereof. Some components may be omitted or other components (not shown) may be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this case, the TV broadcast interface may transmit the data or file passing through the TV broadcast handler to the TV pipeline manager based on TV service policy and refer to the data or file upon generating a pipeline.

A Terminal below of TV broadcast interface included in TV service processor 1220 of FIG. 12 is detailed described as follows.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210.

The TV pipeline manager arranges returned resources included in a generated TV pipeline, registers pipeline information to a path manager. Then, the TV pipeline manager returns a resultant to the TV pipeline manager. The pipeline manager returns the pipeline to TV broadcast interface.

TV broadcast interface requests a channel change by communicating a TV middleware (M/W). The TV middleware returns a resultant.

TV service can be processed as described process above.

The TV pipeline manager generates one or more pipelines in response to the TV pipeline generation request from a process module or manager in the TV service. At this time, the TV pipeline manager can be controlled by the TV resource manager. The TV resource manager can be controlled by the TV policy manager so as to request status and assignment of a assigned resource for TV service according to generating TV pipeline of TV pipeline manager. And, The TV resource manager can communicated via the media server processor 1110/1210 and uMS connector. The resource manager in the media server processor 1110/1210 transfers status and assignability of the resource for a current TV service to a TV resource manager. For example, if a resource for TV service is already assigned based on the determination of resource manager included in the media server processor 1110/1210, the resource manager can notify that the resource for the TV service was already assigned to the TV pipeline manager. At this time, the resource manager included in the media server processor can eliminate some TV pipeline among assigned pipelines for the TV service according a priority or standard and request or assign generating new TV pipeline for the requested TV service. Or, TV resource manager can properly eliminate, add or generate TV pipeline according to a status report of resource manager included in the media server processor 1110/1210.

The BSP supports backward compatibility with an existing digital device.

The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under control of the path manager. For a detailed description of the processing procedure of the media server processor 1110/1210, refer to the description of FIG. 10 and a repeated description will be omitted. In the present specification, the resource manager in the media server processor 1110/1210 may perform resource management to a counter base, for example.

In the disclosure, the resource manager included in the media server processor 1110/1210, for instance, can manage the resource using a counter base.

The media service design in the Web OS platform as described above is described as follows.

The media server is a media framework supporting to interface the third-party multimedia pipeline(s) with the Web OS platform. The media server can control, manage, isolate or deconflict the resources for compliant the third-party multimedia pipeline(s). The media server provides a generalized API to reproduce media by application, and is a platform module to manage consistently the hardware resource and policy. Also, a design of the media server can generalize a media process and divide a related module for reducing a complexity.

The point of the media server, for example, provides integration between a service interface and a Web OS UI. For this, the media server controls a resource manager, a policy manager and a pipeline manager, and provides API access according to a resource manager query.

A uMS connector is a main API and a SDK to interface client media pipeline processes with the media server. The uMS connector is an event and message related to an interface. The client media pipeline processes can implement client media pipeline status events to enable load, play, pause, seek, stop, unload, release_resource, and acquire_resource.

A uMedia API provides C, C++ API to the media server.

The media resource manager provides a method for describing

The media policy manager operates if a resource manager rejects a media pipeline according to a resource conflict. The policy manager can provide a consistent API and SDK to be possible a third-party manager. The policy manager supports media pipelines matched with LRU (least recently used), can be used the media pipelines for one or more conflicted resources.

The pipeline manager traces client media pipelines and then maintains. The pipeline controller provides a consistent API to a pipeline manager for controlling and managing client media pipelines.

The media server communicates with the resource manager using a library call. The resource manager can communicate with TV services and media pipeline via a Luna service bus.

The media resource manager configures a total configurable configuration file for describing a media hardware and media client pipelines. The media resource manager can detect a resource conflict and can collect all information necessary for implement a media policy management.

The media policy manager reads policy_select field and a policy_action field of a resource configuration file. The resource contention tries to select active pipeline which is specified by the policy_select field. The media policy manager issue problem on outgoing/selected pipelines based on the policy_action field. A reference of the selection can be a parameter supported by a pipeline configuration setting entry. The policy actions include a unload command and a release command. All pipelines support the unload command to release all resources assigned. The pipeline can additionally support the release command to release a specific resource. Here, the release command is for fast switch pipelines which are competed with common resources, and incoming pipeline and deconflict cannot require the unload command of all resources.

The pipeline manager manages a pipeline controller. The pipeline manager maintains a running queue of the pipeline controller and provides a unique indexing for incoming message from application(s) via the media server.

The pipeline controller maintains a relationship of a related media client pipeline process. The pipeline controller maintains all related status and provides media client pipeline control interface to a pipeline manager. The pipeline client process is an individual process using a uMS connector to provide control interface to media server, etc. The pipeline (client) media technology (Gstreamer, Stage Fright) can be independent with media server management and services and can be perfectly decoupled.

Figure 13:
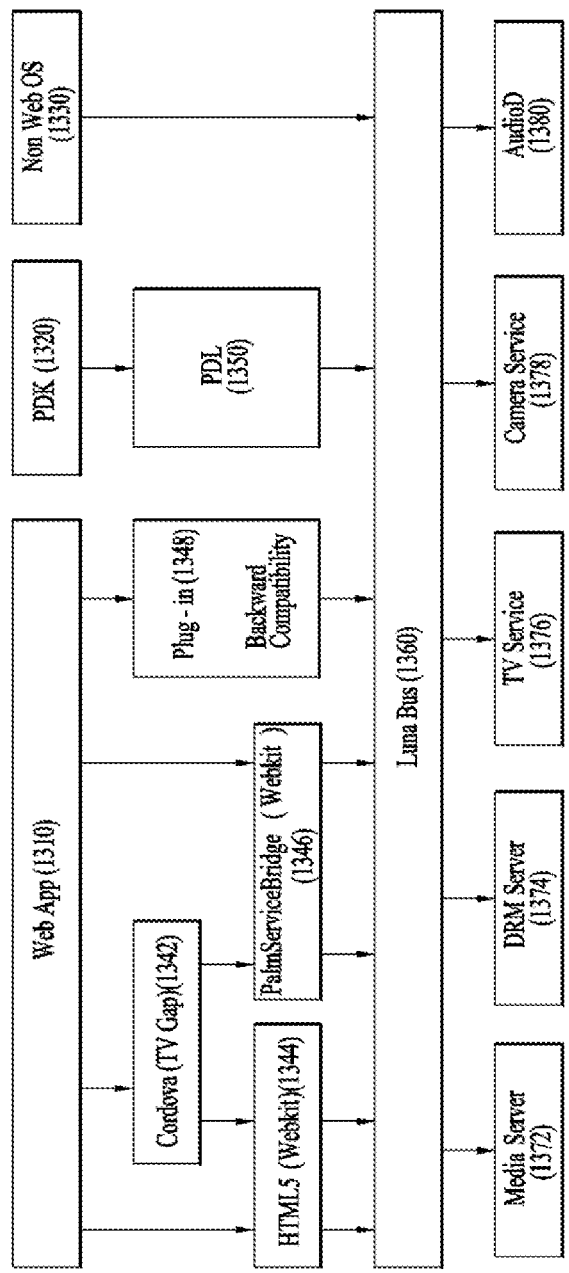
FIG. 13 is a diagram for explaining an interfacing method between an application and media services according to one embodiment of the present invention.

FIG. 13 is a diagram for explaining an interfacing method between an application and media services according to one embodiment of the present invention.

Referring to FIG. 7 mentioned earlier, a service on a web OS can perform communication via a bus using a Linux process in which a functional logic is implemented. An application on the Web OS can be classified into a web application, a PDK (palm development kit) application, a QML (Qt Meta Language or Qt Modeling Language) application, and the like depending on an implementation method. The web application is performed on WAM runtime based on a webkit engine. The web application can be performed in a manner of being developed based on Enyo framework, a general HTML5, a CSS (cascading style sheets), or JavaScript. The PDK application includes a native application which is developed based on PDK provided for $3^{rd}$-party or an external developer. The QML application corresponds to a Qt-based native application and includes a basic application which is provided together with web OD platform, and the like. The native application corresponds to an application which is developed and compiled by C/C++. The native application is performed in a binary form.

In the following, a method of using a service on an application is explained.

First of all, a method of using a service on a web application can be mainly classified into three methods. A first method is to use a HTML5 standard, a second method is to use Cordova, and a third method is to perform Luna call using a palm service bridge. In the foregoing description, the method of using the HTML5 standard may correspond to a video tag, a media element, and the like for example. Meanwhile, the method of using Cordova may correspond to a method of extending a display using a video tag for example.

In other word, referring to FIG. 13, applications 1310/1320 can use a media server 1372 for a media service, a DRM server 1374 for a DRM service, a TV service processing unit 1376 for a TV service, a camera service processing unit 1378 for a camera service, an audio processing unit 1380 for an audio service via a Luna service bus 1360. In this procedure, a web application 1310 uses a Cordova processing unit (TV gap) 1342, a HTML5 processing unit (webkit) 1344, a palm service bridge processing unit (webkit) 1346, and the like. In this case, a legacy CP among the web application 1310 may use a plug-in processing unit 1348 for backward compatibility if necessary. And, the PDK application 1320 uses a PDL processing unit 1350 and a non-web OS application 1330 may be able to use a direct service via the Luna service bus 1360. In particular, if the web application 1310 uses a service based on the aforementioned HTML5 standard, it may be able to use the service in a manner of passing through the HTML5 processing unit (webkit) 1344 and the Luna service bus 1360. Yet, if the web application 1310 uses a service based on the aforementioned Cordova, it may use the service via the Luna service bus 1360 in a manner of passing through the HTML5 processing unit (webkit) 1344 and/or the palm service bridge processing unit (webkit) 1346 in the Cordova processing unit (TV gap) 1342. Lastly, if the web application 1310 uses a service based on the aforementioned palm service bridge, it may be able to use the service via the Luna service bus 1360 in a manner of passing through the palm service bridge processing unit (webkit) 1346. Meanwhile, a method of using a service in the PDK application 1320 can be performed based on PDL. For example, it may be able to use the service by performing Luna call using PDL_ServiceCallWithCallback.

Besides, the non-web OS application can use the service by directly performing Luna call without a separate configuration.

As mentioned in the foregoing description, as shown in FIGS. 11 to 12, an application and a TV service are processed via a media server, a TV service processing unit, or the like. In this procedure, a resource manager, a policy manager, a media pipeline based on the media server, a media pipeline controller, a TV pipeline based on the TV service processing unit, and a TV pipeline controller are used. Meanwhile, as a multi instance, API to which a clear identifier is provided for playing media may include load, unload, exit, play, pause, resume, stop, setproperty, getproperty, and the like. API for playing TV may include open, release, setchannel, channelup, channeldown, start_record, record_stop, and the like.

Figure 14:
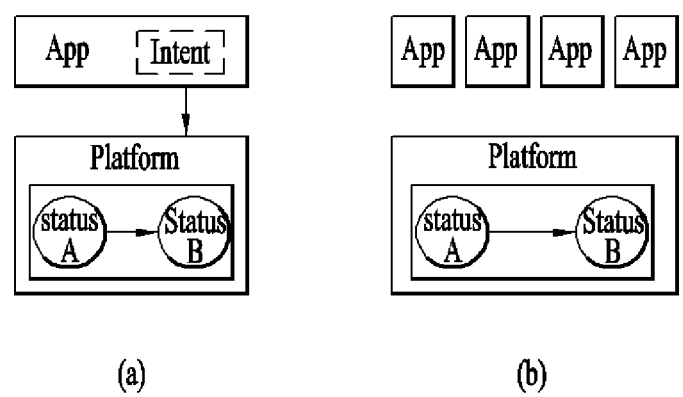
FIG. 14 is a diagram for explaining a baseline between a platform and an application according to one embodiment of the present invention.

FIG. 14 is a diagram for explaining a baseline between a platform and an application according to one embodiment of the present invention.

First of all, a rule at a platform side is explained in the following with reference to FIG. 14a.

A platform manages lifecycle of such a resource as an application, media, TV playback and the like.

The platform manages status changes of resources and can notify precise information to an affected application.

If the status changes of the resources are detected, the platform can guide an action capable of being performed by an application and an event capable of being occurred when the application does not perform the action.

Meanwhile, a rule at an application side is explained in the following. If an application receives a notification on a status change from the platform, the application may ignore the notification or perform an action in response to the notification.

If the application ignores the notification, the application is in charge of an event occurred due to the ignorance. In this case, a side effect of the event may be restricted to the application only. Similarly, the application may have a right capable of ignoring an action with an intention.

Referring to FIG. 14b, if an application ignores a specific status change, a side effect may not be restricted to the application and may affect the whole of the platform or other applications.

In this case, responsibility and a right for the status change can be internally managed by the platform. Or, a minimum exceptional process, which does not affect the platform, can be performed.

Meanwhile, a baseline between a service and an application is explained in the following. For example, when MVC (or MVP) is implemented, a location of a controller is explained in the following.

First of all, a controller of a service is determined with reference to a status, a condition and the like of a model (logic) in the service. In case of a policy irrespective of an application, the policy is processed by a controller in a service. As an example, if a bad video occurs, a mute process can be performed on AN.

On the contrary, in case of a UI policy in an application or an application-dependent policy, the policy can be processed in the application. In this case, although the application is modified, it may not affect a service.

In the following, a platform and a baseline on a media between applications according to the present invention are explained.

First of all, a case A corresponds to a case that an application playing a media is switched to a background from a foreground or the application is switched back to the foreground from the background.

In the former case, the application playing a media receives a background notification before the application is switched to the background. In this case, the application can autonomously pause the media in a state of playing the media. If the application does not autonomously pause the media, although audio playing is maintained and a video is automatically hidden by Z-order, a bandwidth is occupied. As an example, in case of an MP3 player application, although the MP3 player application is switched to the background, audio playing can be maintained.

In the latter case, the application switched to the background can be switched back to the foreground. In this case, the application receives a notification before the application is switched back to the foreground. If the notification is received, the application can play the autonomously paused media again. In this case, for example, the media can be played again from the timing at which the media is paused. Meanwhile, if the application does not play the media, the application outputs the media to a user in a state that the media is paused. The media can be played upon a request of the user.

A case B corresponds to a case that an application competes with a different application for a resource in the background and a resource is forcibly released or a case that the application is switched back to the foreground again.

In the former case, if an application competes with a different application for a resource in the background and the resource is forcibly released, a media server unloads a media by force. And, the media server can notify the application of a fact that the media is unloaded due to the shortage of resource after the forcible unloading. In this case, having received the notification on the fact that the media is unloaded due the shortage of resource from the media server, the application can properly perform an exceptional process such as a notification pop-up exposure, or the like.

On the contrary, in the latter case, if the application of which the resource is released is switched back to the foreground, loading is autonomously requested not by the media server but by the application. Yet, if the application does not autonomously request the loading, the application outputs an unloaded state to a user and may follow a request of the user.

Regarding this, it shall be explained in more detail with reference to the attached drawing.

FIGS. 15 to 19 are diagrams for explaining a run-time view between an application and a media service according to one embodiment of the present invention.

Figure 15:
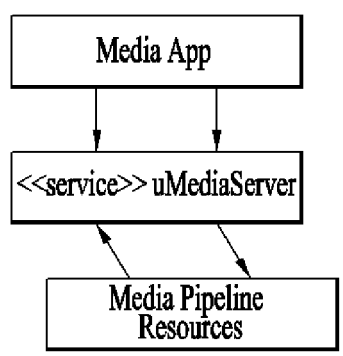
FIGS. 15 to 19 are diagrams for explaining a run-time view between an application and a media service according to one embodiment of the present invention.
Figure 16:
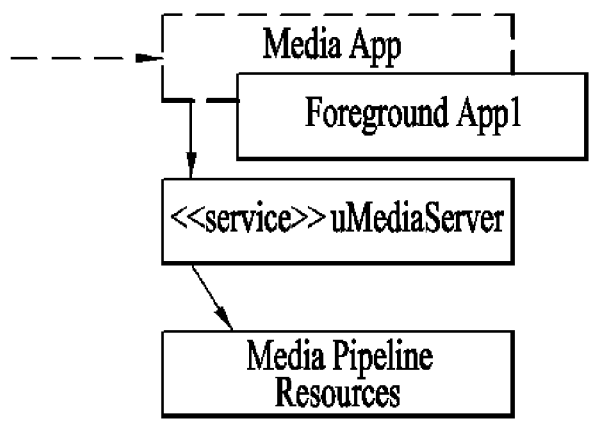
Figure 17:
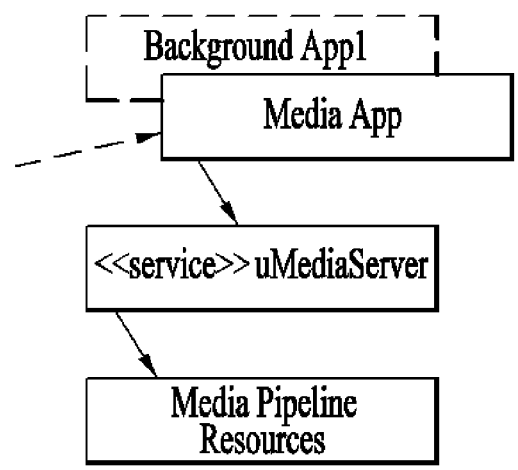
Figure 18:
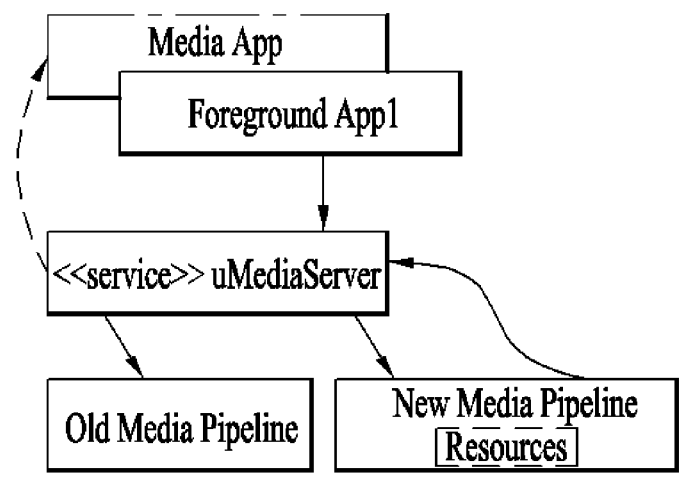
Figure 19:
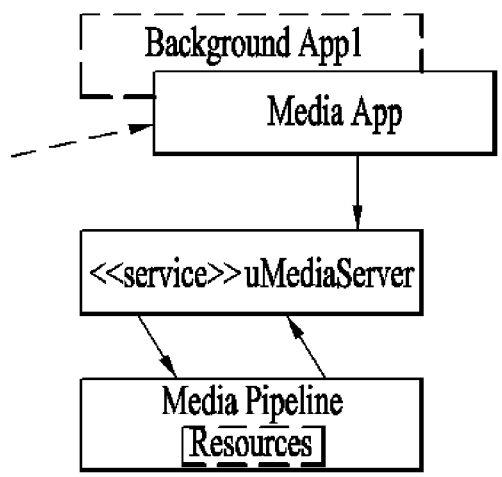

FIGS. 15 to 17 are diagrams for a run-time view for the aforementioned case A and FIGS. 18 to 19 are diagrams for a run-time view for the aforementioned case B.

First of all, FIG. 15 is a diagram for a run-time view in case of load and play in a media application. If the media application sends a load request to a media server, the media server generates a media pipeline and obtains a resource for the generated media pipeline. Subsequently, the media application sends a play request.

FIG. 16 is a diagram for a run-time view in case that the media application playing a media in the foreground in FIG. 15 is switched to the background. The media application receives a notification on a fact that the media application is switched to the background from the foreground from a system manager. Subsequently, the media application sends a pause request to a media server and the media server delivers the received pause request to a media pipeline.

Similar to FIG. 16, FIG. 17 is a diagram for a run-time view in case that the application is switched back to the foreground from the background. As mentioned in the foregoing description, the media application receives a notification on a fact that the media application is switched back to the foreground from the system manager. Then, the media application sends a play request to a media server and the media server delivers the received request to a media pipeline.

FIG. 18 is a diagram for a run-time view in case that a pre-allocated resource is released due to a relation between a media application in the background and a different application. When the media application is in the background, if a foreground application (a new application rather than the media application) sends a load request to a media server, the media server makes a request for generating a new media pipeline according to the load request of the foreground application. In this case, it is necessary to allocate a resource for the newly generated media pipeline. Then, there exists a competitive relation between the resource allocated to the newly generated pipeline and a resource allocated to a previously generated media pipeline. In this case, if a resource is allocated to the newly generated media pipeline instead of the legacy media pipeline (old media pipeline), the media server sends an unload indication to the legacy media pipeline according to the resource allocation for the new media pipeline and the legacy media pipeline releases a resource. And, the media server notifies the media application of occurrence of a unload event.

FIG. 19 is a diagram for a run-time view in case that a media application in the background is switched back to the foreground. If the media application receives a notification on a fact that the media application is switched to the foreground from a system manager, the media application sends a load request to a media server. The media server generates a new media pipeline instead of the media pipeline which is eliminated according to the resource release in FIG. 18. The new media pipeline makes a request for a resource to the media server and acquires the resource. Subsequently, the media application in the foreground sends a play request to the media server.

In the foregoing description, run-time views between an application and a media server have been depicted and explained. In the following, a run-time view between an application and a TV service is explained.

FIGS. 20 to 23 are diagrams for explaining a run-time view between an application and a TV service according to one embodiment of the present invention.

In the following, a run-time view between an application and a TV service is explained. In particular, a run-time view is explained based on the TV service. Instead of the media server, a TV service processing unit performs the functions of the media server mentioned earlier in FIGS. 15 to 19.

In this case, a TV service is explained instead of the aforementioned media service. Hence, a run-time view for such a service as channel change, watching reservation and the like is depicted and explained.

Figure 20:
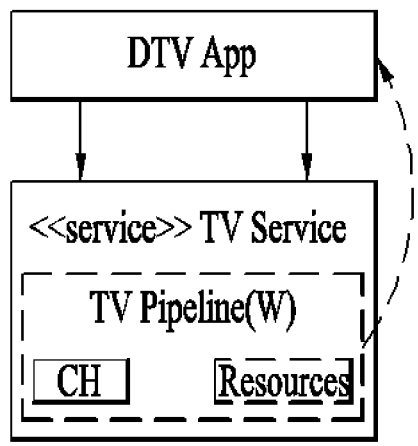
FIGS. 20 to 23 are diagrams for explaining a run-time view between an application and a TV service according to one embodiment of the present invention.

FIG. 20 is a diagram for a run-time view for processing channel change in a TV service, i.e., a DTV application.

A DTV application makes a request for pipeline open to a TV service processing unit to output a broadcasting program of a tuned channel and the TV service processing unit generates a TV pipeline for the channel and gets resource allocation.

Subsequently, the DTV application makes request for channel setting (setchannel) to the TV service processing unit and the TV service processing unit stores a requested channel in the TV pipeline and allocates a resource for the stored channel. In this case, for example, the resource includes a tuner, and the like. Subsequently, a TV media pipeline notifies the DTV application that a video output is available.

Channel change is continuously performed via the aforementioned procedure. In this case, a TV pipeline can be newly generated whenever a channel is changed or it may use a legacy TV pipeline.

Figure 21:
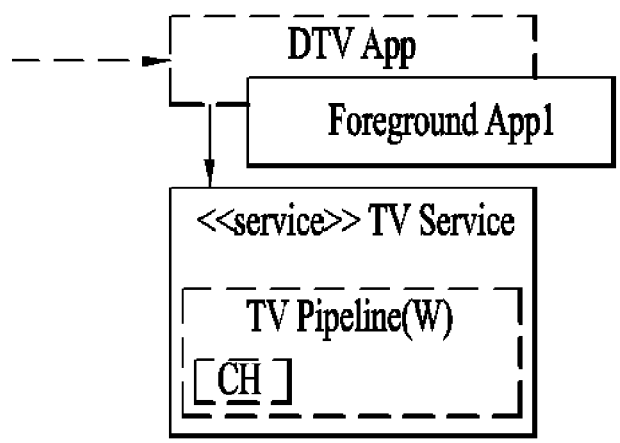

FIG. 21 is a diagram for a run-time view in case that a DTV application for a TV service is switched to the background. If the DTV application receives a notification on the switching to the background from a system manager, the DTV application sends a stop request to the TV service processing unit. If the stop request is received from the DTV application in the background, the TV service processing unit releases a resource allocated to a previously generated TV pipeline.

Figure 22:
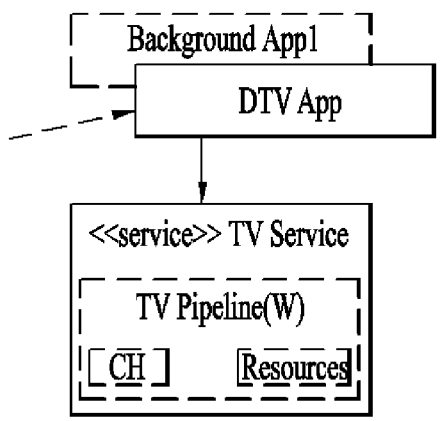

Similar to FIG. 21, FIG. 22 is a diagram for a run-time view in case that a DTV application for a TV service is switched back to the foreground from the background. If the DTV application receives a notification on a fact that the application is switched back to the foreground from the background from the system manager, the DTV application sends a request for channel setting to the TC service processing unit to output a broadcasting program. The TV service processing unit stores a corresponding channel in a previously generated media pipeline and allocates a resource for such a process as channel tuning and the like.

Figure 23:
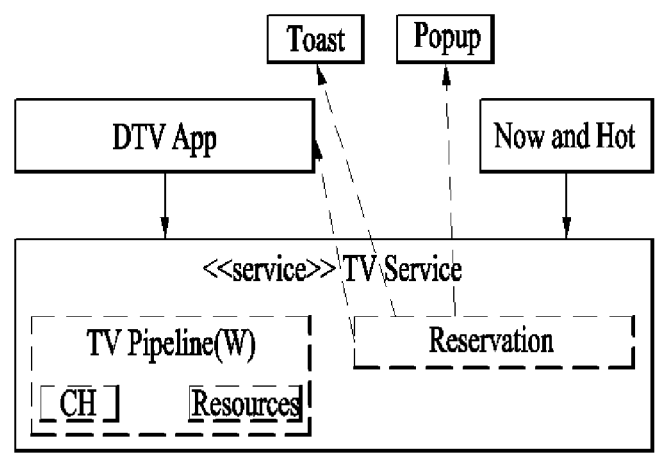

FIG. 23 is a diagram for a run-time view for making a reservation for watching among a TV service. If a TV service processing unit receives a watch reservation request from a client (now and hot), the TV service processing unit outputs a pop-up message on a screen prior to prescribed time (e.g., 1 minute) of the requested watch reservation time to indicate arrival of the watch reservation request time and controls the DTV application to be launched to provide the TV service. Subsequently, if the TV service processing unit provides an emergency message (alert) to a screen using toast, the DTV application makes a request for watch reservation channel setting to the TV service processing unit. The TV service processing unit stores a requested channel in a TV media pipeline and allocates a necessary resource.

Figure 24:
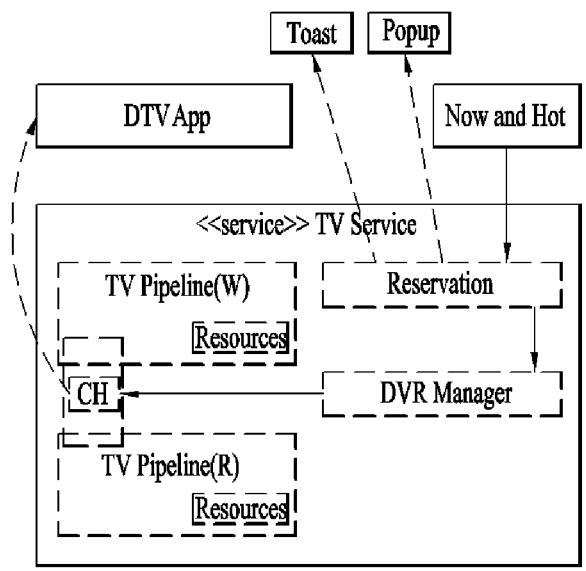
FIGS. 24 to 25 are diagrams for explaining a run-time view between an application and a TV service according to a different embodiment of the present invention.
Figure 25:
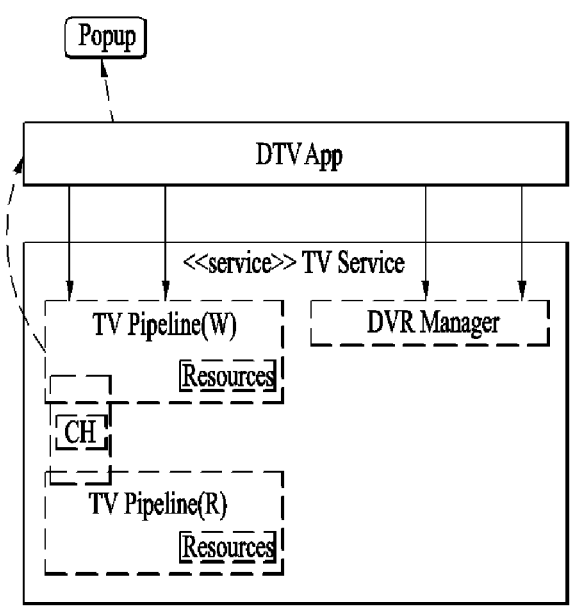

FIGS. 24 to 25 are diagrams for explaining a run-time view between an application and a TV service according to a different embodiment of the present invention.

Unlike FIGS. 20 to 23, FIGS. 24 to 25 are diagrams for a run-time view for processing continuous TV service processes. In particular, FIG. 24 is a diagram for a run-time view for making a reservation for recording after watching and FIG. 25 is a diagram for a run-time view for changing a channel in the middle of recording. In particular, FIG. 24 shows an example of a single tuner for clarity.

Referring to FIG. 24, if a client sends AddReservedRecord request to a TV service processing unit, the TV service processing unit notifies a user of time of starting the additionally requested reservation recording using a pop-up message prior to prescribed time. Subsequently, if a reservation processing unit in the TV service processing unit transmits a startRecord command to a DVR manager, a TV pipeline for recording is newly generated and a resource is allocated. A previously generated TV pipeline for watching and the newly generated TV pipeline for recording share a channel. The DTV manager compares information on the shared channel and a reservation recording requested-channel with each other based on the startRecord command and makes a request for changing a channel for recording. The TV service processing unit notifies the DTV application of a channel change according to the reservation recording.

In this case, as mentioned in the foregoing description, FIG. 24 has been explained under an assumption of a single tuner. In case of a plurality of tuners, it may be able to notify new resource allocation instead of a channel change notification according to resource sharing.

Subsequently, referring to FIG. 25, it shows a run-time view when a channel change request is received in the middle of recording. A DTV application requests a channel configuration, which is requested according to the channel change request, to a TV service processing unit. The TV service processing unit delivers the channel configuration to the TV pipeline for watching and detects resource sharing and a policy. Subsequently, the TV service processing unit notifies the DTV application that channel change according to recording is not available and the DTV application notifies a result for watching selection selected by a user using a pop-up message.

Subsequently, the DTV application requests a recording list to a DVR manager and receives a return of the recording list from the DVR manager. If it is determined as channel change has precedence over a currently recorded channel based on the returned recording list, the DTV application sends a stopRecording request to the DVR manager. The DVR manager delivers the request to the TV pipeline for recording and the TV service processing unit destroys the TV pipeline for recording.

In the foregoing description, various embodiments for a run-time view between an application and a TV service as well as a run-time view between an application and a media service have been depicted and explained.

In the following, resource sharing is explained.

Basically, a function of a TV service is not simply restricted to watching. For example, additional functions such as instant recording, screen capture and the like can be performed at the same time in a manner of being associated with the watching. And, such an operation as reserved recording, second TV ($2^{nd}$ TV), Scart signal output and the like irrespective of the watching can be performed in the background. Besides, operations operated in the background can be performed in a manner of being switched to the foreground.

In the following, an impact of the aforementioned contents that affects resource allocation is explained. For example, if a plurality of operations are performed in a restricted resource situation, a resource conflict phenomenon occurs. The resource conflict phenomenon can be resolved in various ways. As an example, a resource sharing concept for sharing an identical resource is disclosed and explained in the present specification.

For example, in case of a TV service, if TV watching and recording are performed at the same time in a single tuner situation, since there is a single resource, i.e., a tuner, necessary for performing the two operations, a resource conflict occurs. Hence, in this case, it may use resource sharing. Or, if an operation operated in the background is switched to the foreground, the operation can be associated with a watching operation currently executed in the foreground. Hence, a resource conflict may occur. Hence, in this case, it may use resource sharing.

In the following, a characteristic of a shared resource(s) is explained. First of all, since a setting change for a shared resource may affect a different operation, it is necessary to be cautious on controlling. For example, if TV watching and recording are performed at the same time in a single tuner situation, it may perform resource sharing. In this case, when a user intends to change a channel in use, an issue arises. And, when an allocated resource is released due to the resource conflict, an operation operated by a shared resource may affect priority. Regarding this, it shall be explained later in more detail.

In the foregoing description, although the resource sharing has been explained with an example of the TV service, by which the present invention may be non-limited. For example, the concept of the resource sharing can be used not only between a TV service and an operation associated with the TV service but also between a TV service and a media service and between media services. In summary, the resource sharing can be used when a resource conflict occurs due to a restricted resource although a resource(s) is required in the course of using an application and/or a service.

In the following, resource management, policy management and a pipeline related to a resource sharing concept are explained.

Figure 26:
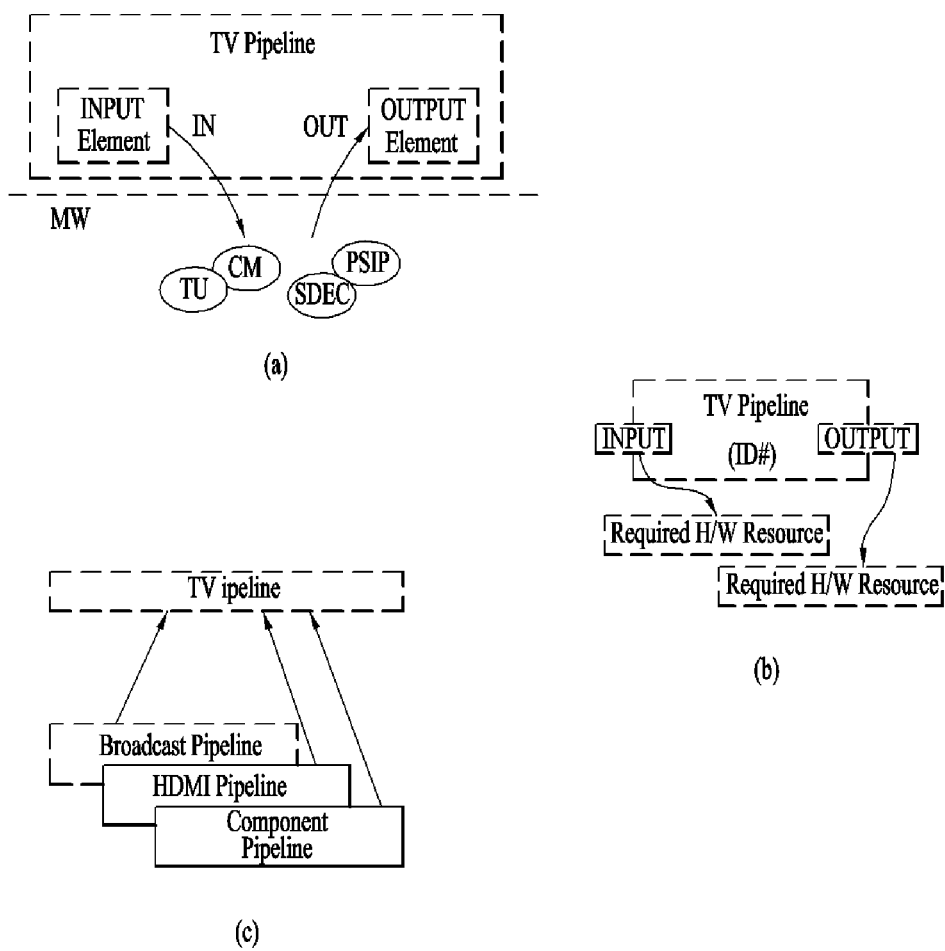
FIG. 26 is a diagram for explaining a structure of a pipeline according to one embodiment of the present invention.

FIG. 26 is a diagram for explaining a structure of a pipeline according to one embodiment of the present invention.

A pipeline can be mainly classified into a media pipeline related to media play and the like and a TV pipeline related to a TV service and the like. In the following, in order to help understanding of the present invention and for clarity of explanation, the TV pipeline is explained as an example.

The TV pipeline has a structure of connected elements respectively including a unique role and characteristic. For example, in case of broadcast, such elements as a tuner, SDEC, PSIP, VDEC, DE and the like can be connected with each other via a pipeline. In this case, for example, the elements may correspond to a resource. In particular, the resource may correspond to a hardware resource.

The elements are implemented based on a thread in the inside of a TV middleware and the elements are organically controlled in a manner of transceiving data and an event with each of modules. Hence, in order to define all of the elements in accordance with a pipeline concept, it may be able to reconstruct the TV middleware.

As a method of reconstructing the TV middleware, as shown in FIG. 26a, it may define an abstract input element and an output element only and a practical connection and control of each element can be performed by the TV middleware.

Meanwhile, the TV pipeline has a unique identifier (ID) according to each instance and a client can control the pipeline via the ID.

FIG. 26a can also be represented as FIG. 26b. Meanwhile, for example, FIG. 26c simply shows that a broadcast pipeline, a HDMI pipeline, and a component pipeline are derived from the TV pipeline.

Meanwhile, a type of the TV pipeline is explained in the following.

FIG. 27 is a diagram for explaining a type of a pipeline according to one embodiment of the present invention.

FIG. 27a shows a media pipeline, FIG. 27b shows a broadcast pipeline, and FIG. 27c shows a HDMI pipeline.

For example, FIG. 27a shows a media pipeline represented in a form of the TV pipeline mentioned earlier in FIG. 26. Since the media pipeline is managed by a media server, the media pipeline can be represented in a form different from a form shown in the drawing or may have a structure different from a structure shown in the drawing.

An input element or a source of the media pipeline may not require a separate hardware resource. As an example, the input element corresponds to URI and an output element corresponds to watching (W). Hence, resources such as VDEC0, ADEC0, DE0 and the like are required.

FIG. 27b shows a broadcast pipeline. A channel corresponds to an input element. Hence, a tuner (TU0) is required. And, DTV watching corresponds to an output element. Hence, resources such as VDEC0, ADEC0, DE0 and the like are required.

Meanwhile, FIG. 27c shows a HDMI pipeline. A HDMI port corresponds to an input element. Hence, a connector resource is required. Meanwhile, HDMI watching (HDMI_W) corresponds to an output element. Hence, RX0, ADC0, ADEC0, DE0 and the like are required.

In FIGS. 27a to 27c, an output element generates a necessary element in each pipeline for watching and it may be able to allocate a necessary hardware resource.

FIG. 28 is a diagram for explaining a definition on a pipeline characteristic according to one embodiment of the present invention. In this case, for clarity, FIG. 28 is explained with an example of a TV broadcast pipeline.

Referring to FIG. 24a, a TV pipeline has a unique identifier (ID1). As mentioned in the foregoing description, the TV pipeline may have an input port and an output port, respectively. In this case, a channel number (CH) can be inputted into the input port and Watch, Record, and the like can be outputted via the output port.

A TV source element related to FIG. 28a can be defined with reference to FIG. 28b. The TV resource element may have resource information obtained from a resource manager and priority information (Resource Infor (Priority)). It may be able to permit a link between resource informations, which are obtained from the resource manager, via Prev and Next fields shown in FIG. 28b.

An operation characteristic of the TV pipeline is explained in the following with reference to FIG. 28c. An action for the TV pipeline can be divided into following steps for configuring two ports. A first step is to input a channel and a second step is to determine an output. In this case, if each step requires a resource, the resource can be obtained by requesting the resource to a resource manager. Subsequently, a TV resource element is generated and the TV resource element is linked with a port. FIG. 28c shows a step after channel setting (setChannel).

Figure 29:
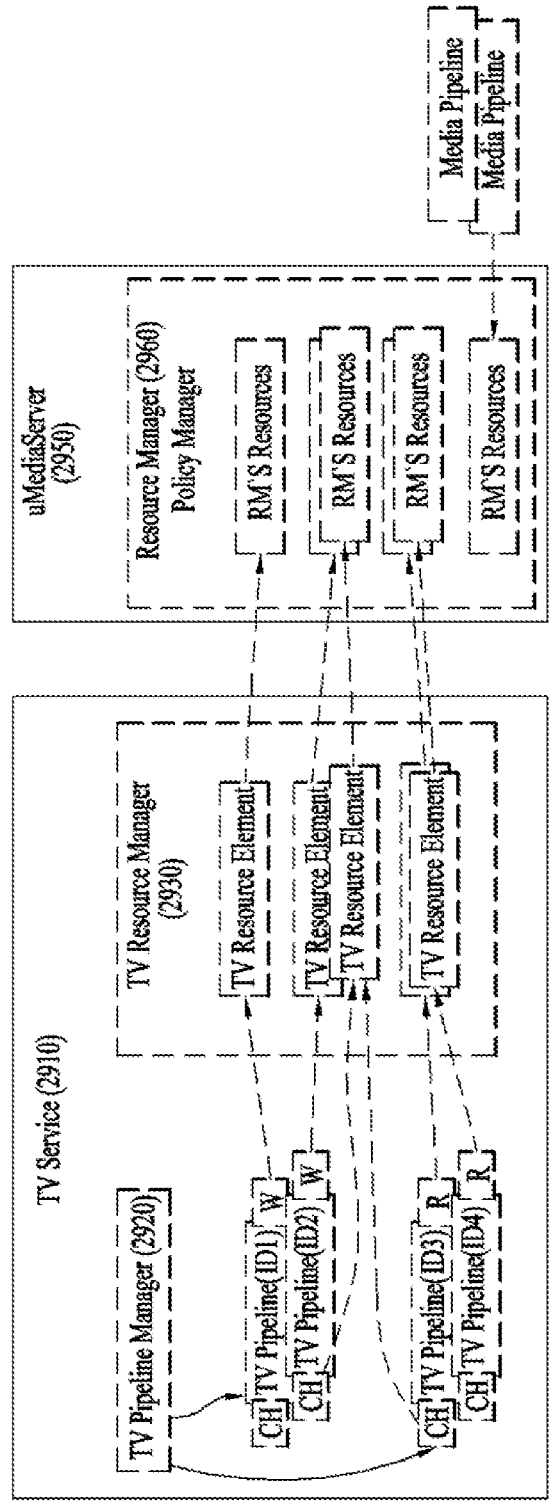
FIG. 29 is a diagram for explaining a relation between a pipeline and a resource manager according to one embodiment of the present invention.

In the following, a relation between a TV pipeline and a resource manager is explained. FIG. 29 is a diagram for explaining a relation between a pipeline and a resource manager according to one embodiment of the present invention.

Referring to FIG. 29, in relation to a pipeline, there exist a TV service processing unit 2910 and a media server 2950.

The TV service processing unit 2910 includes a TV pipeline manager 2920, a TV resource manager 2930, and the like and the media server 2950 includes a resource manager 2960, a policy manager, and the like.

A TV resource element in the TV resource manager 2930 has resource information obtained from the resource manager 2960, the TV resource element and a media pipeline are in a competitive relation, and the TV resource element becomes a target of a policy.

Meanwhile, a TV pipeline managed by the TV pipeline manager 2920 can be generated as many as N numbers (in this case, N corresponds to a positive integer) if resources are sufficient.

And, for example, as shown in the drawing, a port of the TV pipeline is linked with a TV resource element in the TV resource manager 2930.

Meanwhile, the TV resource element can be aliased with a TV pipeline.

Figure 30:
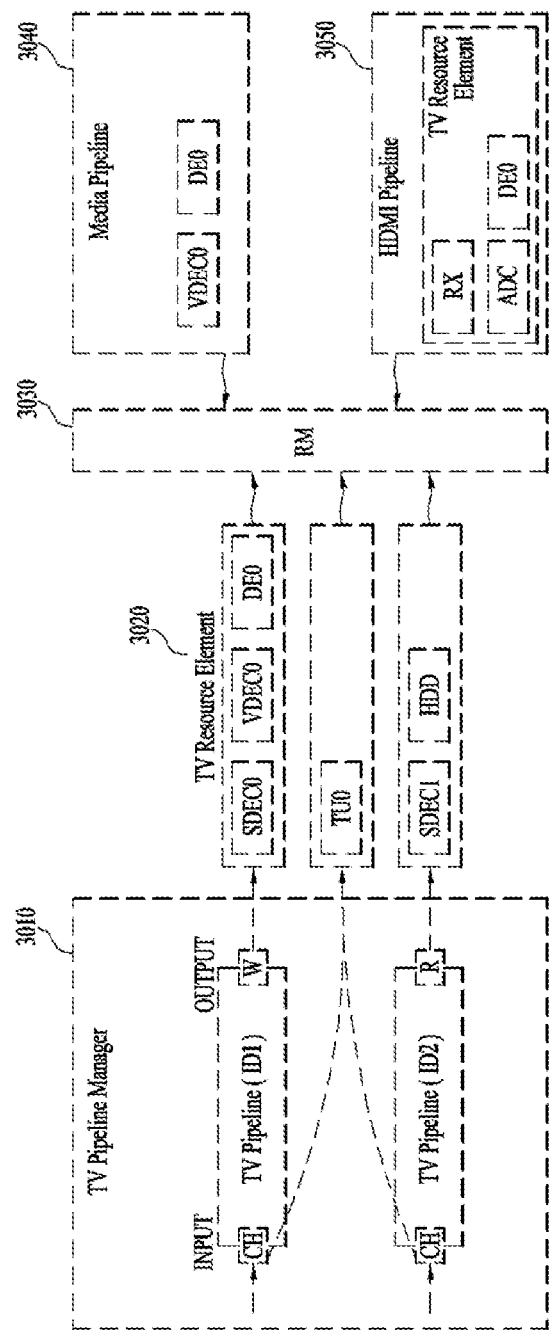
FIG. 30 is a configuration diagram for performing watching and recording at the same time by a TV service according to one embodiment of the present invention.
Figure 31:
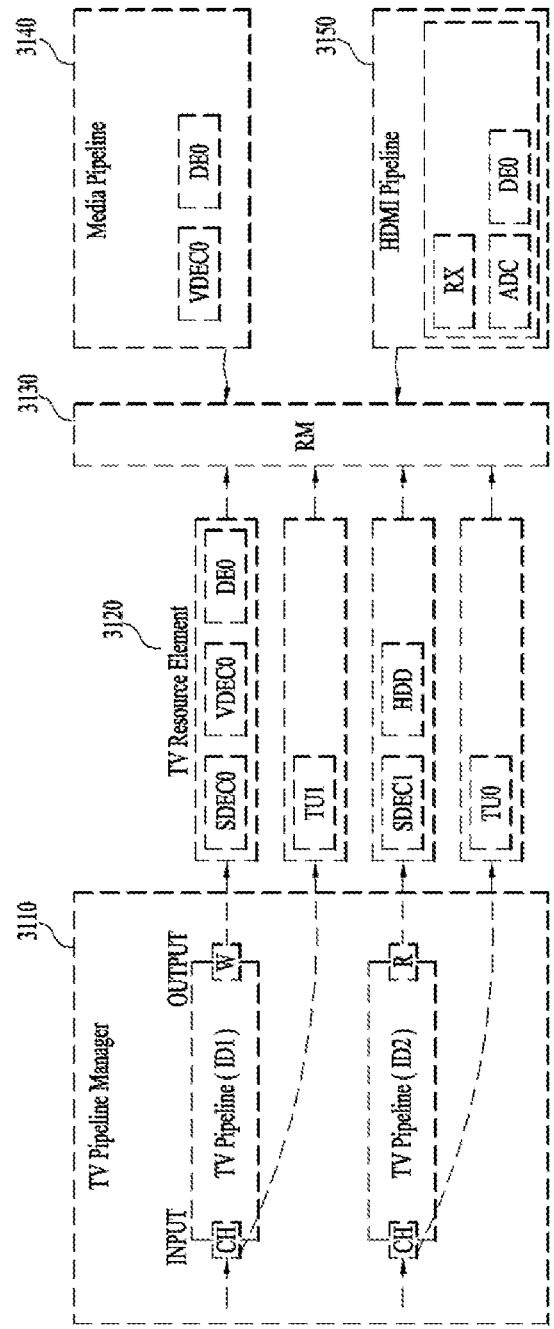
FIG. 31 is a configuration diagram for performing watching and recording at the same time by a TV service according to a different embodiment of the present invention.

FIG. 30 is a configuration diagram for performing watching and recording at the same time by a TV service according to one embodiment of the present invention and FIG. 31 is a configuration diagram for performing watching and recording at the same time by a TV service according to a different embodiment of the present invention.

FIG. 30 shows a single tuner case and FIG. 31 shows a multi tuner case. Hence, a tuner (TU) resource is aliased in FIG. 30 and the tuner resource aliasing is not necessary in FIG. 31. Yet, this is a viewpoint of the tuner resource. In FIGS. 30 and 31, aliasing may occur on at least one or more resources no matter what the resource corresponds to an input port or an output port. Yet, watching & recording operations are explained under an assumption on whether or not aliasing occurs at a tuner resource.

Referring to FIGS. 30 and 31, in order to perform the watching and the recording at the same time, it is necessary to generate a watching pipeline (ID1) and a recording pipeline (ID2), respectively. In this case, each of the pipelines has a unique identifier.

FIG. 30 shows a single tuner case. In this case, both an input port of the watching pipeline and an input port of the recording pipeline are aliased with a TV resource element including a tuner (TU0) resource. On the contrary, FIG. 31 shows a multi tuner case. In this case, since each input port is able to be linked with a TV resource element including a tuner resource, the aliasing does not occur.

Meanwhile, in FIGS. 30 and 31, an output port is linked with a TV resource element according to a characteristic of the output port.

Meanwhile, if an input of each pipeline is changed, it may affect an output as well. For example, if a channel of an input port is changed in a pipeline, an input of a different pipeline may change as well. Moreover, it may affect an output of each pipeline as well.

In the aspect of a resource manager, if a media pipeline is generated, for example, resource competition for DE0 may occur. In this case, a resource linked with an output port of a watching pipeline can be released. Yet, although the resource of the watching pipeline is released, it does not affect a recording pipeline, i.e., a recording operation, and the recording pipeline can be maintained.

In FIG. 31, a TV pipeline manager can swap a specific resource (e.g., TU0, TU1) according to a hardware policy situation. Meanwhile, in FIG. 31, although a channel change is requested to an input port of the watching pipeline, it may not affect recording.

Figure 32:
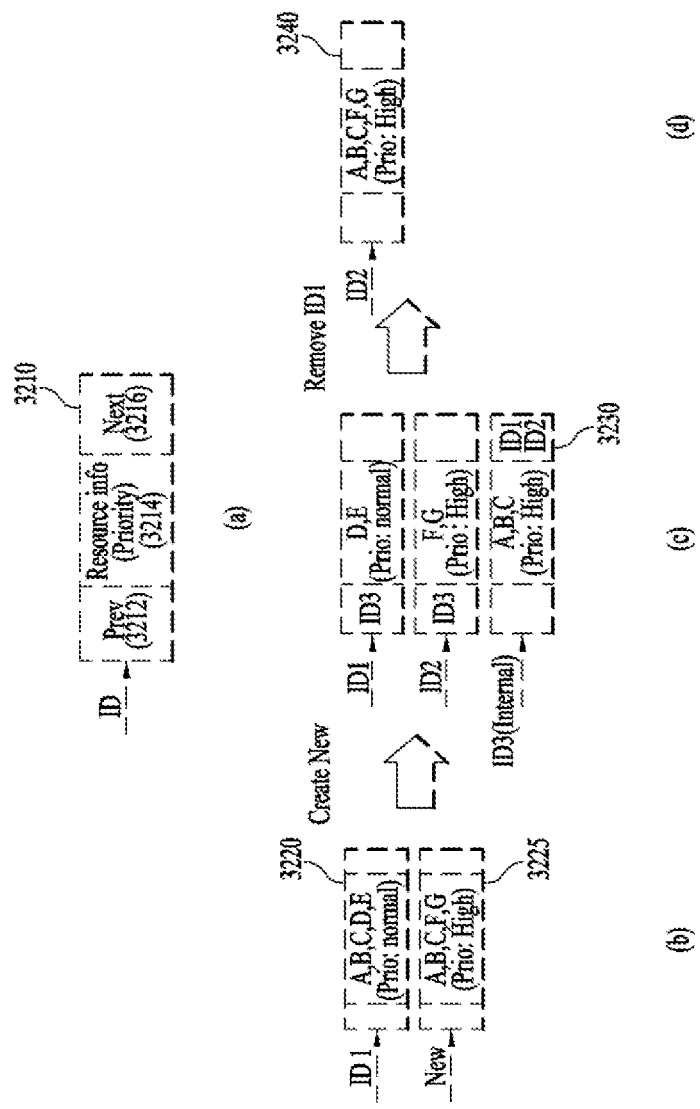
FIG. 32 is a diagram for explaining a definition on a resource element according to one embodiment of the present invention.

FIG. 32 is a diagram for explaining a definition on a resource element according to one embodiment of the present invention.

Referring to FIG. 32*a*, as mentioned in the foregoing description, a TV resource element 3210 can include a Prev field 3212, a resource information field 3214, and a Next field 3216. The resource information field 3214 can include priority information. And, the TV resource element 3210 can be linked with a different TV resource element based on the Prev field and the Next field.

Referring to FIGS. 32*b* to 32*d*, as shown in FIG. 32*b*, there exists a resource element 3220 of ID1. In this case, priority of the resource element 3220 of the ID1 corresponds to normal priority and resource information corresponds to A to E. In this case, if a new resource element 3225 is generated and at least one of resource information of the generated resource element is overlapped with one of resources of the legacy resource element 3220, as shown in FIG. 32*c*, an internal element 3230 including common resources (A, B, C) is generated and the new resource element 3225 and the legacy element 3220 can be linked with each other (ID3) based on the Prev field. And, the internal resource element 3230 can be linked with the elements (ID1, ID2) based on the next field. For example, this can be referred to as a relation between a parent and a child. In this case, the internal resource element 3230 may have top priority among the elements. The priority of the internal resource element 3230 may follow top priority among priorities of the child elements. In summary, referring to FIGS. 32*b* to 32*c*, if a resource of an ID1 resource element 3230 corresponds to A to E and priority of the resource of the ID1 resource element 3230 corresponds to normal priority and a resource of an ID2 resource element 3225 corresponds to A, B, C, F, and G and priority of the resource of the ID2 resource element 3225 corresponds to high priority, since A, B and C among the resources of the ID2 resource element are included in the resources of the ID1 resource element, an internal resource element of an ID3 is newly generated and the internal resource element of the ID3 has resource information of A, B, and C corresponding to common resources. In this case, the internal resource element of the ID3 may have high priority according to the ID2 including high priority among the normal priority of the ID1 and the high priority of the ID2. And, the internal resource element of the ID3 is linked with the next field in a manner of including the ID1 and the ID2. Meanwhile, in this case, as shown in FIG. 32*c*, the resource element of the ID1 includes resources of D and E and the resource element of the ID2 includes resources of F and G unlike FIG. 32*b*. In this case, there is no change in priority. Yet, the resource elements of the ID1 and the ID2, which are in a relation of a parent and a child, are linked with the Prev field in a manner of including the IDs to use the common resource (A, B, and C).

Referring to FIG. 32*d*, if one (ID1) of child elements is destroyed and one (ID2) child element of the internal element (ID3) is remained, since the internal element is not necessary anymore, the internal element is destroyed and can be merged into the remained child element (ID2) 3240.

Figure 33:
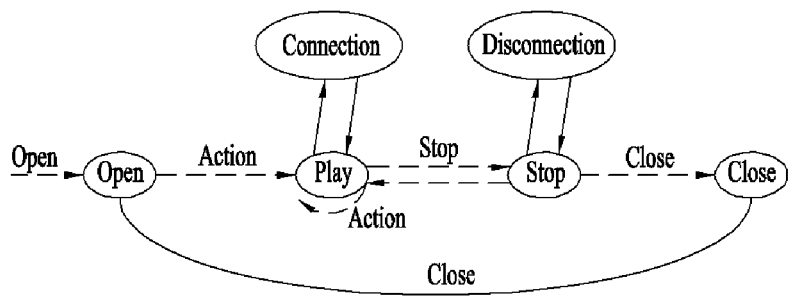
FIG. 33 is a diagram for explaining a pipeline lifecycle according to one embodiment of the present invention.

FIG. 33 is a diagram for explaining a pipeline lifecycle according to one embodiment of the present invention.

Referring to FIG. 33, a pipeline lifecycle consists of open, play, stop, and close.

A pipeline is generated according to an open command. In this case, a pipeline ID is generated and a pipeline instance is generated. An operation, i.e., an action, is initiated according to a play command (e.g., watch, record, etc.). In this case, in order to perform an action according to the play command, a pipeline dynamically receives resource allocation in a manner of being connected with a resource manager and performs the action. Subsequently, the pipeline stops performing the action according to a stop command and releases a previously used resource. Yet, the pipeline ID and the pipeline instance are maintained despite of the stop command. If a close command is received, the maintained or generated pipeline ID and the pipeline instance are eliminated.

As shown in FIG. 33, it may be able to configure a pipeline lifecycle. However, a pipeline lifecycle can be configured by a path or a configuration different from the path or the configuration shown in the drawing.

Figure 34:
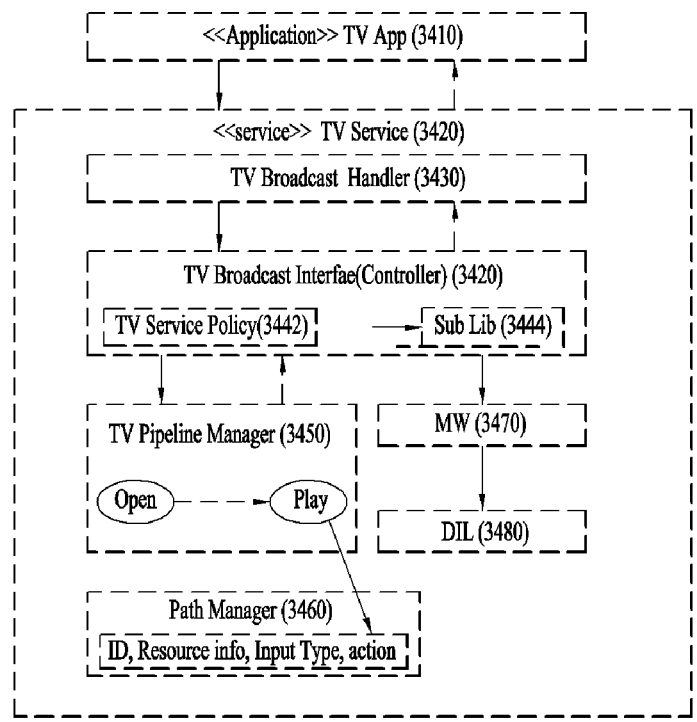
FIG. 34 is a diagram for explaining a relation between internal configurations when a channel is changed according to one embodiment of the present invention.

FIG. 34 is a diagram for explaining a relation between internal configurations when a channel is changed according to one embodiment of the present invention.

In a TV application 3410, if an ID and channel information are transmitted to a service processing module 3420 using com.webos.service.tv.broadcast/changeChannel, a TV broadcast handler 3430 of the TV service module 3420 delivers the ID and the channel information to a TV service policy processing unit 3442 of a TV broadcast interface (controller) 3440 using interface_broadcast_changeChannel. The TV service policy processing unit 3442 delivers an ID, an input type, an action, and a parameter to a TV pipeline manager 3450 using API_PIPELINE_SetAction. The TV pipeline manager 3450 allocates a resource and switches a pipeline state into play from open. If the pipeline state is switched to the play, the TV pipeline manager 3450 delivers an ID, resource information, an input type, and an action to a path manager 3460 using PathOpen. The path manager 3460 generates a path instance and stores such data as the ID, the resource information, the input type, the action, and the like.

As mentioned in the foregoing description, if a path instance is generated by the path manager 3460 and corresponding data is stored, the TV pipeline manager 3450 notifies the TV broadcast interface 3440 of a resource connection event. The TV broadcast interface 3440 performs call connection with a middleware (MW) 3470 using DIL. The middleware 3470 calls DIL 3480 for connection and the DIL 3480 performs connection.

The TV broadcast interface 3440 registers an ID, channel information and the like at a sub library 3444, transmits API_CM_ChannelChange including the registered ID, the channel information and the like to the middleware 3470, and returns "OK" to the TV broadcast handler 3430. Then, the TV broadcast handler 3430 returns "OK" in response to a channel change request firstly requested by the TV application 3410 to perform a channel change operation.

In the following, a call sequence for a pipeline is explained with reference to the attached drawing.

Figure 35:
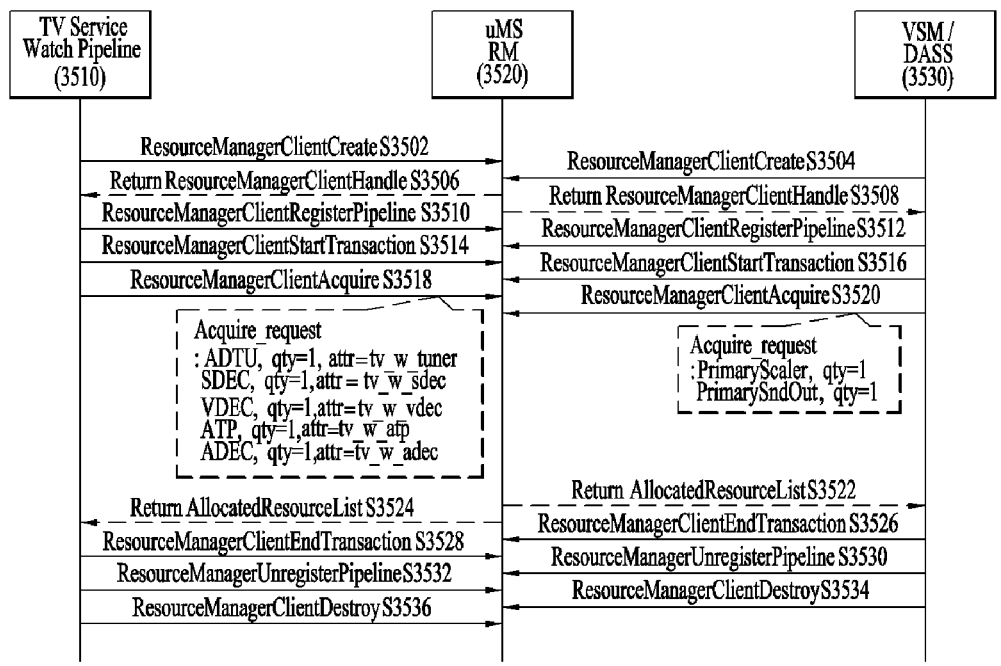
FIG. 35 is a sequence diagram for explaining a watch pipeline call sequence according to one embodiment of the present invention.
Figure 36:
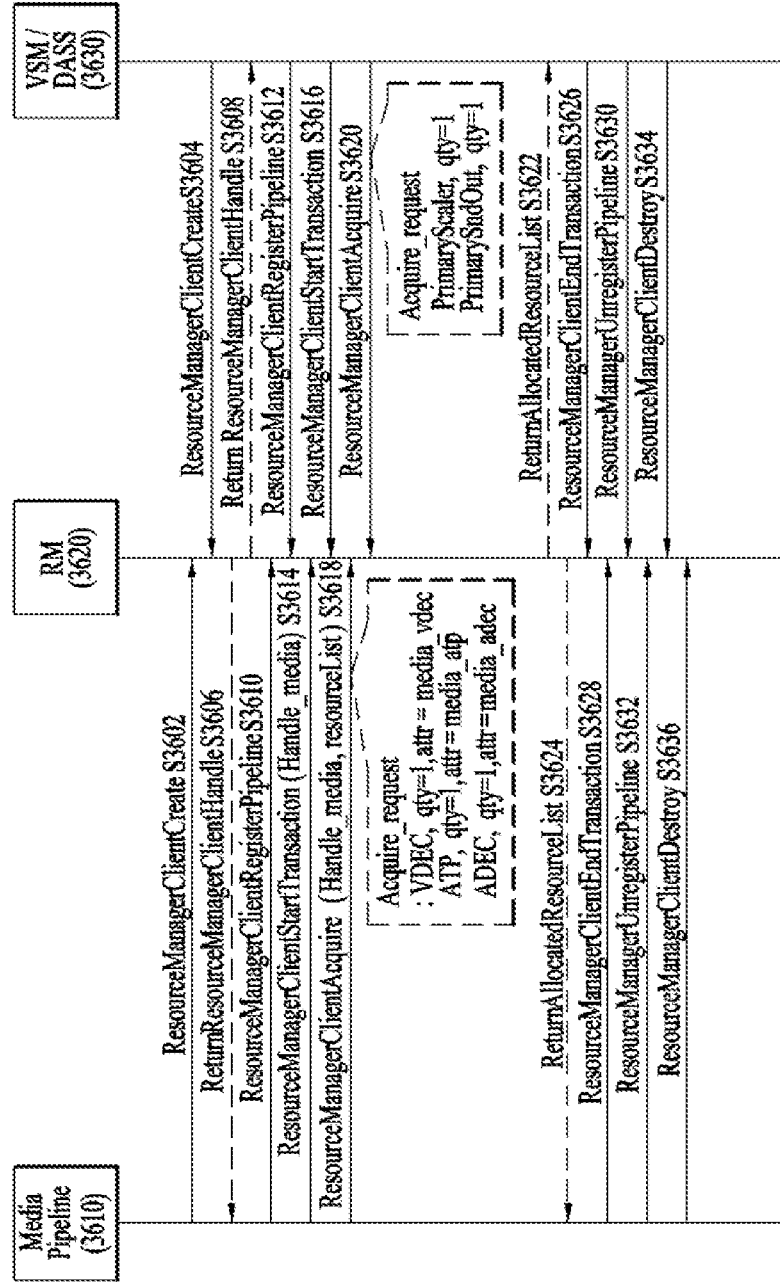
FIG. 36 is a sequence diagram for explaining a media pipeline call sequence according to one embodiment of the present invention.

FIG. 35 is a sequence diagram for explaining a pipeline call sequence according to one embodiment of the present invention and FIG. 36 is a sequence diagram for explaining a pipeline call sequence according to a different embodiment of the present invention.

For example, FIG. 35 shows an example of a TV service watch pipeline call sequence and FIG. 36 shows an example of a media pipeline call sequence.

First of all, a TV service watch pipeline call sequence is explained with reference to FIG. 35 in the following. In this case, a configuration related to the TV service watch pipeline call sequence may include a TV service watch pipeline 3510, a media server resource manager 3520, VSM/DASS 3530, and the like.

The TV service watch pipeline 3510 and the VSM/DASS 3530 respectively request resource manager generation (ResourceManagerClienCreate [PolicyActionHandler]) to the media server resource manager 3520 (S3502, S3504).

The media server resource manager 3520 respectively returns a resource manager client handle (ResourceManagerClientHandle) in response to the requests of the TV service watch pipeline 3510 and the VSM/DASS 3530 (S3506, S3508).

The TV service watch pipeline 3510 and the VSM/DASS 3530 respectively request client pipeline register (ResourceManagerClientRegisterPipeline [tv_watch], ResourceManagerClientRegisterPipeline [vsm]) to the media server resource manager 3520 (S3510, S3512).

The TV service watch pipeline 3510 and the VSM/DASS 3530 respectively request a resource manager client start transaction (ResourceManagerClientStartTransaction [Handle_watch], ResourceManagerClientStartTransaction [Handle_vsm]) to the media server resource manager 3520 (S3514, S3516).

And, the TV service watch pipeline 3510 and the VSM/DASS 3530 respectively request resource manager client acquisition (ResourceManagerClientAcquire [Handle_watch, resourceList], ResourceManagerClientAcquire (Handle_vsm, resourceList)) to the media server resource manager 3520 (S3518, S3520). In this case, the acquisition request of the TV service watch pipeline 3510 can be configured as follows: (ADTU, qty=1, attr=tv_w_tuner), (SDEC, qty=1, attr=tv_w_sdec), (VDEC, qty=1, attr=tv_w_vdec), (ATP, qty=1, attr=tv_w_atp), and (ADEC, qty=1, attr=tv_w_adec). And, the acquisition request of the VSM/DASS 3530 can be configured as follows: (PrimaryScaler, qty=1) and (PrimarySndOut, qty=1)

Subsequently, the media server resource manager 3520 return an allocated resource list to the VSN/DASS 3530 and the TV service watch pipeline 3510 (S3522, S3524).

The VSM/DASS 3530 and the TV service watch pipeline 3510 respectively request a resource manager client end transaction (ResourceManagerClientEndTransaction [Handle_vsm], ResourceManagerClientEndTransaction [Handle_ watch]) to the media resource manager 3520 (S3526, S3528).

The VSM/DASS 3530 and the TV service watch pipeline 3510 respectively request a resource manager client pipeline unregister (ResourceManagerClientUnregisterPipeline [Handle_vsm], ResourceManagerClientUnregisterPipeline [Handle_watch]) to the media resource manager 3520 (S3530, S3532).

The VSM/DASS 3530 and the TV service watch pipeline 3510 respectively request resource manager client destroy (ResourceManagerClientDestroy [Handle_vsm], ResourceManagerClientDestroy [Handle_watch]) to the media resource manager 3520 (S3534, S3536).

In the following, a media pipeline call sequence is explained with reference to FIG. 36. In this case, a configuration related to the media pipeline call sequence may include a media pipeline 3610, a media server resource manager 3620, VSM/DASS 3630, and the like.

The media pipeline 3610 and the VSM/DASS 3530 respectively request resource manager client generation (ResourceManagerClienCreate [PolicyActionHandler]) to the media server resource manager 3620 (S3602, S3604).

The media server resource manager 3620 respectively returns a resource manager client handle (ResourceManagerClientHandle) in response to the requests of the media pipeline 3610 and the VSM/DASS 3630 (S3606, S3608).

The media pipeline 3610 and the VSM/DASS 3630 respectively request resource manager client pipeline register (ResourceManagerClientRegisterPipeline [media_play], ResourceManagerClientRegisterPipeline [vsm]) to the media server resource manager 3620 (S3610, S3612).

The media pipeline 3610 and the VSM/DASS 3630 respectively request a resource manager client start transaction (ResourceManagerClientStartTransaction [Handle_media], ResourceManagerClientStartTransaction [Handle_vsm]) to the media server resource manager 3620 (S3614, S3616).

And, the media pipeline 3610 and the VSM/DASS 3630 respectively request resource manager client acquisition (ResourceManagerClientAcquire [Handle_media, resourceList], ResourceManagerClientAcquire (Handle_vsm, resourceList)) to the media server resource manager 3620 (S3618, S3620). In this case, the acquisition request of the media pipeline 3610 can be configured as follows: (VDEC, qty=1, attr=media_vdec), (ATP, qty=1, attr=media_atp) and (ADEC, qty=1, attr=media_adec). And, the acquisition request of the VSM/DASS 3630 can be configured as follows: (PrimaryScaler, qty=1) and (PrimarySndOut, qty=1)

Subsequently, the media server resource manager 3620 return an allocated resource list to the VSM/DASS 3630 and the media pipeline 3610 (S3622, S3624).

The VSM/DASS 3630 and the media pipeline 3610 respectively request a resource manager client end transaction (ResourceManagerClientEndTransaction [Handle_vsm], ResourceManagerClientEndTransaction [Handle_ media]) to the media resource manager 3620 (S3626, S3628).

The VSM/DASS 3630 and the media pipeline 3610 respectively request a resource manager client pipeline unregister (ResourceManagerClientUnregisterPipeline [Handle_vsm], ResourceManagerClientUnregisterPipeline [Handle_media]) to the media resource manager 3620 (S3630, S3632).

The VSM/DASS 3630 and the media pipeline 3610 respectively request resource manager client destroy (ResourceManagerClientDestroy [Handle_vsm], ResourceManagerClientDestroy [Handle_media]) to the media resource manager 3620 (S3634, S3636).

In the following, resource management according to the present invention is explained in more detail with reference to the attached drawing.

A TV middleware has a plan on using a resource. Regarding this, it shall be explained in detail with reference to FIGS. 42 to 44. Meanwhile, since TV resource management is complicate, a resource manager of a media server does not directly handle the TV resource management. For example, although the resource manager of the media server allocates a resource for a TV service, detail resource management for the TV service can be handled by a resource manager and a policy manager of a TV service processing module. In relation to this, using a resource according to a TV service scenario is explained in detail with reference to FIGS. 45 to 49 in the following. Yet, the resource manager of the media server can support the aforementioned resource sharing concept to handle TV resource management.

In relation to the TV resource management, a processing method of the TV service processing unit and the resource manager/policy manager of the media server can be performed in various ways.

As an example, the resource manager of the media server determines all hardware resources. In this case, the hardware resources can include not only hardware resources in a digital device but also hardware resources of a different device paired with the digital device. The resource manager is aware of a type of resources used for a specific TV service scenario. This is intended to make the resource manager appropriately allocate a resource according to a request of a user, a TV service, a service or an application in a device.

For example, if a TV service processing unit receives a recording request, the TV service processing unit makes a request for resource allocation to the resource manager/policy manager of the media server to perform the requested recording operation. The resource manager/policy manager identifies a status of a TV pipeline and determines necessary resources based on the status. In this case, for example, the status of the TV pipeline is switched to recording from watching. And, the resource manager/policy manager returns information on allocated resource to the TV service processing unit based on the determined resources.

As a different example, unlike the aforementioned example, the resource manager of the media server can simply return resources capable of being used for a TV and media. Hence, in relation to a TV service, it is necessary for the TV service processing unit to remember the status of the TV pipeline and determine necessary TV resources by the TV service processing unit. In particular, according to the first example, if the resource manager simply makes a request for a resource according to a TV service, the resource manager autonomously determines a resource necessary for the TV service and allocates the resource. On the contrary, according to the second example, if resources necessary for a TV service are determined according to a TV service, allocation of the determined resources are requested to the resource manager and the resource manager can allocate the resources. In other word, according to the second example, the resource manager can handle whether to allocate or release a resource only.

For example, if the TV service processing unit receives a recording request in the middle of watching, the TV service processing unit identifies a status of a TV pipeline and determines necessary resources based on the status. And, the TV service processing unit asks the resource manager/policy manager of the media server to allocate the determined resources. The resource manager/policy manager allocates the requested resources in response to the request and returns information on the allocated resources to the TV service processing unit.

Each of the aforementioned examples has pros and cons. In this case, it may be able to use a scheme appropriately determined according to a characteristic of a corresponding digital device. Meanwhile, although it is not depicted, it may be able to use a scheme of which the two examples are appropriately combined. And, it may be able to use one of the schemes based on a service unit, an application unit, burden of the TV service processing unit or the media server, load status and the like. Or, it may be able to apply the two schemes in a manner of sequentially determining a scheme or it may be able to use the two schemes by combining the schemes in various forms.

The TV resource manager provides resource sharing information to the TV pipeline manager. In this case, the aforementioned resource configuration file can be used. Meanwhile, the TV resource manager can provide linkage information between resources and the TV pipeline manager. And, the TV resource manager provides all resource informations to the TV policy manager and interfaces with the media server. In particular, the TV resource manager obtains resources from the media server including real resources and may return resources to the media server.

The resource configuration file is similar to a master plan of a TV service indicating how to use resources. The resource configuration file is like a blueprint indicating how to use resources necessary for implementing a unique function of the TV service. The resource configuration file is represented or implemented in a table form and can be stored in advance. For example, a role of the resource configuration file is to represent a resource used by the TV service and use for the resource sharing concept. And, the resource configuration file can make the resource sharing concept to be used irrespective of a status of a device or a pipeline. For example, it may be able to know a resource configuration file for a service and it may be able to efficiently use a restricted resource by appropriately using the resource sharing concept in response to a service request.

Meanwhile, in this case, although the resource configuration file is depicted and explained in relation to a TV service, by which the present invention may be non-limited. In other word, the resource configuration file can be stored in advance or can be used in a manner of downloading the resource configuration file from a paired external device and/or an external server. The resource configuration file can be defined and used to perform a media service, an application and the like as well as the TV service. In the following, a TV service of which a resource configuration is somewhat complex is explained as an example.

In the following, the resource configuration file is explained in more detail with reference to the attached drawing.

FIGS. 37 to 41 are diagrams for explaining a resource configuration file according to one embodiment of the present invention.

Table 1 in the following shows representations necessary for understanding the resource configuration file.

TABLE 1

| representation | Meaning or definition |
| --- | --- |
| + | sharable(Yet, sharing may be infeasible with identical usage) |
| w | Usage of watching |
| r | Usage of recording |
| c | Usage of capturing |
| t | Usage of transmission |
| ts | Usage of time shift |
| sw | Usage of switching |
| x | Usage different from original usage |
| A | B (ex, resource) | Use A if A is available. Otherwise, use B |

Referring to Table 1, "+x" may indicate that it is able to share all other usages except a usage identical to a usage of its own. "+w" may indicate that it is able to share a watching usage and "+c+w" may indicate that it is able to share a capturing usage or a watching usage.

Figure 37:
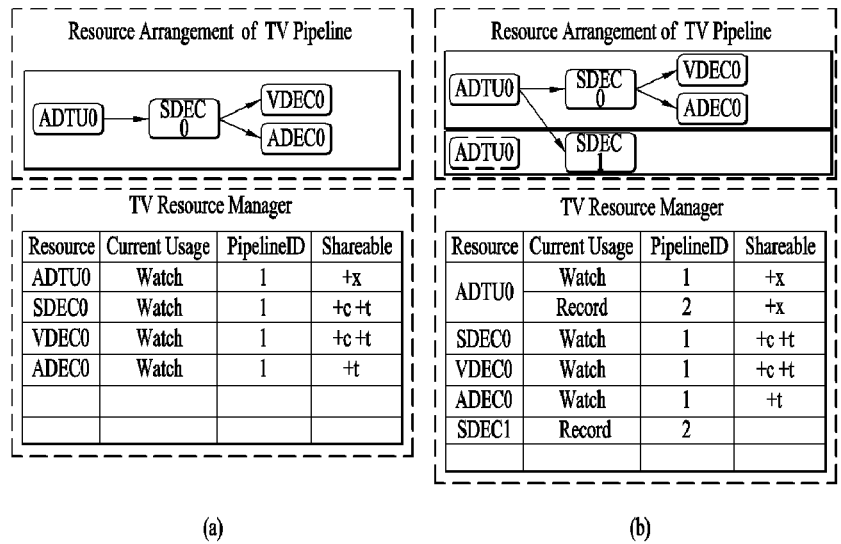
FIGS. 37 to 41 are diagrams for explaining a resource configuration file according to one embodiment of the present invention.

FIG. 37 relates to a single tuner model. In particular, FIG. 37a shows a resource configuration file for a watching operation and FIG. 37b shows a resource configuration file for a recording operation in the middle of the watching operation of FIG. 37a.

First of all, a watching operation configuration file is explained with reference to FIG. 37a.

For example, resources for a watching operation require an ADTU (tuner), an SDEC (system decoder), a VDEC (video decoder), and an ADEC (audio decoder). As shown in the drawing, the resources can be arranged in the aforementioned order in a TV pipeline.

In this case, a watching operation configuration file can be configured as shown in the drawing. A resource ADTU0 is currently used for a usage of watching, a pipeline ID corresponds to 1, and the resource ADTU0 can be shared with a different usage except a usage identical to the resource ADTU0 with [+x] in the aspect of sharable. A resource SDEC0 is currently used for a usage of watching, a pipeline ID corresponds to 1, and the resource SDEC0 can be shared with a usage of capturing or a usage of transmission with [+c+t] in the aspect of sharable. A resource VDEC0 is currently used for a usage of watching, a pipeline ID corresponds to 1, and the resource SDEC0 can be shared with a usage of capturing or a usage of transmission with [+c+t] in the aspect of sharable. A resource ADEC0 is currently used for a usage of watching, a pipeline ID corresponds to 1, and the resource ADEC0 can be shared with a usage of transmission with [+t] in the aspect of sharable.

Similar to FIG. 37a, FIG. 37b shows a case that a user makes a request for recording in the middle of watching. In the following, a recording operation configuration file is explained.

For example, resources for a recording operation require ADTU and SDEC. The ADTU and the SDEC are included in the resources required for the watching operation mentioned earlier in FIG. 37a.

The recording operation configuration file can be configured as shown in the drawing. In this case, for example, the recording operation configuration file may use the watching operation configuration file mentioned earlier in FIG. 37a.

A TV resource manager checks whether or not a resource ADTU is currently obtained by a TV service. If the resource ADTU is already obtained, the TV resource manager checks whether or not the resource ADTU is usable and sharable. Referring to a configuration file of a resource ADTU0 shown in FIG. 37a, since the resource ADTU0 is sharable, the resource ADTU0 can be shared although a resource acquisition request is not transmitted to a resource manager of a media server. Hence, a configuration file of the resource ADTU0 is currently used for a usage of watching and a usage of recording, a pipeline ID corresponds to 1 for the watching usage and 2 for the recording usage, and can be defined as a usage sharable with a different usage except a usage identical to the usage of the resource ADTU0. Hence, the resource ADTU0 can be used for a recording usage different from the usage of watching shown in FIG. 37a. Yet, since a TV middleware does not make a request for whether or not a resource SDEC is sharable, it is necessary for the resource SDEC to make a request for resource acquisition to the resource manager of the media server. And, referring to FIG. 37a, since the resource SDEC is defined as being shared for a capturing usage or a transmission usage only, it is necessary to acquire a separate resource. Referring to a configuration file shown in FIG. 37b, a resource SDEC0 is identical to the resource SDEC0 mentioned earlier in FIG. 37a and a SDEC1 is newly defined as follows. The resource SDEC1 is currently used for a usage of recording and a pipeline ID corresponds to 2. Yet, it may not specifically define the resource SDEC1 in the aspect of sharable.

Figure 38:
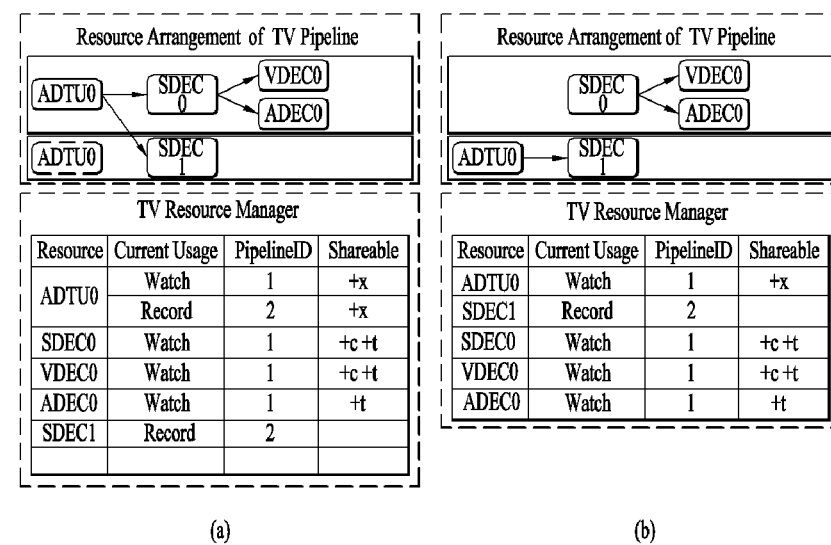
Figure 39:
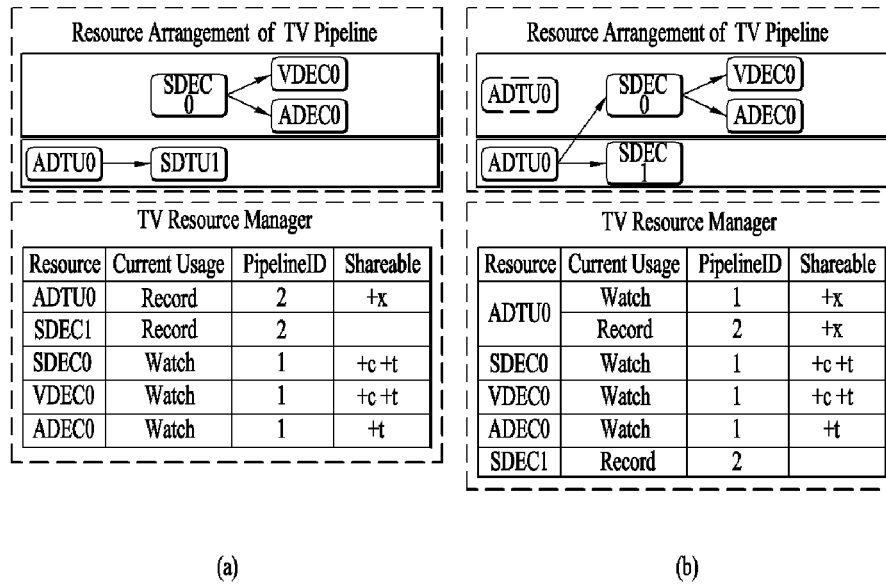
Figure 40:
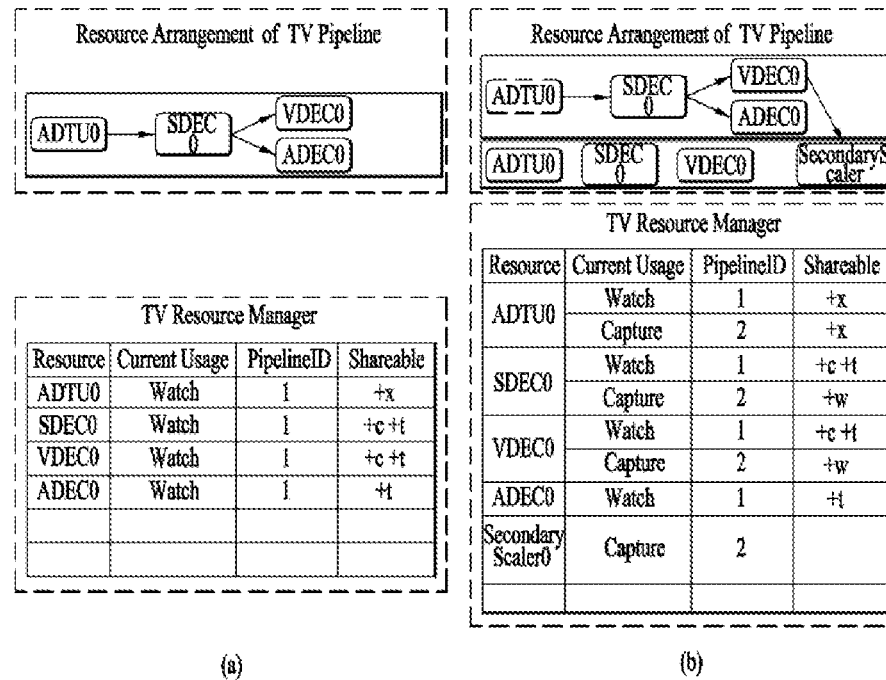
Figure 41:
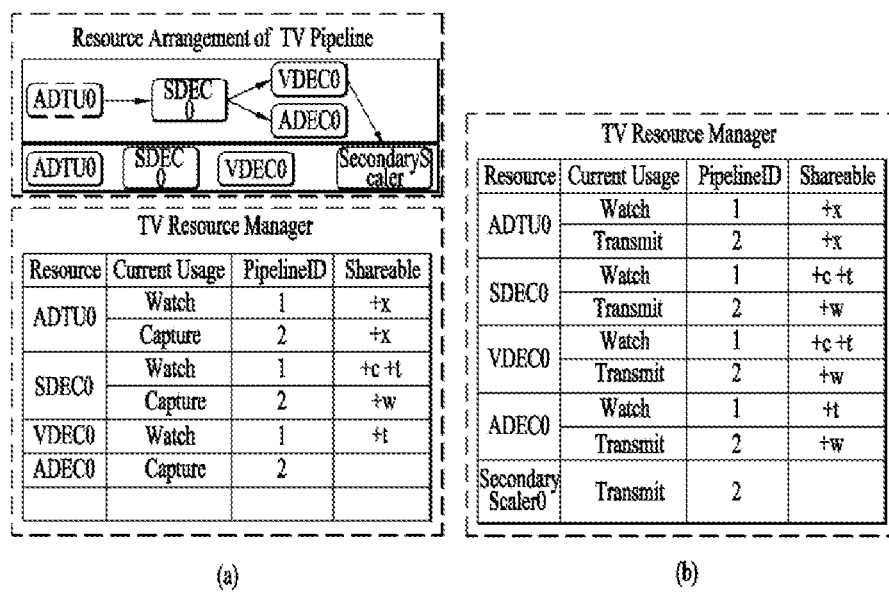

FIG. 38 also relates to a single tuner model. Unlike FIG. 37, FIG. 38a shows a DTV watching operation and a DVR recording (HQ) operation and FIG. 38b shows a resource configuration file for a HDD watching operation when an input source changes to HDMI in the middle of the operations of FIG. 38a.

Similar to FIG. 37b, FIG. 38a relates to a DTV watching and DVR recording (HQ) operation configuration file. Hence, it may refer to the aforementioned contents for details. Explanation on overlapped contents is omitted at this time.

FIG. 38b shows a case that the input source shown in FIG. 38a is changed to HDMI. In this case, such resources as SDEC, VDEC and ADEC are required for the input source changing operation. Hence, when the operation of FIG. 38b is performed, a resource conflict occurs on the resource SDEC. In this case, a DTV watch pipeline receives an inquiry for whether the DTV watch pipeline is able to release the SDEC resource. If a resource SDEC0 is released, a DTV watching operation becomes meaningless. Hence, all resources related to the DTV watching operation are eliminated from a usage of watching. All of the resources can be released as unavailable resources. Hence, it is able to acquire resources including the SDEC, the VDEC, and the ADEC at a time.

In the following, a configuration file configuration for a HDD watching operation shown in FIG. 38b is explained. In this case, in the DTV watching operation in FIG. 38a, although a pipeline and resources related to the watching operation are all released, a pipeline for a DVR recording operation and resources related to the DVR recording operation are still maintained. Hence, a resource ADTU0, which was acquired for the DTV watching operation and shared for a DVR recording operation, is dedicatedly used for the DVR recording operation. In summary, the resource ADTU0 is currently used for the recording usage, a pipeline ID corresponds to 2, and a sharable aspect corresponds to [+x]. The resource SDEC1 is currently used for the recording usage and a pipeline ID corresponds to 2. The resource SDEC0 is currently used for a usage of HDD watching, a pipeline ID corresponds to 1 (since a pipeline for a DTV watching is destroyed, the ID 1 is not used for the DTV watching pipeline), and a sharable aspect corresponds to [+c+t]. The resource VDEC0 is currently used for the usage of HDD watching, a pipeline ID corresponds to 1, and a sharable aspect corresponds to [+c+t]. The resource ADEC0 is currently used for the usage of HDD watching, a pipeline ID corresponds to 1, and a sharable aspect corresponds to [+t].

FIG. 39a shows a configuration file of a state identical to the state of the configuration file shown in FIG. 38b. Similar to FIG. 38a, FIG. 39b shows a case that a DTV watching operation is requested in a manner that an input source is changed to DTV from HDMI.

In this case, as mentioned in the foregoing description, a resource conflict occurs again on the resource SDEC0 and a HDD watch pipeline receives a resource release request. In this case, if the resource SDEC0 is released, HDD watching becomes meaningless and all resources related to the HDD watching are released in a manner of being eliminated from a usage of watching. Meanwhile, unlike the HDD watching, a resource ADTU is required for a DTV watching usage. In this case, the ADTU can be shared with all usages except the watching usage. Hence, since the resource ADTU is currently used for the DVR recording usage, the resource ADTU can be shared with the DTV watching usage. Hence, it is able to share the resource ADTU0, which is originally acquired for the DVR recording usage, although a resource acquisition request is not transmitted to a resource manager of a media server to acquire a separate resource ADTU. Meanwhile, since it is unable to share a resource SDEC1 for a usage of recording, it is necessary to make a request for acquisition of a resource SDEC to a resource manager. In case of the VDEC and the ADEC, since a pipeline for a HDD watching usage and resources are already released, as mentioned in the foregoing description, it is necessary to acquire resources from the media server.

Hence, a configuration file becomes identical to that of FIG. 38a.

FIG. 40a relates to a DTV watching operation mentioned earlier in FIG. 37a. Hence, it may refer to the aforementioned contents mentioned earlier in FIG. 37a for details. Explanation on overlapped contents is omitted at this time.

FIG. 40b relates to a configuration file when a capturing operation request is received in the aforementioned FIG. 40a.

In relation to the capturing operation, resources including ADTU, SDEC, VDEC and a secondary scaler are required. In this case, compared to FIG. 40a, the ADTU, the SDEC, and the VDEC are overlapped among the resources. Hence, it is necessary to check whether or not the ADTU, the SDEC, and the VDEC are sharable. For example, a TV resource manager checks whether or not the ADTU, the SDEC, and the VDEC are currently acquired by a TV service. If the resources are acquired, the TV resource manager checks whether or not the resources are currently used for watching. In this case, the resources can be shared without transmitting a separate resource acquisition request to the resource manager. Yet, in case of the secondary scaler, it is necessary to transmit a separate resource acquisition request to the resource manager to share the secondary scaler.

Referring to FIG. 40b, a configuration file for a DTV watching operation and a capturing operation can be configured as follows. A resource ADTU0 is currently used for a watching usage and a capturing usage, a pipeline ID for the watching usage corresponds to 1, a pipeline ID for the capturing usage corresponds to 2, and a sharable aspect corresponds to [+x] for both usages. A resource SDEC0 is identical to the ADTU except a sharable aspect. A sharable aspect for the watching usage corresponds to [+c+t] and a sharable aspect for the capturing usage corresponds to [+w]. a resource VDEC0 is identical to the aforementioned SDEC0. A resource ADEC0 is used for a watching usage only. A pipeline ID of the resource ADEC0 corresponds to 1 and a sharable aspect corresponds to [+t]. A resource secondary scaler is used for a capturing usage only. A pipeline ID of the resource secondary scaler corresponds to 2 and a sharable aspect may not be specifically defined.

Since FIG. 41a is identical to the aforementioned FIG. 40b, it may refer to the FIG. 40b. Detail explanation on the FIG. 41a is omitted at this time. FIG. 41b shows a case that an output of a DTV is transmitted using SCART. For example, resources necessary for performing FIG. 41b may include ADTU, SDEC, VDEC, and a secondary scaler.

Basically, when FIGS. 41a and 41b are compared with each other, all resources are overlapped with each other except the resource ADEC. In this case, as mentioned in the foregoing description, the ADTU, the SDEC, and the VDEC are sharable in a manner of terminating the capturing operation of FIG. 41a and changing to a transmission operation instead of the capturing operation. Yet, since the secondary scaler is not sharable, a resource conflict occurs on a corresponding resource. In particular, in terms of the resource conflict, the secondary scaler is different from the ADTU, the SDEC, and the VDEC. Hence, a current pipeline receives a release request. If the resource secondary scaler is released, capturing becomes meaningless. Hence, all resources related to the capturing are released. Subsequently, it may be able to check whether or not a TV service processing unit is still acquiring the ADTU, the SDEC, the VDEC and the ADEC. If the TV service processing unit is still acquiring the resources, it may be able to determine whether or not the resources are used for DTV watching. Hence, for a transmission operation, the resources can be shared in a manner of comparing the resources and a sharable aspect with each other. If the resources are in a not acquired state or released for the DTV watching operation as well, it is necessary to make a request for acquisition of the resources to a resource manager for the transmission operation.

Hence, the TV resource manager can configure a configuration file for the DTV watching operation and the SCART transmission operation as shown in FIG. 41b.

In the following, resource arrangements for various operations are briefly explained with reference to the aforementioned configuration file configuring scheme and the resource sharing aspect. Meanwhile, since a configuring scheme, resource arrangement, and the like not depicted or not explained in the present specification are able to be configured using the principle described in the present specification, the configuring scheme, the resource arrangement, and the like are also included in the scope of the present invention.

FIGS. 42 to 49 are diagrams for explaining resource arrangement configured for operation(s) according to one embodiment of the present invention.

In the following, FIGS. 42 to 49 are briefly explained centering on a difference with reference to the aforementioned resource configuration file and the like while explanation on overlapped contents is omitted.

Figure 42:
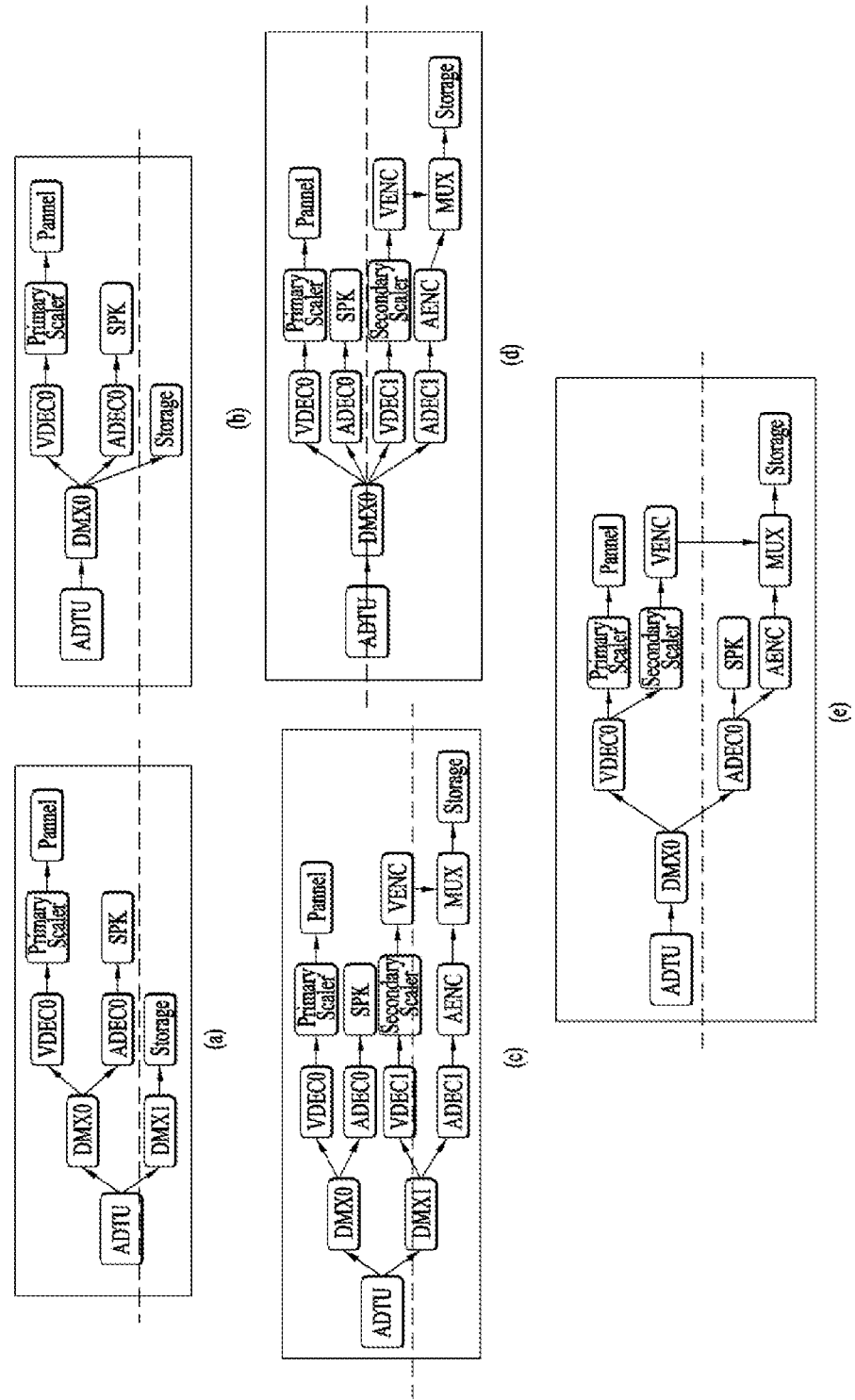
FIGS. 42 to 49 are diagrams for explaining resource arrangement configured for operation(s) according to one embodiment of the present invention.

FIG. 42 shows resource arrangement using a resource sharing concept in case of performing a DTV watching operation and a DVR recording operation at the same time. In particular, FIGS. 42a and 42b relate to HQ and FIGS. 42c to 42e relate to LQ.

First of all, FIG. 42a shows resource arrangement in case of sharing ADTU only among resources for performing a DTV watching operation and a DVR recording (HQ) operation. In case of the DTV watching operation, a video data is outputted via a panel by passing through ADTU, DMX0 (de-multiplexer), VDEC0 and a primary scaler. An audio data is outputted via a speaker by passing through the ADTU, the DMX0, and ADEC0. And, in case of the DVR recording operation, a DVR is stored in storage by passing through the shared ADTU and a DMX1.

On the contrary, unlike the FIG. 42a, FIG. 42b shows a case that a DMX is also shared. In this case, resource arrangement of a DTV watching operation is identical to that of FIG. 42a. Yet, unlike the aforementioned the DVR recording operation, a DVR is directly stored in the storage in a manner of being multiplexed by the resource DMX0, which is acquired for the DTV watching operation, without passing through the DMX1.

As mentioned in the foregoing description, if a resource is shared, since it is not necessary to receive separate resource allocation by communicating with a resource manager of a media server for a corresponding service operation, it may be able to more efficiently use the resource.

Referring to FIG. 42c, two resources are shared. In this case, the resources correspond to ADTU and MUX (multiplexer). A DTV watching operation is identical to that of FIGS. 42a to 42b. Yet, resource arrangement for a DVR recording operation is different from that of FIGS. 42a to 42b. For example, in FIG. 42c, a signal for DVR recording is de-multiplexed into video data and audio data via a DMX1. The video data is delivered to the MUX by passing through VDEC1, a secondary scaler and VENC and the audio data is delivered to the MUX by passing through ADEC1 and AENC. The audio data is multiplexed with the video data, which has passed through the VENC, and is stored in the storage.

FIG. 42d is identical to the aforementioned FIG. 42c. Yet, FIG. 42d is different from the FIG. 42c in that DMX as well as ADTU is shared.

FIG. 42e shows case that more resources are shared compared to the aforementioned case of FIG. 42c. For example, the ADTU and a DMX0 are shared for a DTV watching operation and a DVR recording operation. In other word, a signal for the DTV watching operation and a signal for the DVR recording operation are processed by the shared resources, video data and audio data are separated from each other for the DTV watching operation and the DVR recording operation in the DMX0, and VDC and ADEC are minimally used. In particular, the video data for the DTV watching operation is delivered to a panel by passing through a VDEC0 and a primary scaler and the video data for the DVR recording operation is delivered to the MUX by passing through the VDEC0, a secondary scaler, and a VENC. And, the audio data for the DTV watching operation is delivered to a speaker by passing through ADEC0 and the audio data for the DVR recording operation is delivered to the MUX by passing through AENC and is stored in the storage in a manner of being multiplexed with the video data, which is delivered to the MUX by passing through the VENC.

Figure 43:
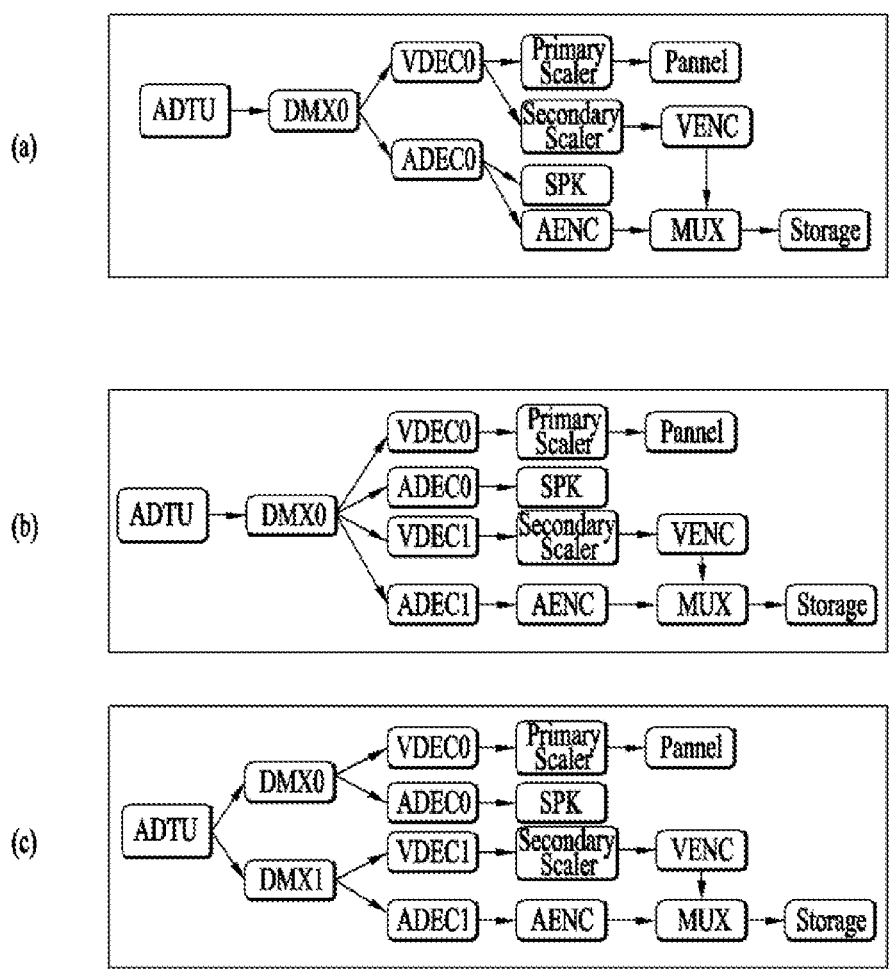

FIG. 43 shows resource arrangement in case of performing a DTV watching operation and a second TV operation at the same time.

Referring to FIG. 43a, ADTU, DMX, VDEC, ADEC, and MUX are shared for a DTV watching operation and a second TV operation. For the DTV watching operation and the second TV operation, a signal for the two operations is passing through the shared ADTU and the DMX0. All video data are delivered to the VDEC0 and all audio data are delivered to the ADEC0. The video data for the DTV watching operation are passing through a primary scaler and a panel and the video data for the second TV operation are delivered to the MUX by passing through a secondary scaler and VENC. The audio data for the DTV watching operation are directly outputted via a speaker. The audio data for the second TV operation are delivered to the MUX by passing through AENC and delivered to the storage in a manner of being multiplexed with the video data, which are delivered to the MUX by passing through the VENC.

On the contrary, FIG. 43b shows a case that VDEC and ADEC are not shared. In this case, VDEC0 and ADEC0 are used for a DTV watching operation and VDEC1 and ADEC1 are used for a second TV operation.

FIG. 43c shows a case that DMX is not shared in addition to the case of FIG. 43b. In this case, a signal for the DTV watching operation is processed in a manner of passing through a shared ADTU and DMX0 and a signal for the second TV operation is processed in a manner of passing through DMX1.

Figure 44:
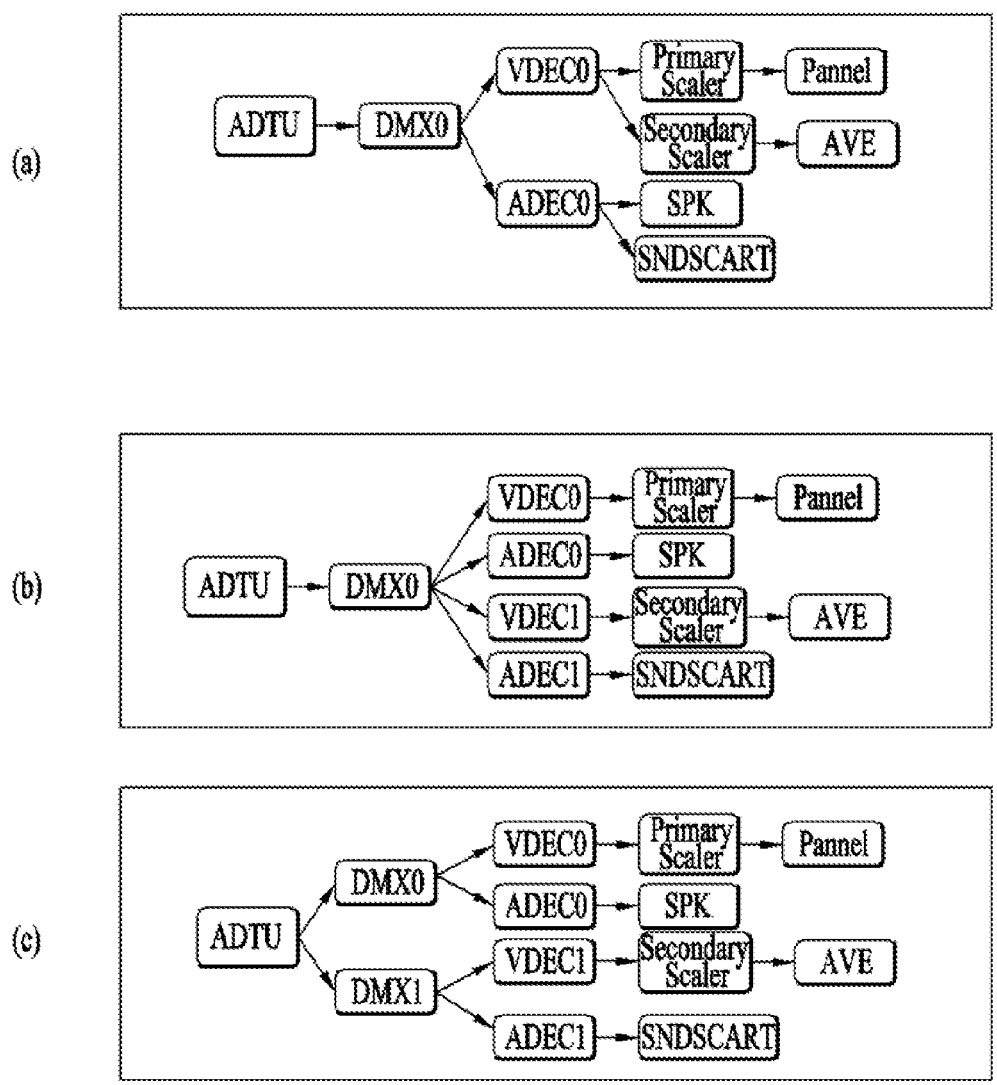

FIG. 44 shows resource arrangement in case of performing a DTV watching operation and a SCART output at the same time.

Overall contents are identical to the aforementioned contents of FIG. 43. Yet, instead of the secondary TV operation, SCART output is performed together with the DTV watching operation and a resource for the SCART output is different.

Referring to FIG. 44a, not only ADTU and DMX but also VDEC and ADEC are shared. On the contrary, referring to FIG. 44b, VDEC and ADEC are not shared compared to FIG. 44a. Referring to FIG. 44c, DMX is not shared as well compared to FIG. 44b.

FIGS. 42 to 44 show resource arrangement in case of performing two operations at the same time. On the contrary, FIGS. 45 to 49 show a change of resource arrangement according to a TV scenario.

Figure 45:
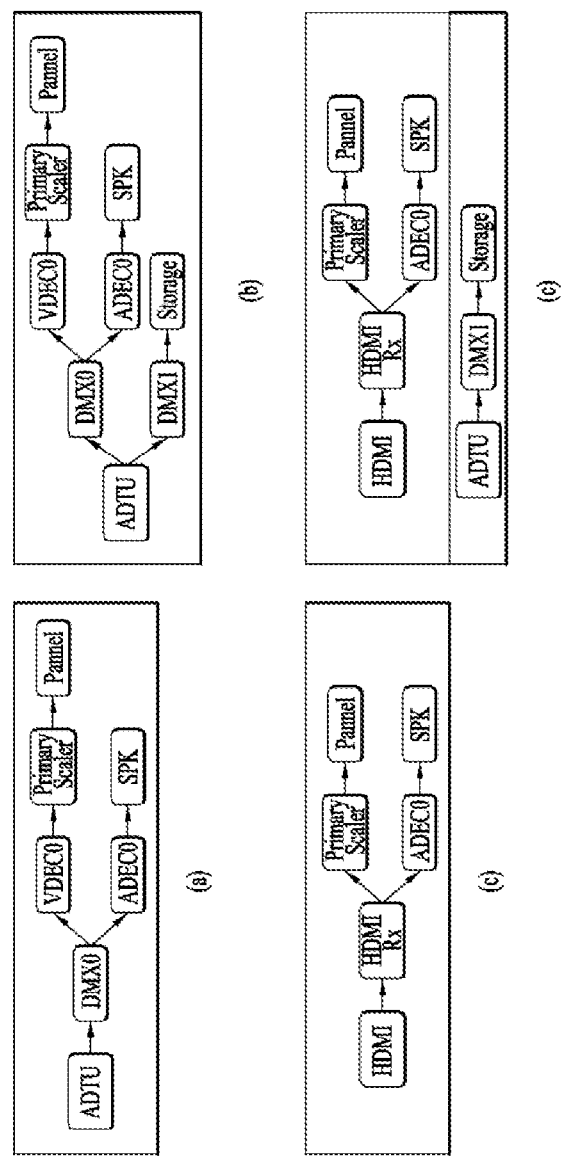

Referring to FIG. 45, FIG. 45a shows resource arrangement for a DTV watching operation, FIG. 45b shows resource arrangement for performing a DVR recording operation and the DTV watching operation at the same time according to a DVR recording request, FIG. 45c shows a resource arrangement for performing a DVR recording operation and an HDMI input operation while the DTV watching operation is destroyed as a conflict according to a change of an input source, i.e., HDMI input, and FIG. 45d shows resource arrangement configured to terminate the DVR recording operation of FIG. 45c and watch an HDMI input via HDMI input. In this case, FIGS. 45a to 45d sequentially show a change of a resource arrangement configuration according to a change of a TV scenario. In this case, the change can also be made in an opposite order.

First of all, referring to FIG. 45a, according to the resource arrangement for the DTV watching operation, video data is outputted via a panel by passing through ADTU, DMX0, VDEC0 and a primary scaler and audio data is outputted via a speaker by passing through ADEC0.

In FIG. 45a, if a request for performing the DVR recording operation is received in the middle of performing the DTV watching operation, as mentioned in the foregoing description, whether to perform the two operations at the same time is determined based on a resource sharing concept in consideration of whether a resource conflict occurs, whether a resource is obtained, and the like. As shown in the drawing, if it is able to perform the two operations at the same time, resource arrangement is identical to resource arrangement shown in the drawing. If ADTU is shared, it is able to sufficiently perform the two operations at the same time. Hence, when the shared ADTU is used, resource arrangement after DMX0 is identical to the resource arrangement mentioned earlier in FIG. 45a. Yet, in order to perform DVR recording operation, data are stored in the storage by passing through the ADTU and DMX1.

Meanwhile, if an input source is changed between DTV and HDMI in the process of FIG. 45b, resources are arranged as shown in FIG. 45c. In this case, since the input source between the DTV and the HDMI is changed, resources for a DTV watching operation can be released. And, simultaneous performance of the two operations is determined in consideration of a resource conflict between a HDMI input source changing operation and a DVR recording operation, and the like. As shown in the drawing, the two operations can be performed at the same time. Yet, in FIG. 45b, since ADTU is shared for the DTV watching operation, the ADTU is used for a DVR operation and ADTU can be obtained again via a resource manager of a media server according to resource release for the DTV watching operation. Meanwhile, HDMI is passing through HDMI Rx (HDMI reception unit), video data is outputted via a panel by passing through a primary scaler, and audio data is outputted via a speaker by passing through ADEC0. In this case, although such resources as the primary scaler, the panel, the ADEC0, the speaker and the like are identical to resources for the DTV watching operation in FIG. 45b, as mentioned in the foregoing description, since resource release is already performed, the resources correspond to resource allocated again via the resource manager of the media server for the HDMI input operation.

Subsequently, if DVR recording is suspended or terminated, resource arrangement for HDMI watching only is configured as shown in FIG. 45d.

Figure 46:
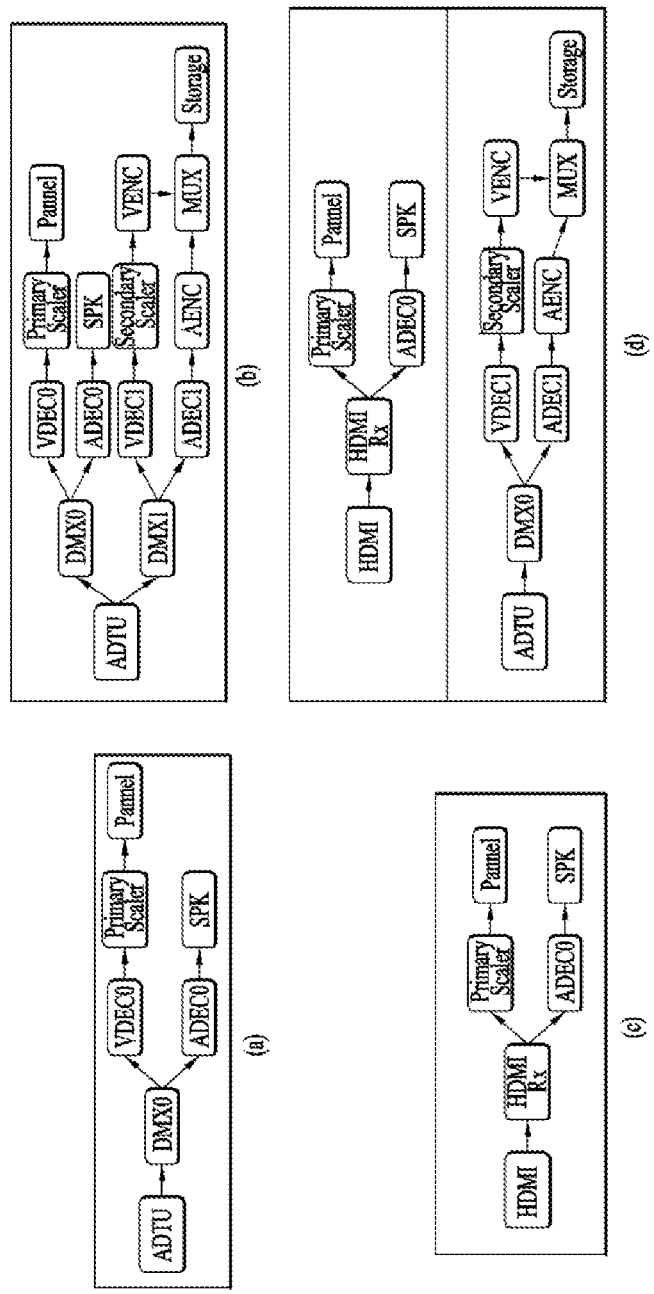
Figure 47:
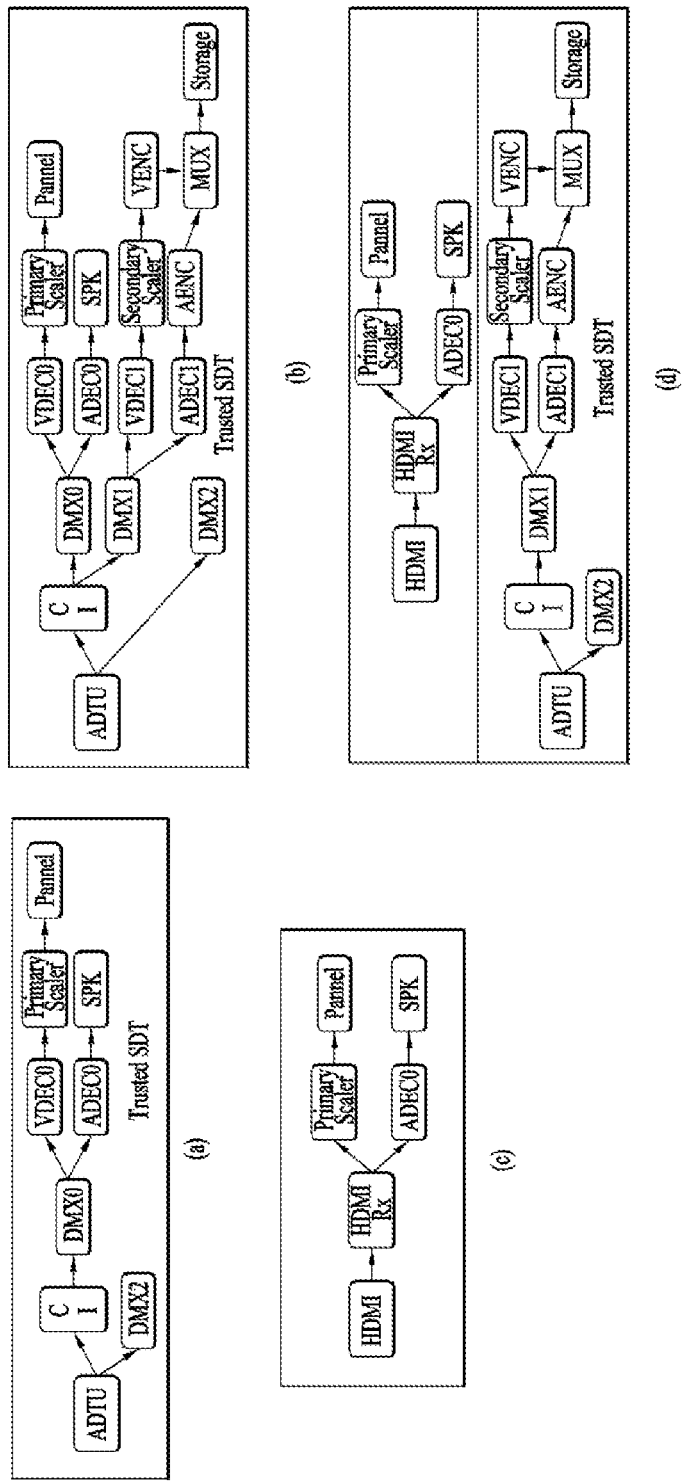

FIGS. 46 to 47 are identical to the aforementioned FIG. 45. Yet, as mentioned earlier in FIGS. 42 to 44, there is a difference only in that a partial resource configures resource arrangement by sharing a certain resource. As an example, a difference between FIG. 45b and FIG. 46b is identical to a difference between FIG. 42a and FIG. 42c.

Meanwhile, FIG. 47a shows a case of watching DTV on which a cam is mounted. In this case, ADTU is shared, a watching operation is performed by passing through a CI (common interface), DMX0, VDEC, ADEC, and the like, and signaling information for the watching operation is received via DMX2 by passing through the ADTU.

FIGS. 47b to 47d are identical to the aforementioned FIGS. 46b to 46d except the difference of FIG. 47a.

In the aforementioned FIGS. 45 to 47, a method of configuring resource arrangement for implementing an operation in a single tuner has been described. On the contrary, in FIGS. 48 to 49, a method of configuring resource arrangement for implementing an operation in multiple tuners is described.

FIG. 48a shows resource arrangement for a DTV watching operation. A video data is outputted via a panel by passing through DTU, DMX0, VDEC0, and a primary scaler. An audio data is outputted via a speaker by passing through ADEC0.

FIG. 48b shows resource arrangement according to a request of performing a DVR recording operation requested in the middle of a DTV watching operation. Since a case of multiple tuners, a DTV watching operation is identical to that of FIG. 48a in resource arrangement and a separate DTU (tuner) can be assigned for a DVR recording operation.

FIG. 48c shows a case that an input source is changed from DTV to HDMI. In this case, unlike the aforementioned case, since a separate tuner DTU is assigned in advance for a DVR recording operation, it is able to conveniently release all resources for DTV watching. Hence, it is not necessary to separately perform contact or communication with a resource manager for the DVR recording operation. And, it is sufficient enough to configure resource arrangement of a pipeline for a HDMI operation.

Figure 48:
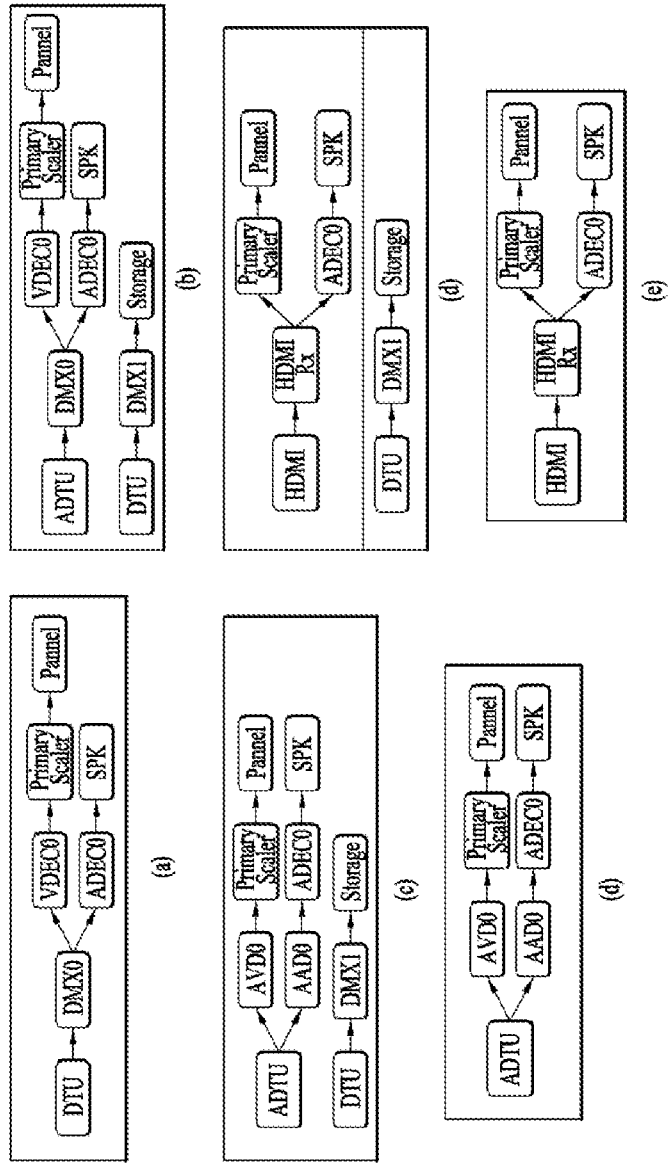

FIG. 48d shows a case that a change occurs between DTV and ATV. In particular, FIG. 48b shows resource arrangement for performing a DTV watching operation and a DVR recording operation at the same time and FIG. 48d shows resource arrangement configured to perform an ATV watching operation and a DVR recording operation at the same time. In this case, as mentioned in the foregoing description, since multiple tuners are assumed in FIG. 48, resource arrangement for the DVR recording operation is not affected at all. Yet, it may be sufficient enough that resources for a DTV watching operation are all released and resource arrangement for an ATV watching operation is configured only.

If recording is suspended or terminated in FIG. 48c, resource arrangement is configured as shown in FIG. 48e. On the contrary, if recording is suspended or terminated in FIG. 48d, resource arrangement is configured as shown in FIG. 48f. It may refer to FIGS. 45 to 47 for details.

Figure 49:
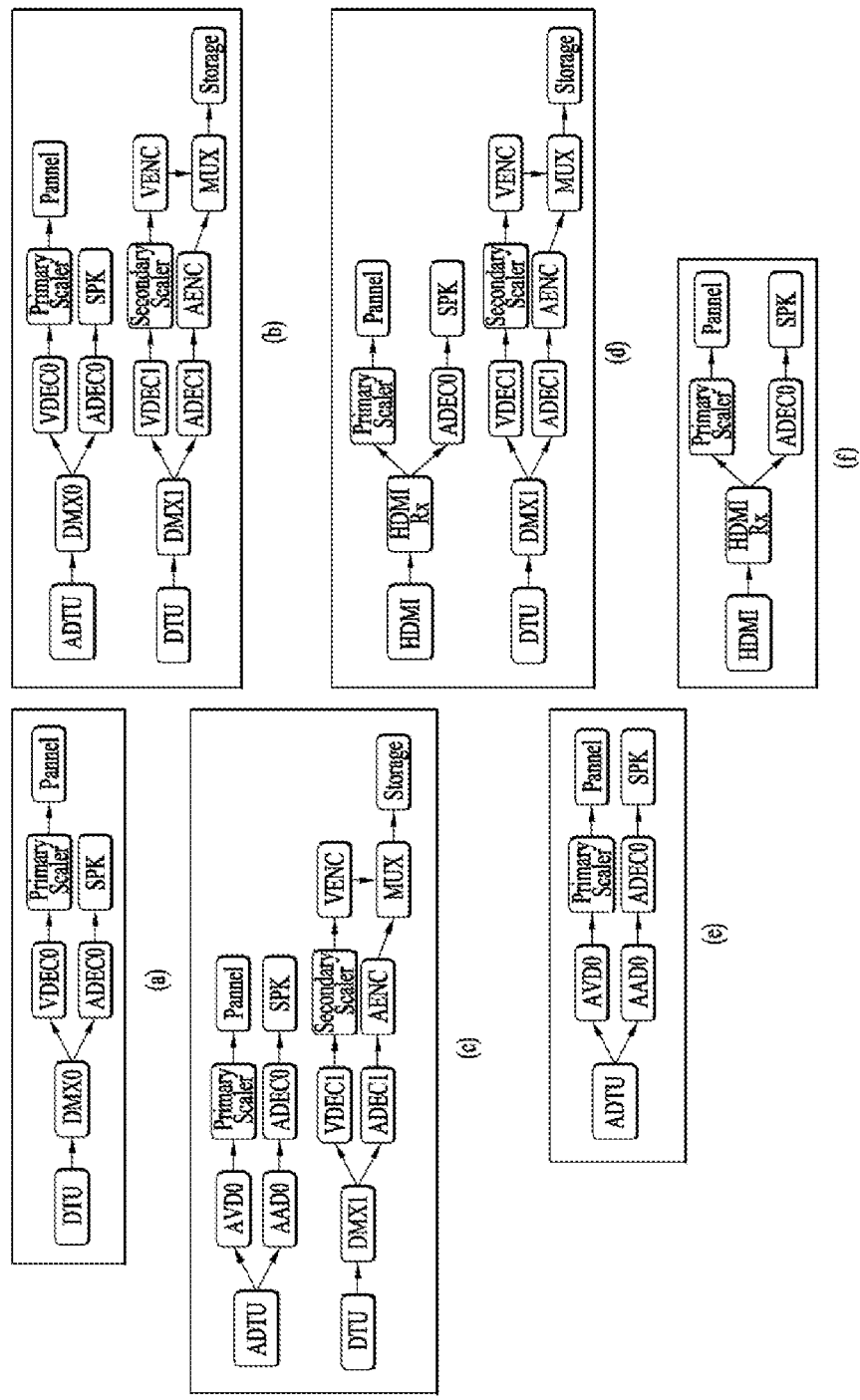

Meanwhile, although FIG. 49 is identical to the aforementioned FIG. 48, there is a difference only in implementing resource arrangement by little bit differentiating a shared resource among resources necessary for performing each operation or a plurality of operations at the same time. Since overall contents of FIG. 49 are identical to the aforementioned contents of FIG. 48, it may refer to the contents of FIG. 48. Explanation on details is omitted at this time.

Figure 50:
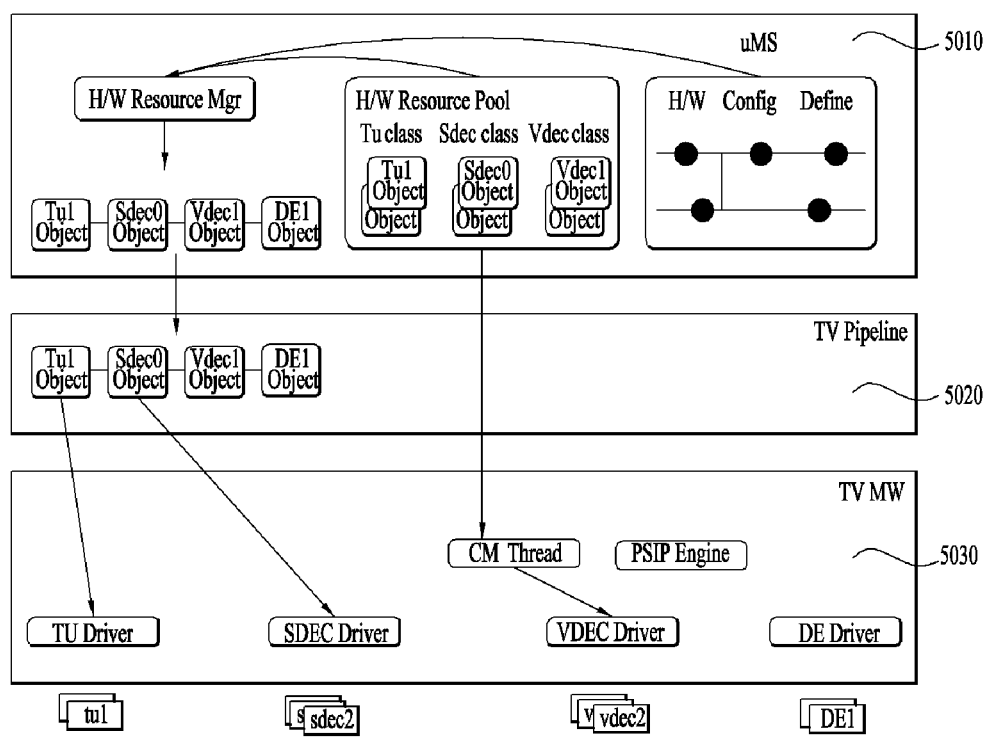
FIG. 50 is a diagram for explaining service reconstructing according to one embodiment of the present invention.

FIG. 50 is a diagram for explaining service reconstruction according to one embodiment of the present invention.

In particular, FIG. 50 relates to reconstruction of a TV service. This is because it is difficult to smoothly perform a TV service in a web OS-based digital device using a TV service structure of a legacy broadcast receiver. The legacy broadcast receiver uses an MRE corresponding to a system-based state machine in a manner of being equipped with an FSM (finite state machine). In case of using the MRE, there is inconvenience due to the FSM. Moreover, since a resource path is fixed in the legacy broadcast receiver, flexibility or expandability is less. Besides, the legacy broadcast receiver is unable to identify a difference between a UX scenario and a resource-restricted scenario. For example, although restriction on a resource is disappeared, it is difficult for the legacy broadcast receiver to destroy the resource-restricted scenario. Hence, in order to smoothly operate a TV service on a web OS platform, the present specification intends to restructure the TV service as follows.

Figure 51:
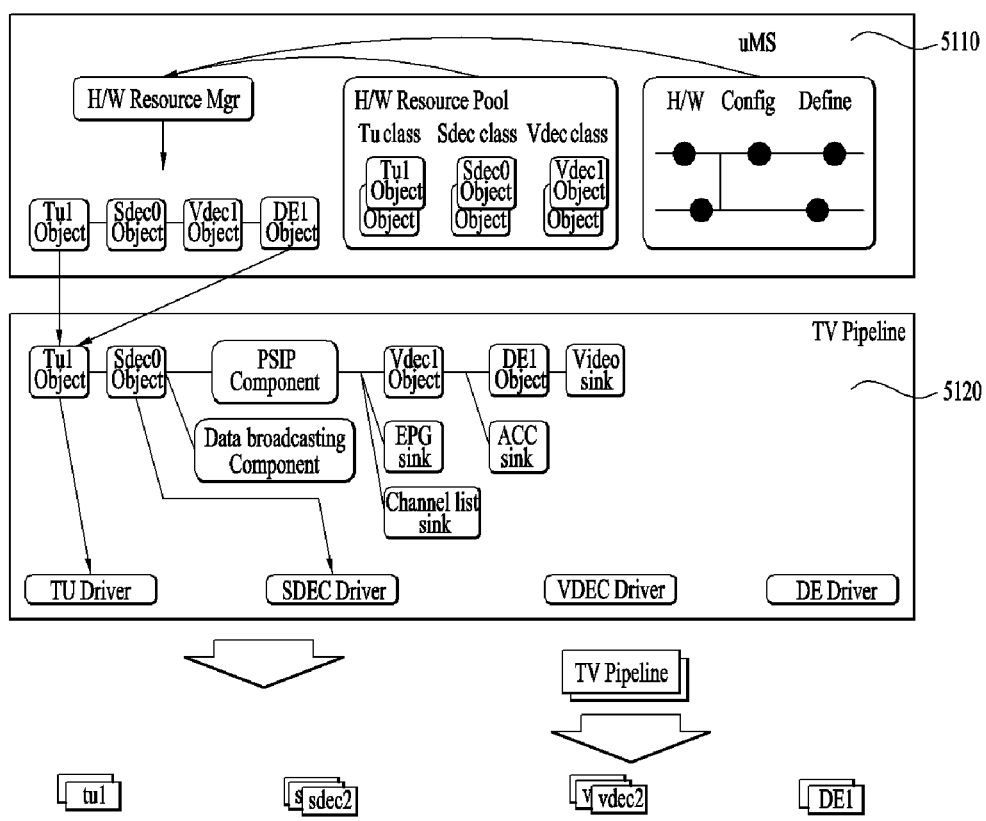
FIG. 51 is a diagram for explaining service reconstructing according to a different embodiment of the present invention.

First of all, the MRE used in the legacy broadcast receiver is not used. In particular, a centralized state machine is not used. To this end, as shown in FIG. 51, it may be able to reconstruct a TV service. For example, if there is an input change or a specific function is performed, a TV pipeline manager/TV pipeline sets a path on a web OS platform. A TV resource manager performs resource allocation in each state and a path manager provides path information. And, a TV service is potting to a web OS. This is to use a system-based virtual pipeline (pseudo pipeline) by reconstructing a TV service as shown in FIG. 50. Besides, a UX scenario and a resource-restricted scenario are separated from each other on a web OS platform. In other word, a TV policy manager or a TV pipeline manager is in charge of the resource-restricted scenario.

Referring to FIG. 50, a hardware resource manager receives a load request (Load tv://) and a media server 5010 defines a hardware resource configuration file. The hardware resource manager allocates resources based on the defined hardware resource configuration file. And, hardware resource manager receives class information from a hardware resource pool. The hardware resource manager generates path information (e.g., TU1 object-SDECO object-VDEC1 object-DE1 object) and transmits the path information to a TV pipeline. The TV pipeline 5020 configures a pipeline based on the received path information.

If the TV pipeline is configured, each object sends an open request to corresponding drivers of a TV middleware 5030 (e.g., TU1 open to TU driver, SDEC0 open to SDEC driver). By doing so, drivers related to an object are open and a path control is configured.

Subsequently, if a play request is received from the hardware resource manager, the received play request is delivered to a channel manager thread (CM thread) in the TV middleware. By doing so, a necessary driver is opened and a service is performed. As mentioned above, such a service operation as a channel change can be performed by controlling a hardware resource.

FIG. 51 is a diagram for explaining service reconstruction according to a different embodiment of the present invention.

In FIG. 51, since a processing of an upper part of a TV pipeline 5120 is identical to a processing of an upper part of a TV pipeline 5110 of FIG. 50, it may refer to the aforementioned contents. Explanation on detail contents is omitted at this time. Hence, a bottom part of the TV pipeline is mainly explained at this time.

As mentioned in the foregoing description, a main difference between FIG. 50 and FIG. 51 is a configuration of a TV pipeline. In case of the aforementioned FIG. 50, it is a configuration of a virtual pipeline for potting a TV service to a web OS. On the contrary, in case of FIG. 51, it is a configuration for replacing an MRE supported by a legacy TV service. Hence, the TV service reconstruction shown in FIG. 51 is different from a legacy TV service in such a function as a TV pipeline manager related to a TV pipeline, a TV resource manager, a path manager, and the like.

Compared to the virtual pipeline configuration shown in FIG. 50, referring to FIG. 51, it is able to see that more resources are arranged with each other in relation to a TV service that a configuration of a TV pipeline is requested. Unlike FIG. 50, referring to FIG. 51, drivers for resources can be directly handled by a TV pipeline end instead of a TV middleware end. For example, this can be regarded as a difference between FIG. 50 and FIG. 51.

A TV pipeline end 5120 is explained in more detail in the following with reference to FIG. 51.

As mentioned earlier in FIG. 50, resource arrangement for changing a channel using a TV service in a TV pipeline end is configured by a TU-SDEC-VDEC-DE object. For example, the arrangement of the object can be regarded as basic resources for the TV service. According to FIG. 50, if the basic resources are arranged, a TV middleware performs a following process in a manner of connecting relevant drivers and the resources with each other. On the contrary, according to FIG. 51, load is minimized by minimizing an involvement of the TV middleware end and the TV pipeline end directly handles drivers for connecting a resource, thereby increasing processing speed.

A TV pipeline for a channel change TV service shown in FIG. 51 is arranged in an order of TU-SDEC0-PSIP-VEDC1-DE1-VIDE0. In this case, a data broadcasting component can be arranged between the SDEC0 object and the PSIP component if necessary. EPG sink, channel list sink and the like can be arranged between the PSIP component and the VDEC1 object if necessary. And, it is able to know that ACC sink can be additionally arranged between the VDEC1 and the DE1 object. And, the TV pipeline end directly handles an object arranged in the pipeline, such a hardware resource as a component, sink, and the like, and driver open for connection. If the TV pipeline end directly handles a driver, an operation or a burden of the TV middleware can be minimized and quick access, processing and the like can be enabled. Meanwhile, in the foregoing description, the TV pipeline configuration configured for a channel change service corresponds to an example depicted for helping understand the present invention and for clarity, by which the present invention may be non-limited. And, in the foregoing description, the PSIP component can be changed into a DVB component or the like according to definition defined in a standard related to a signal. In addition, it may be able to add a more PSI component.

In the following, a policy management according to the present invention is explained in more detail with reference to the attached drawing.

In the foregoing description, when a pipeline is configured, resources are appropriately arranged using a resource sharing concept. Yet, resources of a digital device for a service or an application are limitative. Hence, in order to support the service or the application on a web OS of the present invention, it is necessary to appropriately arrange the limitative resources. In particular, in order to support multitasking on a web OS platform, appropriate resource arrangement is essential. In other word, when a service or an application is supported in a digital device, resources are required and a resource conflict may occur on one or more resources. If a resource conflict occurs, it is necessary to properly control the resource conflict to smoothly provide service to a user and minimize inconvenience of the user. In this case, policy management to be explained in more detail in the following may function. Meanwhile, the policy management may also be referred to as policy action in some cases in the following.

The policy management according to the present invention can be mainly performed by a centralized policy manager and a distributed policy manager. In this case, FIG. 52 shows the centralized policy manager and FIG. 53 shows the distributed policy manager.

Figure 52:
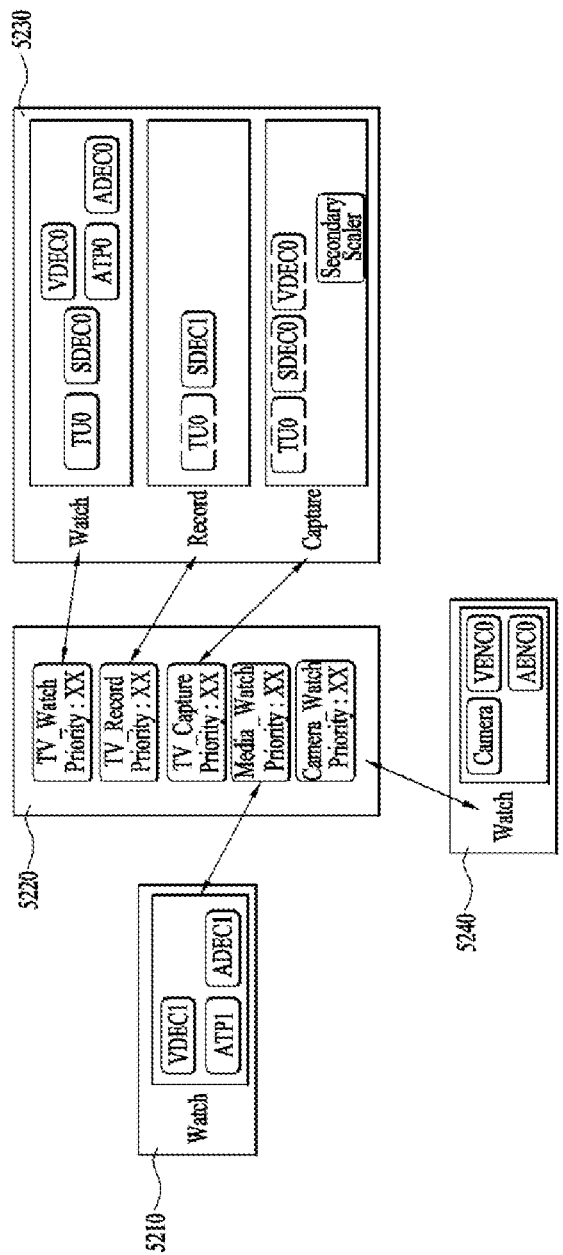
FIG. 52 is a diagram for explaining policy management according to one embodiment of the present invention.
Figure 53:
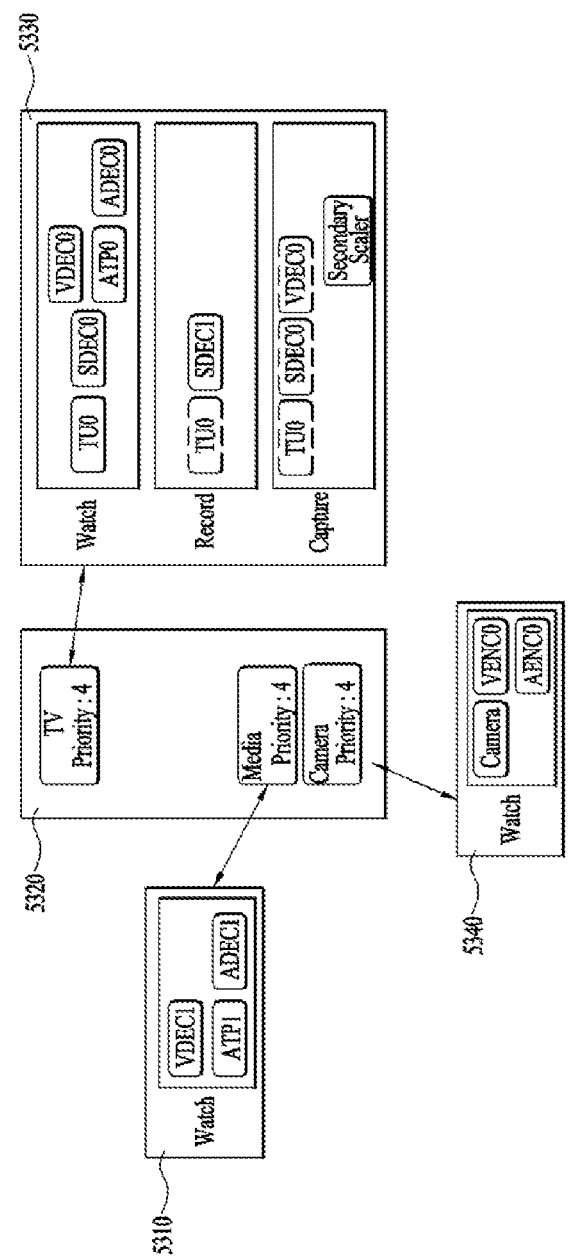
FIG. 53 is a diagram for explaining policy management according to a different embodiment of the present invention.

FIG. 52 is a diagram for explaining policy management according to one embodiment of the present invention.

First of all, a centralized policy manager is explained in the following with reference to FIG. 52.

Since a policy is basically applied to each pipeline, the policy is intuitive. If a resource conflict occurs, a resource manager of a media server considers a policy only. In other word, a pipeline(s) does not need to consider a policy. This is because resources are arranged to each pipeline in a manner that the resource manager considers a policy.

If there is a common policy commonly applied to a TV system, since it is easy to apply the policy, a centralized policy manager can reduce load. In other word, one or more resources or modules related to a pipeline may not basically consider a complex policy to reduce load. This can be interpreted as a meaning that it is necessary to apply a consistent policy to a digital device.

Yet, according to the centralized policy manager, since the policy manager should care about all policies in a digital device, there is a possibility that a code becomes complex. Since it is necessary to define not only the common policy but also a policy capable of processing various exceptions related to a service or an application incapable of being solved by the common policy, a code may become more complex. For this reason, when the centralized policy manager is adopted, code quality and reusability of a media server may decrease. If a new pipeline is added, it may have a burden of performing priority comparison with all legacy pipelines again and it may be necessary to determine an order again according to the priority. Meanwhile, if a digital device supports a TV service, in case of a sharable resource, dynamic priority, and the like, resource arrange may become complex.

Referring to FIG. 52, a media pipeline 5210 for watching requires VDEC1, ATP1, and ADCE1 resource for the watching. And, a TV service 5230 possesses 3 pipelines including a watch pipeline, a record pipeline, and a capture pipeline. In this case, the watch pipeline requires such resources as TU0, SDEC0, VDEC0, ATP0, and ADEC0, the record pipeline requires such resources as TU0 and SDEC1, and the capture pipeline requires such resources as TU0, SDEC0, VDE00, and secondary scaler. And, a camera pipeline 5240 requires such resources as Camera, VENCO, and AENCO for watching.

As mentioned in the foregoing description, if each pipeline requires resources, a resource manager 5220 of a media server appropriately allocates a required resource(s) to the pipeline. Yet, as mentioned in the foregoing description, since a digital device basically has restricted resources, it is necessary to properly allocate the restricted resources. As an example, the resource manager 5220 can indicate to share a TU0 resource commonly required by the 3 pipeline among resources required by the watch, record, and the capture pipeline of the TV service according to a resource sharing scheme. And, it may be able to indicate the watch and the capture pipeline to share such resources as SDEC0 and VDEC0. Meanwhile, as mentioned in the foregoing description, it is necessary for the resource manager to consider not only pipelines of a TV service but also resources required by a media pipeline and a camera pipeline. To this end, the resource manager 5220 stores resource allocation priority data in advance in response to each service and/or pipeline and may be able to allocate resources based on the resource allocation priority data. For example, referring to FIG. 52, the resource manager can indicate to properly allocate or share resources required by each pipeline according to the resource allocation priority in response to TV watching, TV recording, TV capturing, media watching, camera watching, and the like. In case of resource(s) at which a conflict occurs, a resource is allocated to a pipeline of higher priority based on the priority and a resource allocation declining intention can be returned to pipeline(s) of lower priority. As mentioned in the foregoing description, resource allocation based on the priority in consideration of possibility of occurrence of a resource conflict becomes a function of the policy manager. In other word, when a pipeline is generated and a resource is requested by the generated pipeline, the resource manager checks a conflict possibility between resource(s) allocated to previously generated pipeline(s) and the generated pipeline. As a result of the checking, if a conflict occurs, it may be able to appropriately determine a resource to be released and a pipeline to which the released resource is to be allocated according to a policy based on the priority. Although it is explained as the aforementioned policy management is based on the priority which is determined and stored in advance for each pipeline, the resource release or allocation can also be determined by more considering LRU (least recently used) data in some cases.

FIG. 53 is a diagram for explaining policy management according to a different embodiment of the present invention.

Unlike the centralized policy manager mentioned earlier in FIG. 52, FIG. 53 shows a distributed policy manager.

According to the distributed policy manager, the distributed policy manager has higher independence between services compared to the centralized policy manager. And, since the centralized policy manager considers exception processing for various services, a code becomes complicated. On the other hand, according to the distributed policy manager, the exception processing of the service is internally processed by the service. Hence, there is no impact on priority in a relation with a different service. As mentioned in the foregoing description, according to the distributed policy manager, since it is not necessary for a resource manager of a media server to care about all policies on a digital device, a code becomes simplified, reusability is higher compared to that of the centralized policy manager, and it is able to easily manage a resource. Besides, since a policy is separately performed in a service unit, a module best knowing about a corresponding service manages a policy and it is able to easily apply priority when a new pipeline is added.

On the contrary, according to the distributed policy manager, it is difficult to apply or process the common policy. And, it is necessary to have a function or a module for individually managing a policy for each service.

The distributed policy manager of FIG. 53 is similar to the aforementioned FIG. 52. Hence, explanation on overlapped contents is omitted at this time. It may refer to the aforementioned contents. Hence, in the following, a part different from the aforementioned centralized policy management scheme is mainly explained.

The centralized policy management shown in FIG. 52 is performed in a pipeline unit. On the contrary, the distributed policy management shown in FIG. 53 is performed in a service unit. Meanwhile, similar to the centralized policy management shown in FIG. 52, the distributed policy management shown in FIG. 53 can perform policy management based on priority and/or LRU. Yet, as mentioned in the foregoing description, a media server is in charge of minimum load only and a corresponding service is in charge of details.

Referring to FIG. 53, a media server determines priority for a TV, a media, and a camera service only in advance and store the priority. Hence, if a resource request is received from each service, the media server allocates a resource to a corresponding service based on priority and/or LRU of the service. Whenever a resource request is received from each service, the aforementioned processing flow considers a possibility of conflict occurrence. If a resource conflict situation occurs, it is able to perform policy managing based on the consideration.

Meanwhile, although it is not depicted in the present specification, the centralized policy management scheme shown in FIG. 52 and the distributed policy management scheme shown in FIG. 53 can be used in a manner of being appropriately mixed. For example, if resource allocation is requested by a service, as shown in FIG. 53, a media server checks whether there is a possibility of resource conflict in a service unit based on the distributed policy management scheme and allocates a resource based on a result of the checking. In this case, the media server continuously allocates a resource in a service unit according to the distributed policy management scheme. If a plurality of pipelines are generated in a corresponding service, the media server can autonomously allocate a resource. After determination is made in a service unit, it may be able to allocate a resource in a pipeline unit in a corresponding service according to the centralized scheme shown in FIG. 52. Or, if a pipeline in a service corresponds to a single pipeline, the media server may use the distributed scheme. If a pipeline in a service corresponds to multiple pipelines, the media server may be able to use the centralized scheme, and vice versa. And, it may be able to use the distributed scheme only when a plurality of services request a resource.

FIGS. 54 to 57 are diagrams for explaining policy management between a TV service and a media pipeline according to one embodiment of the present invention.

Figure 54:
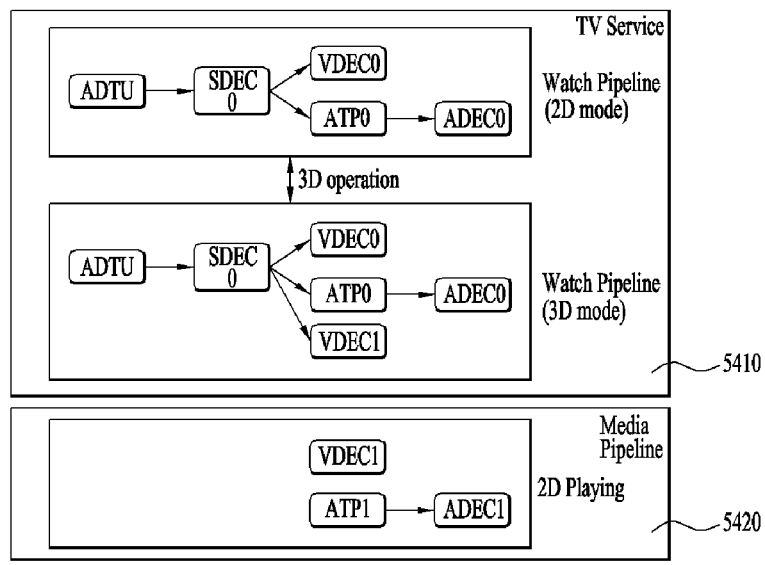
FIGS. 54 to 57 are diagrams for explaining policy management between a TV service and a media pipeline according to one embodiment of the present invention.

Referring to FIG. 54, it shows a watching pipeline (A) of a 2D (2-dimensional) mode and a watching pipeline (b) of a 3D (3-dimensional) mode generated by a TV service 5410 and a media pipeline (C) 5420 for playing 2D. In the foregoing description, the 2D mode watching pipeline (A) requires ADTU, SDEC0, VDEC0, ATP0 and ADEC0 resource, the 3D mode watching pipeline (B) requires ADTU, SDEC0, VDEC0, ATP0, ADEC0, and VDEC1 resource, and the media pipeline (c) 5420 requires VDEC1, ATP1, and ADEC1 resource. In FIG. 54, the alphabet A, B, and C are used to simply explain each pipeline for clarity. Yet, as a different embodiment, the alphabet may indicate policy priority, an order of generating a pipeline, or an order of requesting resource allocation. In the following, for clarity, assume that the alphabet indicates each pipeline, by which the present invention may be non-limited.

In case of a legacy smart TV, if C pipeline makes a request for resource allocation after a resource is allocated to A pipeline and B pipeline, a media server rejects the resource allocation request of the C pipeline due to a conflict between VDEC1 of the B pipeline and VDEC1 resource of the C pipeline. Or, if the B pipeline makes a request for resource allocation after a resource is allocated to the A pipeline and the C pipeline, a resource conflict occurs between the B and the C pipeline. In this case, the legacy smart TV controls a TV service to be preferentially released. In particular, since priority of the TV service is higher, a resource allocated to the C pipeline to which VDEC1 resource is allocated can be released in response to the resource conflict. As a result, a TV service according to the A pipeline and the B pipeline is performed in a TV. And, if resource allocation is requested in an order of the C and the A pipeline, since there is no resource conflict situation, corresponding services can be performed at the same time in the legacy smart TV. In this case, if the B pipeline is generated and a resource allocation request is received, a resource conflict occurs between the B pipeline and the C pipeline. Hence, a resource is not allocated to the B pipeline to which a resource is lastly allocated. Hence, in this case, if the C pipeline is destroyed or a resource is not released from the C pipeline, a 3D service becomes a service unavailable in the legacy smart TV.

On the contrary, unlike the aforementioned legacy smart TV, if a resource conflict occurs, policy management can be performed in a digital device in which a web OS platform according to the present invention is installed.

When the A and the B pipeline make a request for resources and the resources are allocated via resource sharing or the like, if the C pipeline is generated and a resource request is received, a web OS device can inquire of a TV service about whether the TV service is able to release a VDEC resource. In this case, a digital device can inquire of a user about selection of the user in a GUI or an OSD message form. If the user determines to eliminate a 3D mode watching pipeline, a VDEC resource can be allocated to a media pipeline. Yet, if the user does not want to eliminate the 3D mode watching pipeline, a TV service may reject a policy of the policy manager. Hence, the media pipeline is unable to obtain the VDEC resource.

On the contrary, when a resource allocation request is received in B pipeline in a state that A and C pipeline preferentially occupy resources, if the B pipeline makes a request for a PIP TV service, it may be able to reject a resource allocation request of the B pipeline. Yet, if the B pipeline makes a request for a full-screen TV service, it may be able to make a request for a VDEC resource according to the B pipeline to a resource manager. And, the resource manager can make a request for the release of the VDEC resource to a media pipeline.

As mentioned in the foregoing description, policy management in a legacy smart TV and policy management in a web OS device according to the present invention can be differently performed.

In the following, explanation on contents overlapped with the aforementioned contents is omitted. A difference is mainly explained in the following.

Figure 55:
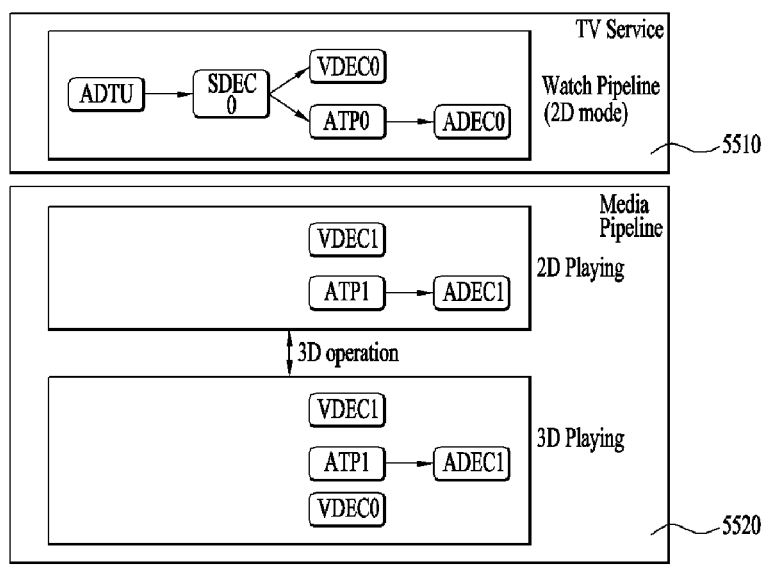

First of all, FIG. 55 shows a 2D mode watching pipeline (A) as a TV service 5510 and a 2D playing pipeline (b) and a 3D playing pipeline (C) as media pipelines 5520. In FIG. 55, there is a possibility of conflict of a VDEC0 resource between the A pipeline and the C pipeline.

In a legacy smart TV, if the C pipeline makes a request for a resource after a resource is allocated to the A pipeline and the B pipeline, it may be able to make the A pipeline release the allocated resource. If the B pipeline makes a request for a resource after a resource is allocated to the A pipeline and the C pipeline, as mentioned above, it may be able to make the A pipeline release the allocated resource. Meanwhile, if the B pipeline makes a request for a resource after a resource is sequentially allocated to the C pipeline and the A pipeline, it may also be able to make the A pipeline release the allocated resource. If the A pipeline makes a request for a resource after a resource is sequentially allocated to the C pipeline and the B pipeline, the resource allocation request of the A pipeline is rejected.

On the contrary, a web OS device according to the present invention is processed as follows.

When the C pipeline makes a request for resource allocation after a resource is allocated to the A pipeline and the B pipeline and when the C pipeline makes a request for resource allocation after a resource is sequentially allocated to the B pipeline and the A pipeline, if the C pipeline makes a request for a media service via PIP, the request of the C pipeline is rejected. Yet, if the C pipeline makes a request for a media service via a full-screen, it is necessary for the C pipeline to make a request for a VDEC resource to a media server. In this case, the media server makes a request for the release of VDEC to a TV service. Hence, the A pipeline releases the VDEC resource.

On the contrary, when the A pipeline makes a request for resource allocation after a resource is allocated to the B pipeline and the C pipeline, the media server makes a request for the release of VDEC to the media pipeline. In particular, if a user determines to eliminate the C pipeline, the TV service becomes available by receiving VDEC resource allocation. Otherwise, the media pipeline rejects a policy and the TV service becomes unavailable since the TV service is unable to obtain the VDEC resource.

Figure 56:
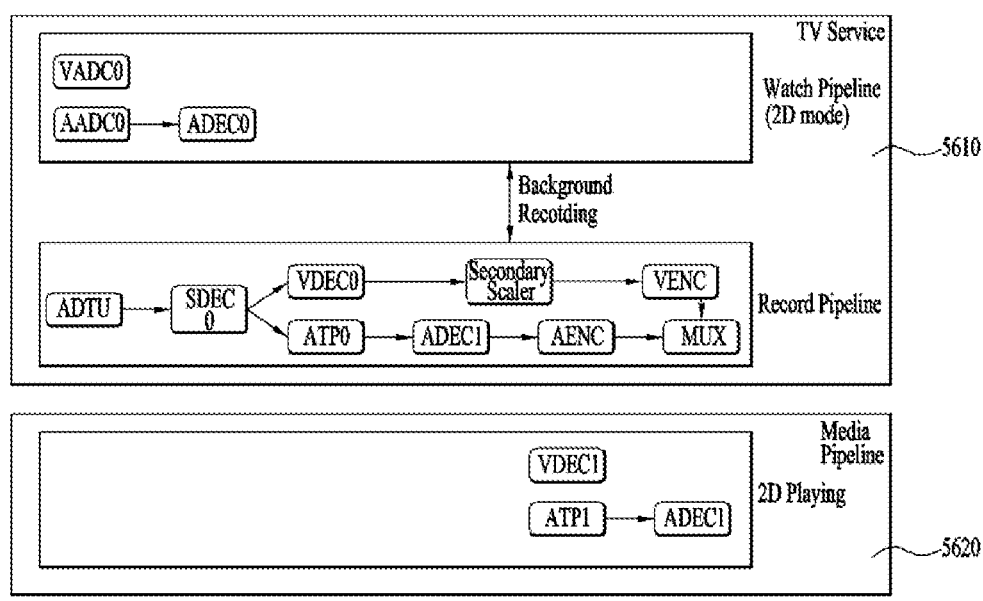

FIG. 56 shows a watching pipeline (A) according to a component input and a recording pipeline (B) as a TV service 5610 and a 2D playing pipeline (C) as a media pipeline 5620. In this case, the A pipeline requires VADC0, AADC0, and ADEC0 resource, the B pipeline requires ADTU, SDEC0, VDEC0, secondary scaler, VENC, ATP0, ADEC1, AENC, and MUX resource, and the C pipeline requires VDEC1, ATP1, and ADEC1 resource. In FIG. 56, there is a possibility of conflict of ADEC1 resource between the B and the C pipeline.

According to the present invention, when the C pipeline makes a request for a resource after a resource is allocated to the A and the B pipeline, when the B pipeline makes a request for a resource after a resource is allocated to the A and the C pipeline, when the B pipeline makes a request for a resource after a resource is allocated to the C and the A pipeline, when the A pipeline makes a request for a resource after a resource is allocated to the C and the B pipeline, if a PIP screen is requested in a pipeline in which the last resource request is made, the PIP screen request is all rejected.

Figure 57:
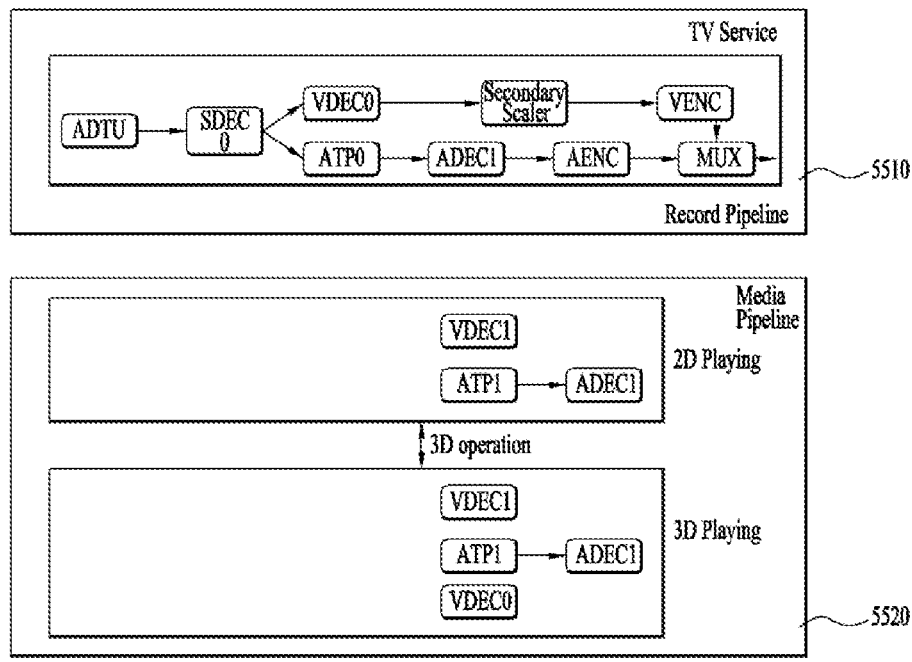

Lastly, FIG. 57 shows a pipeline (A) as a TV service 5710 and a 2D playing pipeline (B) and a 3D playing pipeline (C) as a media pipeline 5720. In FIG. 57, there is a possibility of conflict of VDEC0 and ADEC1 resources between the TV service and the media pipeline.

In case of a legacy smart TV, resource allocation of the C pipeline is rejected in any case and the C pipeline should release a pre-allocated resource. On the contrary, in case of a web OS device, although a media server makes a request for the release of a VDEC resource to a TV service, the TV service rejects the policy and the media pipeline fails to receive allocation of the VDEC resource. Hence, in this case, the TV service can be terminated in the C pipeline due to the VDEC0 resource. Or, all services may become unavailable except a case of releasing a random resource.

Figure 58:
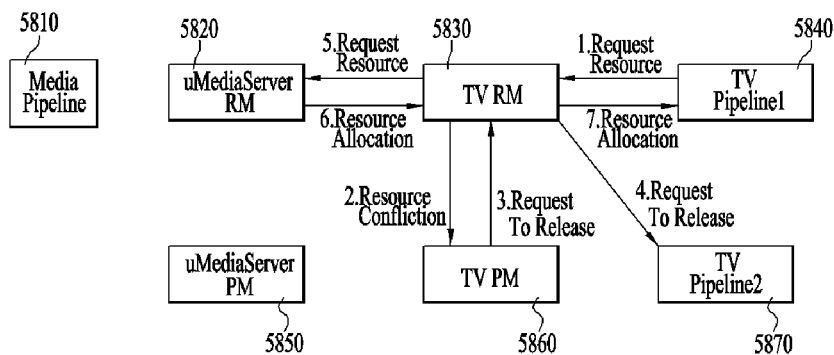
FIG. 58 is a diagram for explaining a policy scenario between TV pipelines according to one embodiment of the present invention.

FIG. 58 is a diagram for explaining a policy scenario between TV pipelines according to one embodiment of the present invention.

For example, FIG. 58 may correspond to contents on the distributed policy management mentioned earlier in FIG. 53 rather than the centralized policy management mentioned earlier in FIG. 52.

According to the present invention, a media server and a TV service processing unit function in relation to resource management and policy management. In this case, the media server includes a resource manager 5820 and a policy manager 5850. In relation to the media server, one or more media pipelines ma exist for a media service. Meanwhile, the TV service processing unit can also include a TV resource manager 5830 and a TV policy manager 5860 and controls one or more TV pipelines for a TV service.

According to the present invention, such a resource(s) as a tuner corresponds to a resource(s) used for a TV service only. Hence, the TV resource manager 5830 can autonomously recognize a resource conflict. If the resource conflict is recognized before a resource is obtained, the TV policy manager 5860 can appropriately process the resource conflict.

According to the present invention, if a TV pipeline1 5840 makes request for a resource, the TV resource manager 5830 inquires of the TV policy manager about whether or not a resource conflict occurs. And, the TV policy manager 5860 makes a request for the release of a resource of a TV pipeline2 5870 to process the resource conflict via the inquiry. Yet, this is a case that a resource conflict occurs.

When a conflict occurs or a conflict does not occur, the TV resource manager 5830 makes a request for resource allocation to a resource manager 5820 of a media server, receive resource allocation from the resource manager 5820 of the media server, and allocates the allocated resource to the TV pipeline1 5840.

Figure 59:
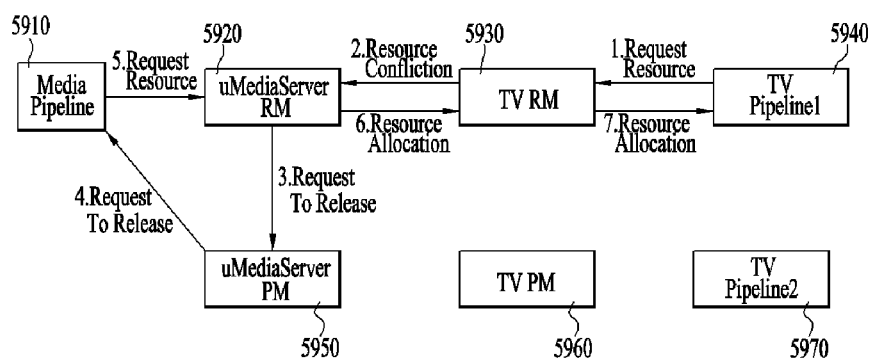
FIGS. 59 to 60 are diagrams for explaining a policy scenario between a TV pipeline and a media pipeline according to one embodiment of the present invention.
Figure 60:
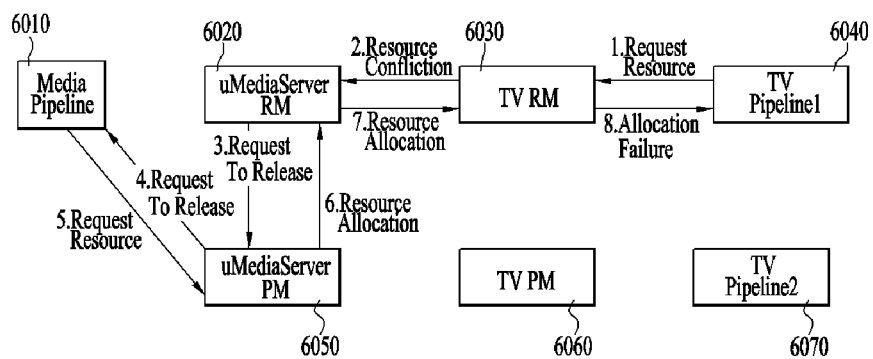

In FIG. 58, for example, TV pipelines (the TV pipeline1 5840, the TV pipeline2 5870) exit only. Unlikely, in the following, a case that one or more media pipelines exist is explained. FIGS. 59 to 60 are diagrams for explaining a policy scenario between a TV pipeline and a media pipeline according to one embodiment of the present invention.

In this case, for example, FIGS. 59 and 60 are explained in a manner of assuming a case that a resource is allocated to a media pipeline 5910 when the resource is requested by a TV pipeline.

Referring to FIG. 59, if a TV pipeline1 5940 makes a request for resource allocation to a TV resource manager 5930, the TV resource manager 5930 makes a request for resource allocation to a resource manager 5920 of a media server to obtain a resource in response to the request of the TV pipeline1. The resource manager 5920 of the media server inquires of a policy manager 5950 about whether or not a resource conflict occurs. The policy manager 5950 of the media server makes a request for the release of a pre-allocated resource to a media pipeline 5910 according to the request of the resource manager 5920. If the media pipeline 5910 reports that the resource is released to the resource manager 5920 of the media server, the resource manager 5920 of the media server allocates a resource requested by the TV resource manager 5930. The TV resource manager 5930 allocates the obtained resource to the TV pipeline1 5940.

Referring to FIG. 60, a TV pipeline1 5940 makes request for resource allocation to a TV resource manager 5930 and the TV resource manager makes a request for resource allocation to a resource manager 5920 of a media server in response to the request of the TV pipeline 1. The resource manager 5920 of the media server inquires of a policy manager 5950 of the media server about whether or not a resource conflict occurs. If the resource conflict occurs, the policy manager 5950 makes a request for the release of a corresponding resource to a media pipeline 5910. If the media pipeline 5910 rejects the request of the policy manager 5950, the policy manager 5950 reports the rejection of the release to the resource manager 5920 and the resource manager 5920 of the media server reports that resource allocation is unavailable to the TV resource manager 5930. The TV resource manager 5930 delivers the report to the TV pipeline1 5940.

In both FIGS. 59 and 60, there is a resource conflict issue between a TV pipeline and a media pipeline. Yet, in FIG. 59, the media pipeline 5910 accepts a release request of the policy manager 5950. On the contrary, the release request is rejected in FIG. 60.

Figure 61:
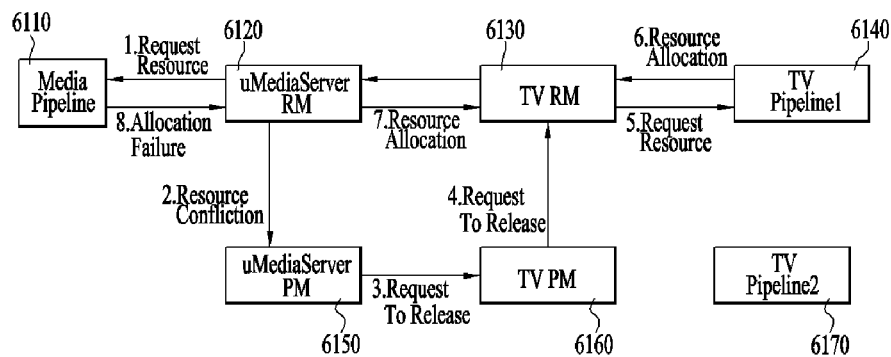
FIGS. 61 to 62 are diagrams for explaining a policy scenario between a TV pipeline and a media pipeline according to a different embodiment of the present invention.
Figure 62:
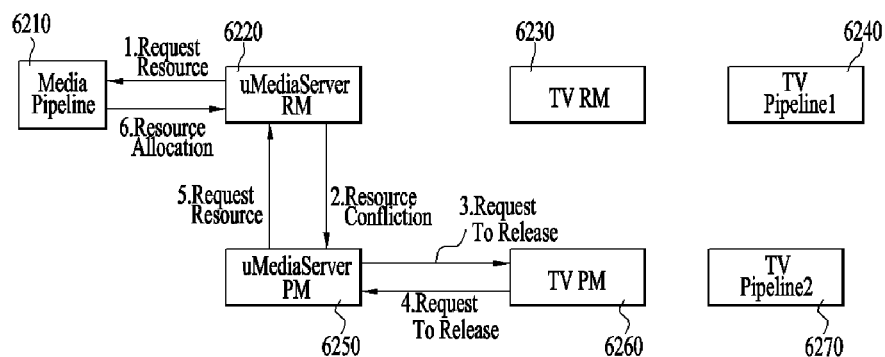

FIGS. 61 to 62 are diagrams for explaining a policy scenario between a TV pipeline and a media pipeline according to a different embodiment of the present invention.

Unlike the aforementioned FIGS. 59 to 60, FIGS. 61 to 62 show a resource processing procedure when a resource requested by a media pipeline 6110 corresponds to a resource previously obtained by a TV pipeline 6140.

Referring to FIG. 61, if a media pipeline 6110 makes a request for resource allocation to a resource manager 6120 of a media server, the resource manager 6120 inquires of a policy manager 6130 about whether or not a resource conflict occurs. If the policy manager 6150 determines as a resource conflict occurs, a policy manager 6150 of the media server makes a request for the release of a resource at which the conflict occurs to a TV policy manager 6160. Having received the resource release request from the policy manager 6150 of the media server, the TV policy manager 6160 makes request for a resource release session to the TV resource manager 6130. The TV resource manager 6130 delivers the resource release session request of the policy manager 6150 to a TV pipeline1 6140 and the TV pipeline1 6140 makes a request for the release of a resource to the TV resource manager 6130 according to the delivered resource release session request. The resource manager 6130 makes a request for the release of a corresponding resource to the resource manager 6120 of the media server again. Lastly, the resource manager 6120 of the media server allocates the resource released from a TV service to a media pipeline 6110.

Although FIG. 62 is similar to the aforementioned FIG. 61, when the media server policy manager 6250 makes a request for the release of a resource at which a conflict occurs to the TV policy manager 6260, FIG. 62 shows a case that the TV policy manager rejects the request of the release. In this case, the media server policy manager 6250 delivers the rejection of the request to the media server resource manager 6220 and the media server resource manager 6220 informs the media pipeline 6210 that resource allocation is unavailable.

Lastly, in resource management according to the present invention, media play suspending and resuming in a digital device, which is connected with a consumer device of restricted hardware resources, is explained in more detail in the following with reference to the attached drawing.

For example, the media play suspending and resuming are similar to the contents of the aforementioned resource management and the policy management. Hence, contents overlapped with the contents of the resource management and the policy management are omitted or briefly explained. A different part is mainly explained in the following.

Figure 63:
FIG. 63 is a diagram for explaining a basic call sequence of a resource manager according to one embodiment of the present invention.

FIG. 63 is a diagram for explaining a basic call sequence of a resource manager according to one embodiment of the present invention.

As shown in FIG. 63, a call sequence is performed between a resource manager 6320 and a resource manager client 6310. In this case, the resource manager client 6310 includes all services, applications, and the like using a resource of a digital device such as a TV service, a media service, a web application and the like.

First of all, the resource manager client 6310 registers a policy action handler and a pipeline at the resource manager 6320, respectively (S6302/S6304).

The resource manager 6320 returns an identifier (ConnectionID) necessary for the resource manager client to connect with the resource manager 6320 to the resource manager client in response to the registration of the step S6302 and S6304 (S6306).

Subsequently, the resource manager client informs the resource manager of transaction start (startTransaction) (S6308). In this case, the resource manager client 6310 informs the resource manager of the transaction start in a manner of including the Connection ID received in the step S6306 and makes request for time-out.

The resource manager client makes a request for resource allocation to the resource manager together with the ConnectionID and receives resource allocation (S6310).

The resource manager client informs the resource manager of transaction end (endTransaction) in a manner of including the ConnectionID and the time-out again (S6312).

As mentioned in the foregoing description, having received the ConnectionID via the step S6306, the resource manager client 6310 performs a necessary operation by starting the operation with the startTransaction and ending the operation with the endTransaction whenever an action exists.

In particular, the step S6308 to the step S6312 corresponds to a basic call sequence for a procedure of obtaining a necessary resource after a pipeline is generated.

In the following, a call sequence for releasing a previously obtained resource is explained. As mentioned in the foregoing description, the resource manager client 6310 transmits startTransaction (connectionID, time-out) (S6314) and makes a request (connectionID, resources) for the release of a previously allocated resource (S6316). If the resource release is terminated, the resource manager client 6310 transmits endTransaction (connectionID, timeout) (S6318) and a call sequence is performed.

Subsequently, in case of eliminating the generated pipeline, the resource manager client 6310 makes a request for unregistering the registered pipeline (unregisterPipeline) to the resource manager 6320 (S6320).

As mentioned in the foregoing description, a call sequence is performed between the resource manager client 6310 and the resource manager 6320.

Figure 64:
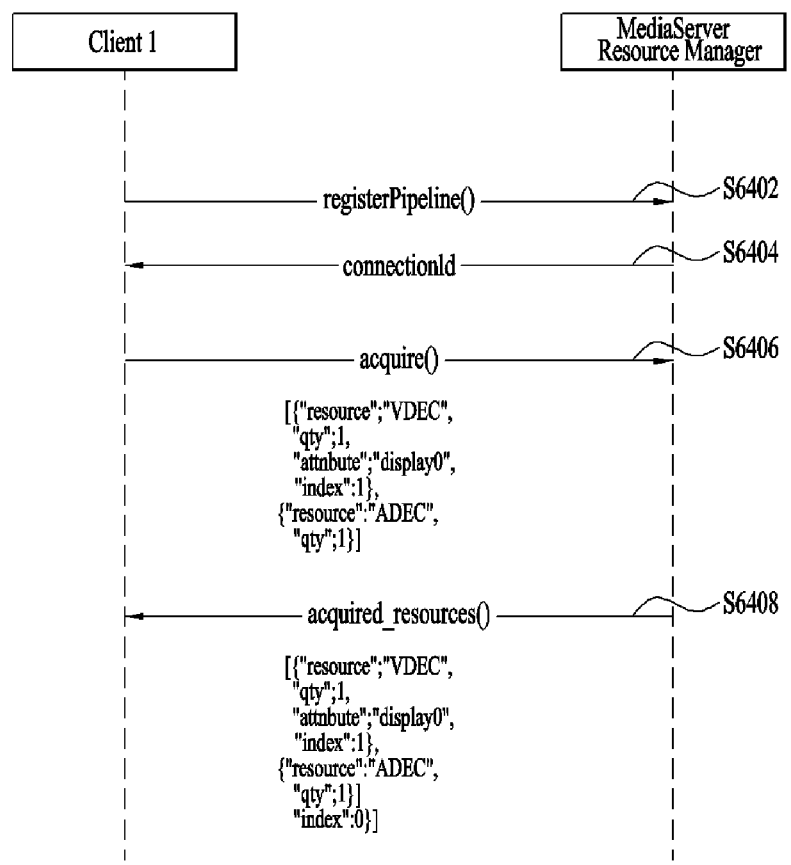
FIG. 64 is a sequence diagram for explaining a resource acquisition procedure according to one embodiment of the preset invention.

FIG. 64 is a sequence diagram for explaining a resource acquisition procedure according to one embodiment of the preset invention.

For example, the procedure of obtaining a resource mentioned earlier in FIG. 63 is explained in more detail in FIG. 64.

Referring to FIGS. 63 and 64, a client 6410 registers a pipeline at a resource manager 6420 of a media server (S6402) and receives connectionID to connect with the resource manager (S6404).

Subsequently, the client 6410 makes a request for allocation of a resource(s) necessary for implementing a function of a pipeline (S6406). For example, the client 6410 makes a request for a necessary resource to the resource manager 6420 as follows: [{"resource":"VDEC", "qty":1, "attribute":"display( )", "index":1}, {"resource":"ADEC", "qty":1}]

The resource manager 6420 obtains a resource by managing the resource according to the request of the client 6410 in the step S6406 and delivers the resource to the client (S6408). In this case, the resource manager 6420 specifies information on the obtained resource and delivers the information to the client 6410: [{"resource":"VDEC", "qty":1, "attribute":"display( )", "index":1}, {"resource":"ADEC", "qty":1,"Index":0}]

Figure 65:
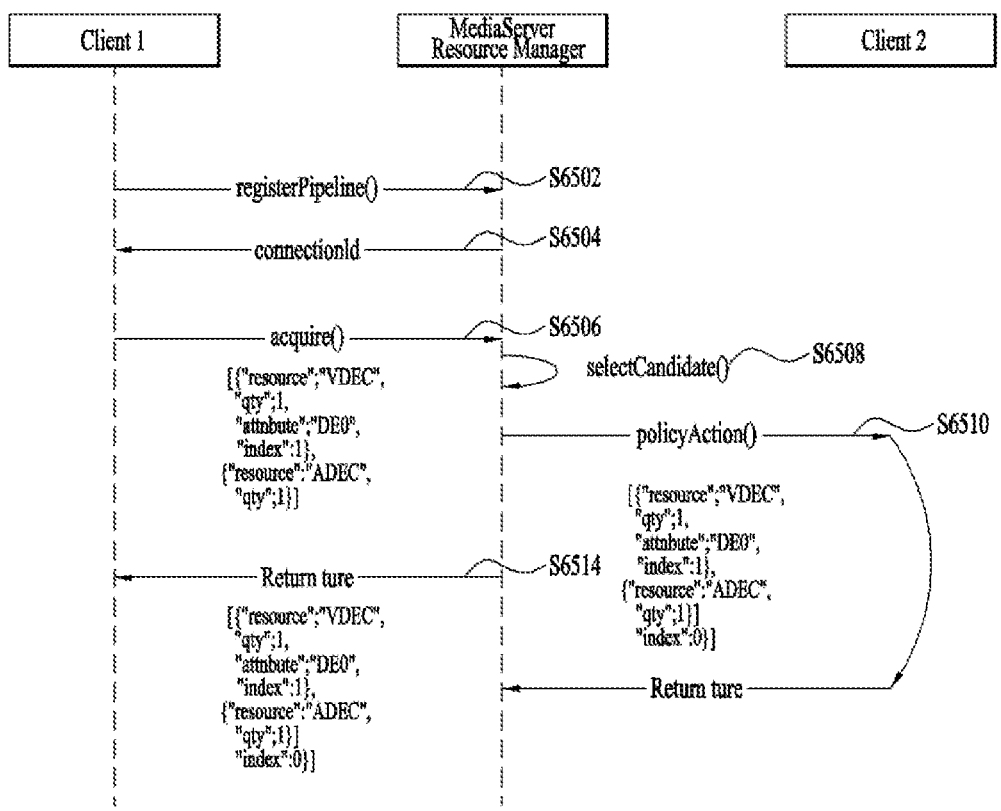
FIGS. 65 to 66 are sequence diagrams for explaining an interface between a TV resource manager and a media server resource manager according to one embodiment of the present invention.
Figure 66:
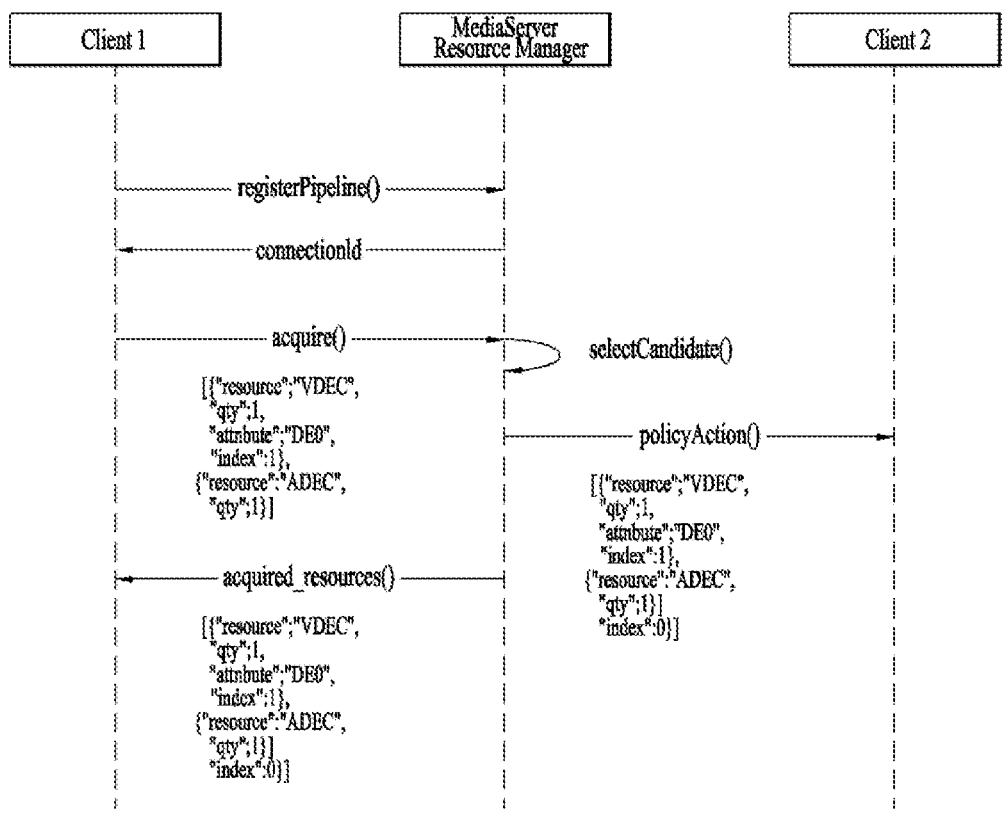

FIGS. 65 to 66 are sequence diagrams for explaining an interface between a TV resource manager and a media server resource manager according to one embodiment of the present invention.

FIG. 65 is similar to the aforementioned FIG. 64. Yet, FIG. 65 shows a case that two (plural numbers) clients exist while FIG. 64 shows a case that a single client exists.

A client1 6510 registers a pipeline at a resource manager 6520 of a media server (S6502) and receives connectionID from the resource manager to connect with the resource manager (S6504).

Subsequently, the client1 6510 makes a request for allocation of a resource(s) necessary for implementing a function of a pipeline (S6406). For example, the client1 6510 makes a request for a necessary resource to the resource manager 6520 as follows: [{"resource":"VDEC", "qty":1, "attribute":"display( )", "index":1}, {"resource":"ADEC", "qty":1}].

The resource manager 6520 obtains a resource by managing the resource according to the request of the client 6510 in the step S6506 and delivers the resource to the client (S6514). In this case, the resource manager 6520 specifies information on the obtained resource and delivers the information to the client 6510: [{"resource":"VDEC", "qty":1, "attribute":"display( )", "index":1}, {"resource":"ADEC", "qty":1,"Index":0}].

In FIG. 65, unlike the aforementioned FIG. 64, it is necessary for the resource manager 6520 to consider a relation with a different client, i.e., a client2 6530, after the step S6506 and before the step S6514. In particular, the resource manager should consider the relation with the clint2 before an allocated resource is delivered to the client1 6510. Hence, it is necessary for the resource manager 6520 to search for (selectCandidate( )) a pipeline or a client including a candidate resource (S6508).

Subsequently, if a candidate client2 6530 exists in response to a resource allocation request of the client1 6510, the resource manager 6520 makes a request for a policy action to the client2 6530. In this case, the resource manager 6520 specifies information on a resource to be released and delivers the information as follows: [{"resource":"VDEC", "qty":1, "attribute":"display( )", "index":1}, {"resource": "ADEC", "qty":1,"Index":0}].

Subsequently, if TRUE is returned from the client2 6530, the resource manager 6520 recognizes that a pre-allocated resource is released from the client2 6530 and performs the step S6514.

Or, as shown in FIG. 66, if the policy action is transmitted, the resource manager 6520 can release a resource of the client2 6530. In particular, although the resource manager does not receive a return from the client2 6530, the resource manager can immediately allocate the released resource to the client1 6510.

Figure 67:
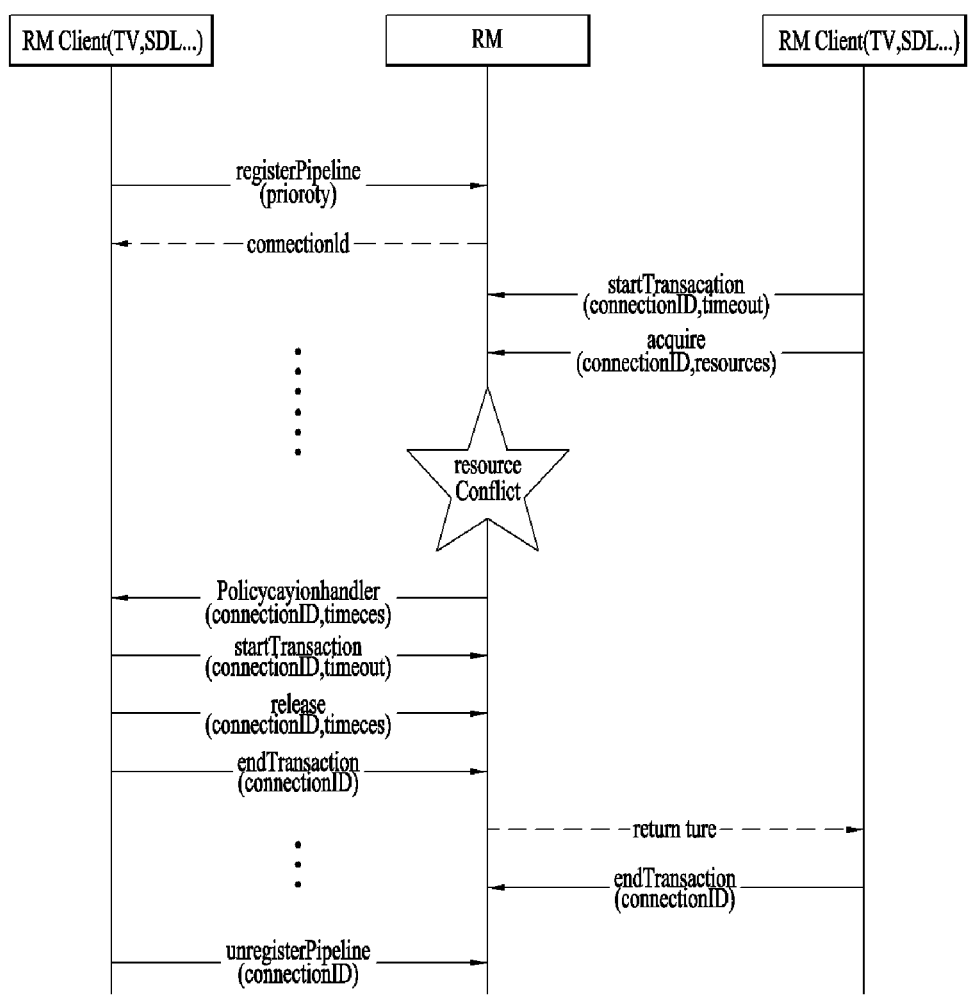
FIG. 67 is a sequence diagram for explaining a call sequence of resource competition according to one embodiment of the present invention.

FIG. 67 is a sequence diagram for explaining a call sequence of resource competition according to one embodiment of the present invention.

FIG. 67 is similar to the aforementioned contents of FIGS. 63 to 66.

Assume that a client 1 and a client 2 respectively register a pipeline at a resource manager, receive connectionID from the resource manager, and the client 1 preferentially receives a specific resource by transmitting startTransaction (connectionID, timeput) and acquire (connectionID, resources) to the resource manager.

Subsequently, the client 2 transmits startTransaction (connectionID, timeput) and acquire (connectionID, resources) to the resource manager to receive the specific resource to perform a function according to a request of a user or switching to the foreground from the background.

In this case, since a plurality of clients make a request for an identical restricted resource, a resource conflict occurs. The resource conflict cannot be solved by the aforementioned resource sharing concept.

In this case, the resource manager should allocate a resource to either the client 1 or the client 2. In other word, if a resource conflict occurs by receiving a resource allocation request of the client 2, the resource manager should release a pre-allocated resource to the client 1 or reject (not depicted) the resource allocation request of the client 2. In this case, for example, FIG. 67 shows the former case.

In other word, the resource manager can recognize the occurrence of the resource conflict resulted from the resource allocation request of the client 2 or recognize the occurrence of the resource conflict according to the confirmation of a policy manager. The resource manager assumes that policy priority of the client 2 is higher with the help of the policy manager and makes a request for the release of the resource previously allocated to the client 1 (Policyactionhandler(connectionID, resources)).

Having received the policy action, the client 1 transmits startTransaction (connectionID, timeout), release (connectionID, resources), and endTransaction (connection ID) to the resource manager to release the pre-allocated resource.

After the endTransaction (connectionID) indicating the end of the release transaction of the client 1 is received, the resource manager returns a fact that resource allocation is available and resource allocation to the client 2 (return true). Subsequently, the client 2 transmits endTransaction (connection ID) to the resource manager.

Meanwhile, if the client 1, which has released the resource, determines that pipeline maintenance is not necessary anymore, the client 1 unregisters the registered pipeline.

Figure 68:
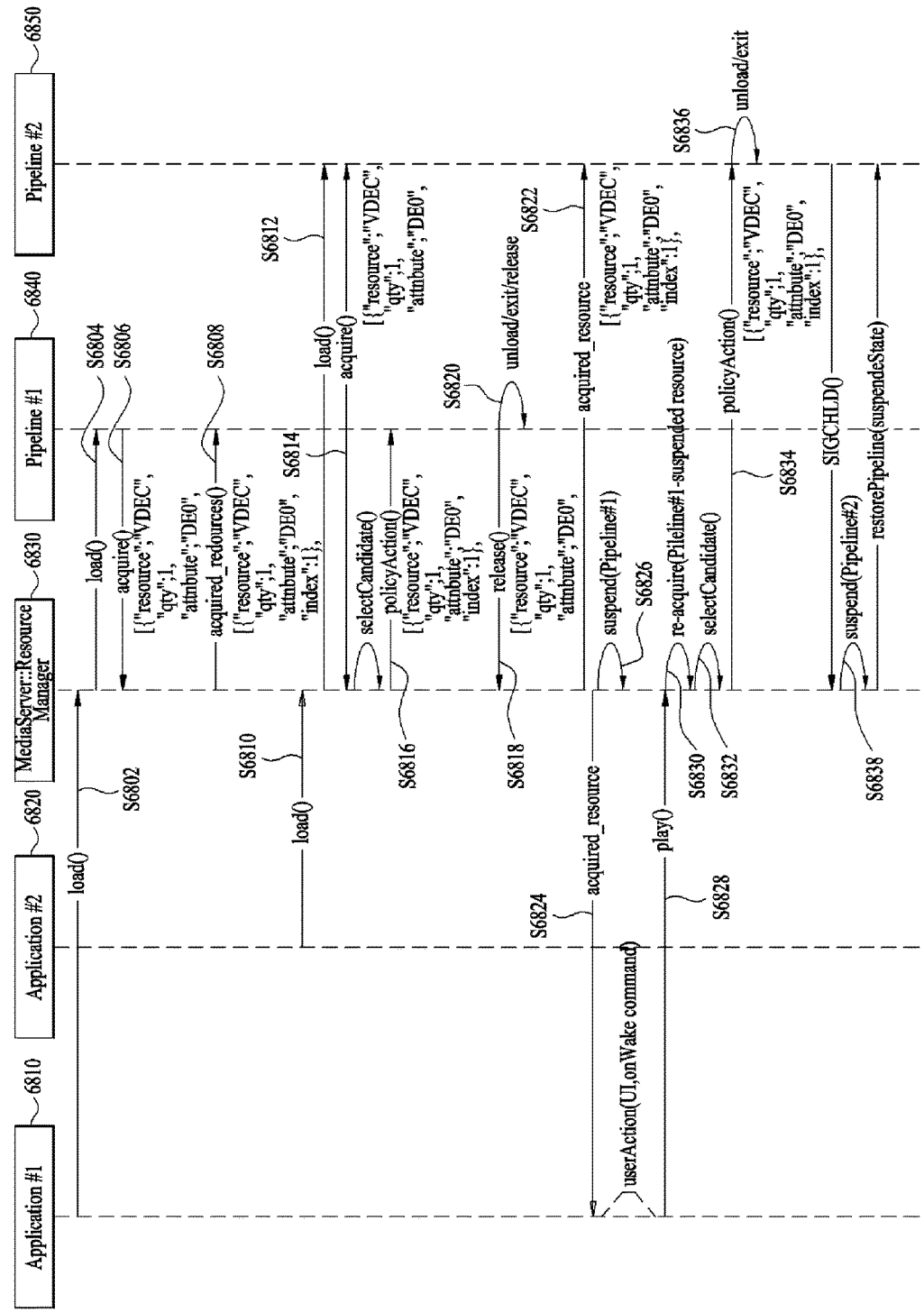
FIG. 68 is a sequence diagram for explaining a media playback suspending and resuming procedure according to one embodiment of the present invention.

FIG. 68 is a sequence diagram for explaining a media playback suspending and resuming procedure according to one embodiment of the present invention.

In order to switch media contents played in applications different from each other, it is necessary for a user or a system to close an application holding a hardware resource to launch a new media application.

According to the present invention, a plurality of active media applications and corresponding media pipelines can be maintained in a suspended or resumed state. This makes a user seamlessly suspend or resume media playing among a plurality of the media applications.

The media applications remain in a memory until the media applications are purged from the memory by a memory manager.

The media pipelines continuously occupy audio/video resources until the media pipelines receive a command for yielding the audio/video resources from a resource manager of a media server.

If an incoming pipeline requires hardware resources currently occupied by other pipelines, the resource manager of the media server can command other pipelines to yield the resources occupied by other pipelines.

A resource policy can be selected based on best/max fit hardware resource usage, LRU, and priority.

A media server indicates a media pipeline to release necessary resources based on the selected resource policy action and indicates to enter a suspended process or an exit process. The media server can manage a process and a state of each pipeline by including a pipeline controller object. For example, the media server can continuously update each command for a pipeline or a message/update from a command line using the pipeline controller object. Pipelines related to the pipeline controller are remained in the memory and marked as suspend.

A resumable command such as play and seek restarts a pipeline process. If a pipeline is exited or a pipeline simply releases required resources, it may be able to automatically resume a suspended pipeline related to a pipeline controller for retransmitting to all states including a state of resuming a current playing state.

In the following, suspending and resuming are explained in more detail with reference to FIG. 68.

FIG. 68 shows a first application 6810, a second application 6820, a media server resource manager 6830, a first pipeline 6840 related to the first application 6810, and a second pipeline 6850 related to the second application 6820.

The first application 6810 delivers a load command (load( )) to the media server resource manager 6830 (S6802). The media server resource manager 6830 delivers the load command to the first media pipeline 6840 (S6804). The first pipeline 6840 makes a request for resource allocation necessary for loading to the resource manager 6830 according to the delivered load command (S6806). The resource manager 6830 returns a resource requested by the first pipeline 6840 in a manner of allocating the resource (S6808).

After the resource is allocated to the first pipeline 6840 according to the loading of the first application 6810 in the step S6808, the second application 6840 transmits a load command (load( )) to the resource manager 6830 (S6810). The resource manager delivers the load command of the second application 6820 to the second pipeline 6850 (S6812). The second pipeline 6850 makes a request for resource allocation necessary for loading to the resource manager 6830 according to the delivered load command. In this case, the resource manager 6830 selects a candidate from the second pipeline 6850 according to a resource allocation request (S6814). In relation to the candidate, the resource manager determines whether or not a requested resource is currently occupied. If the requested resource is currently occupied by a different media pipeline, the resource manager transmits a policy action to the corresponding pipeline, i.e., the first pipeline 6840 (S6816). Having received the policy action from the resource manager 6830, the first pipeline 6840 releases a previously allocated resource(s) (S6818). After the step S6818, the first pipeline 6840 autonomously unloads, exits, or releases (S6820).

The resource manager 6830 retrieves the previously allocated resource from the first pipeline 6840 according to the step S6818 or the step S6820 and the retrieved resource is allocated to the second pipeline 6850 again (S6822). In this case, the resource manager 6830 transmits a pause command to the first application 6810 related to the first pipeline 6840 (S6824). And, the resource manager 6830 suspends the first pipeline 6840 (S6826).

If a user action for the first application 6810 is received via UI or the like after the step S6824 or the step S6826, the first application 6810 transmits a play command (play( )) to the resource manager 6830 (S6828).

The resource manager 6830 performs a resource reacquisition procedure for the first pipeline 6840, which is related to suspended resources, according to the play command transmitted by the first application 6810 (S6830). For example, this can be referred to as resuming. Subsequently, the resource manager 6830 selects a candidate (S6832) and transmits a policy action to the selected second pipeline 6850 (S6834). The second pipeline releases allocated resources and autonomously performs unload, exit and the like (S6836).

Subsequently, the second pipeline 6850 transmits SIGCHLD( ) to the resource manager 6830 and the resource manager 6830 suspends the second pipeline 6850 (S6838). Subsequently, the resource manager 6830 can command the second pipeline 6850 to restore a pipeline in a suspended state.

MODE FOR INVENTION

A digital device on which a web OS is mounted and a method of processing a service or an application thereof disclosed in the present specification may be non-limited to the aforementioned configurations and method of embodiments. The embodiments may be composed in a manner that a whole or a part of the each of the embodiments is selectively combined to achieve various modifications.

Meanwhile, a method of operating a digital device disclosed in the present specification can be implemented with a code readable by a processor in a recording media in which a program is recorded. The recording media readable by the processor includes recording devices of all types in which data readable by the processor is stored. The examples of the recording media readable by the processor may include a ROM, a RAM, a CD-ROM, a magnetic tape, a floppy disc, an optical data storing device and the like. And, implementing in a form of a carrier wave (e.g., transmission via the internet) is also included. The recording media readable by the processor are distributed to the computer systems connected by a network and codes readable by the processor can be stored and executed in a manner of being distributed.

While the present specification has been described and illustrated herein with reference to the attached drawings thereof, the present invention may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

INDUSTRIAL APPLICABILITY

The present invention relates to a digital device. The present invention is usable over industry using a digital device.

What is claimed is:

1. A method of processing an application in a digital television on which a web OS platform is mounted, comprising:
   receiving, by a reception unit of the digital television, a load request from a media application positioned at a foreground;
   generating, by a controller of the digital television, a first media pipeline for a TV service according to the received load request, wherein the TV service is comprised of at least one of another pipeline and the first media pipeline;
   in response to a resource assigning request is received from the first media pipeline, assigning the requested resource to the at least one of another pipeline for the TV service as well as the first media pipeline according to a resource sharing scheme;
   generating a new resource element including a Prev field, a resource information field and Next field, the Prev field containing an identifier of the new resource element, the resource information field containing resources and resource priority information of the new resource element;
   generating an internal resource element in response to at least one resource information of the new resource element is overlapped with one of resources of a legacy element, the legacy element comprises a Prev field containing an identifier for the legacy element and a resource information field containing the resources of the legacy element, the internal resource element comprises a Prev field containing an identifier for the internal resource element and a resource information field containing common resources and priority information of the legacy element and the new resource element, wherein the new resource element and the legacy element can be linked with each other by the identifier of the internal element, wherein the internal resource element can be linked with the new resource element and the legacy element based on the identifier of the new resource element and the identifier of legacy element containing in Next field of the internal resource element;
   storing, in a memory, resource allocation priority data in advance in response to each service and pipeline for a resource manager to consider not only pipelines of the TV service but also resources required by the first media pipeline and a camera pipeline;
   allocating resources based on the resource allocation priority data stored in the memory; and
   outputting, by an output unit of the digital television, a media by receiving a play request from the media application.

2. The method of claim 1, further comprising: receiving a pause request according to switching of the media application switched to a background; and delivering the pause request to the first media pipeline.

3. The method of claim 2, further comprising: receiving a play request according to re-switching of the media application switched back to the foreground; and delivering a play request according to the re-switching to the first media pipeline.

4. The method of claim 2, further comprising: receiving a load request from an application positioned at the foreground when the media application is positioned at the background; generating a second media pipeline according to the load request; receiving a resource assigning request from the second media pipeline; transmitting an unload request containing release of a resource previously allocated to the first media pipeline to the first media pipeline according to the resource assigning request of the second media pipeline; and transmitting an unload event to a media application positioned at the background.

5. The method of claim 4, further comprising: when the media application is switched to the foreground after the unload event, receiving a load request from the media application; generating a third media pipeline according to the load request; and assigning a resource for the third media pipeline.

6. The method of claim 1, wherein a specific resource is allocated to a pipeline of higher priority based on the stored allocation priority data, and a resource allocation declining intention is returned to a pipeline of lower priority.

7. A method of processing an application in a digital television on which a web OS platform is mounted, comprising:
   receiving, by a reception unit of the digital television, an open request from a TV application positioned at a foreground;
   generating, by a controller of the digital television, a first TV pipeline according to the open request, wherein there are at least one of another TV pipeline and the first TV pipeline for a TV service;
   receiving a channel setting request from the TV application;
   assigning a resource to the at least one of another TV pipeline as well as the first TV pipeline according to a resource sharing scheme according to the channel setting request;
   generating a new resource element including a Prev field, a resource information field and Next field, the Prev field containing an identifier of the new resource element, the resource information field containing resources and resource priority information of the new resource element;
   generating an internal resource element in response to at least one resource information of the new resource element is overlapped with one of resources of a legacy element, the legacy element comprises a Prev field containing an identifier for the legacy element and a resource information field containing the resources of the legacy element, the internal resource element comprises a Prev field containing an identifier for the internal resource element and a resource information field containing common resources and priority information of the legacy element and the new resource element, wherein the new resource element and the legacy element can be linked with each other by the identifier of the internal element, wherein the internal resource element can be linked with the new resource element and the legacy element based on the identifier of the new resource element and the identifier of legacy element containing in Next field of the internal resource element;
   storing, in a memory, resource allocation data for each service and pipeline for a resource manager so that the resources are allocated to the first TV pipeline and the at least one of another TV pipeline based on the resource allocation data; and outputting, by an output unit of the digital television, the TV service by tuning the channel.

8. The method of claim 7, further comprising: receiving a stop request according to switching of the TV application switched to a background; and releasing a resource assigned to the TV pipeline according to the stop request.

9. The method of claim 8, further comprising: receiving a channel setting request according to switching of the TV application switched back to the foreground; and assigning a resource to the TV pipeline again according to the channel setting request and storing a channel setting.

10. The method of claim 8, wherein the TV pipeline is not destroyed although a resource is released according to switching of the TV application switched to the background.

11. The method of claim 7, wherein a specific resource is allocated to a pipeline of higher priority based on the stored allocation priority data, and a resource allocation declining intention is returned to a pipeline of lower priority.

* * * * *